(12) United States Patent
Griffin et al.

(10) Patent No.: US 11,777,740 B1
(45) Date of Patent: *Oct. 3, 2023

(54) SYSTEMS AND METHODS FOR MAINTAINING CONFIDENTIALITY, INTEGRITY, AND AUTHENTICITY OF THE LAST SECRET

(71) Applicant: Wells Fargo Bank, N.A., San Francisco, CA (US)

(72) Inventors: Phillip H. Griffin, Raleigh, NC (US); Jeffrey J. Stapleton, O'Fallon, MO (US)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/703,972

(22) Filed: Mar. 24, 2022

Related U.S. Application Data

(63) Continuation of application No. 16/447,253, filed on Jun. 20, 2019, now Pat. No. 11,323,267, and a
(Continued)

(51) Int. Cl.
*H04L 9/32* (2006.01)
*H04L 9/08* (2006.01)
*H04L 9/30* (2006.01)

(52) U.S. Cl.
CPC ............ *H04L 9/3247* (2013.01); *H04L 9/085* (2013.01); *H04L 9/0822* (2013.01); *H04L 9/0844* (2013.01); *H04L 9/30* (2013.01)

(58) Field of Classification Search
None
See application file for complete search history.

(56) References Cited

U.S. PATENT DOCUMENTS

| | | |
|---|---|---|
| 9,455,968 B1 | 9/2016 | Machani et al. |
| 9,722,779 B1 | 8/2017 | Tomomura |

(Continued)

FOREIGN PATENT DOCUMENTS

| | | |
|---|---|---|
| WO | WO-00/49768 A1 | 8/2000 |

OTHER PUBLICATIONS

Boneh, D., et al., 2018. Threshold cryptosystems from threshold fully homomorphic encryption. In Advances in Cryptology—CRYPTO 2018: 38th Annual International Cryptology Conference, Aug. 19-23, 2018, Proceedings, Part I 38 (pp. 565-596). Springer International Publishing. (Year: 2018).*

(Continued)

*Primary Examiner* — Luu T Pham
*Assistant Examiner* — Edward X Long
(74) *Attorney, Agent, or Firm* — Foley & Lardner LLP

(57) ABSTRACT

A method for securely sharing and authenticating a last secret can include splitting a secret into a first split and a second split, the secret comprising a cryptographic element and controlling access to a first key, the secret comprising at least one of a password, a second key, and a tokenized value, and the first key controlling access to a secure computing system, encrypting the first split by an encryption key established between the dealer computing system and the combining computing system, encrypting the second split by the encryption key established between the dealer computing system and the combining computing system, transmitting the encrypted first split to a first share-holder, transmitting the encrypted second split to a second share-holder, designcrypting the encrypted first split, and designcrypting the encrypted second split.

16 Claims, 24 Drawing Sheets

Related U.S. Application Data continuation-in-part of application No. 16/203,191, filed on Nov. 28, 2018, now Pat. No. 11,626,982.

(56) References Cited

U.S. PATENT DOCUMENTS

| | | | |
|---|---|---|---|
| 9,768,953 | B2 | 9/2017 | Bernat et al. |
| 10,148,433 | B1 | 12/2018 | Lozin et al. |
| 10,270,770 | B1 | 4/2019 | Irwan et al. |
| 2002/0071566 | A1 | 6/2002 | Kurn |
| 2013/0013931 | A1* | 1/2013 | O'Hare ............... H04L 9/3231 713/189 |
| 2015/0229480 | A1 | 8/2015 | Joye et al. |
| 2019/0035018 | A1 | 1/2019 | Nolan et al. |
| 2019/0342083 | A1 | 11/2019 | Lesaint |
| 2019/0342084 | A1 | 11/2019 | Mehedy et al. |
| 2020/0159563 | A1 | 5/2020 | Luo |
| 2020/0250327 | A1* | 8/2020 | Naraidoo ............ G06F 11/1464 |

OTHER PUBLICATIONS

Adida, B., Hohenberger, S. and Rivest, R.L., Jul. 2005. Lightweight Encryption for Email. In SRUTI. (Year: 2005).*

Chang et al., "A New Multi-stage Secret Sharing Scheme Using One-way Function", ACM SIGOPS Operating Systems Review 39(1):48-55; Jan. 2005.

Harn & Wang, "Threshold Signature Scheme without Using Polynomial Interpolation," International Journal of Network Security 18(4), pp. 710-717 (2016).

Harn, et al., "How to Share Secret Efficiently over Networks," Security and Communication Networks 2017, 5437403, 6 pages (2017).

Nilsson et al., Key Management and Secure Software Updates in Wireless Process Control Environments, 2008, WiSec'08, pp. 100-108. (Year: 2008).

Saied et al., HIP Tiny Exchange (TEX): A Distributed Key Exchange Scheme for HIP-based Internet of Things, 2012 (Year: 2012).

Sun, Y. et al., Jul. 2018. A decentralizing attribute-based signature for healthcare blockchain. In 2018 27th International conference on computer communication and networks (ICCCN) (pp. 1-9). IEEE. (Year: 2018).

Zhou, B.,et al., Jun. 2018. An authentication scheme using identity-based encryption & blockchain. In 2018 IEEE Symposium on computers and communications (ISCC) (pp. 00556-00561). IEEE. (Year: 2018).

* cited by examiner

1000

```
BlindedSecrets {
   joint-iso-itu-t(2) country(16) us(840) organization(1) wfbna(114171)
      lobs(4) eisArchitecture(1) modules(0) bliss(11) bs(0)
}

DEFINITIONS AUTOMATIC TAGS ::= BEGIN

-- EXPORTS All --

IMPORTS

-- X9.73 Cryptographic Message Syntax (CMS) --

ATTRIBUTE, SignerIdentifier
      FROM CryptographicMessageSyntax {
         iso(1) identified-organization(3) tc68(133) country(16) x9(840)
            x9Standards(9) x9-73(73) module(0) cms(2) v2009(1) };

1014─► partHolder ATTRIBUTE ::= {
         WITH SYNTAX PartHolder ID id-partHolder
      }
1014─►
1002─► PartHolder ::= SEQUENCE {
1004─►   combinerAddress   CombinerAddress,
1006─►   validShareHolder  ValidShareHolder,
1008─►   groupName         GroupName  OPTIONAL,
1010─►   index             Index  OPTIONAL,
         dealTime          DealTime  OPTIONAL, ...  -- Expect additional components --
      }
```

/*
    A value of type CombinerAddress is the URI of the combiner that can
    reconstruct a set of last secret parts. The part-holder signs the
    SigncryptedData message received from the dealer using a SignedData
    message and sends this result to the URI. The part-holder signs with
    the key pair identified by the dealer in the signed attributes of
    the SigncryptedData message recieved by the part-holder.
*/
1002
CombinerAddress ::= UTF8String (SIZE(1..MAX))

/*
    A value of type ValidShareHolder identifies the intended recipient of a
    last secret part. A value of type ValidShareHolder indicates the public
    key pair that must be used by the part-holder to send a last secret
    part received from a dealer to the combiner in a SignedData message
    that contains the SigncryptedData message created by the dealer and
    distributed to a share-holder. The combiner ensures that the signer of
    the SignedData message is the share-holder indicated in the signed
    attributes of the dealer's SigncryptedData part distribution message,
    a valid share-holder.
*/
1004
ValidShareHolder ::= SignerIdentifier /*
    Type GroupName identifies a last secret instance. GroupName is an
    optional component of the ShareHolder signed attribute payload, as
    this value may be known by participants in a given system. GroupName
    may be included in the dealer SigncryptedData signed attributes in
    the part distribution message sent by the dealer to the share-holder.
*/
1006
GroupName ::= OCTET STRING (SIZE(1..MAX))

/*
    A value of type Index informs the combiner what order to use to
    reconstruct the parts of the last secret. Type Index is a component
    of the signed attributes in type SigncryptedData that are included
    when using signcryption-attributes processing mode. Type Index is
    an optional component of the attribute payload, as the order of shares
    may be managed in some other manner by the dealer and combiner.
*/
1008
Index ::= INTEGER { order(1) } (1..MAX)
```

FIG. 11

```
/*
    A value of type DealTime is the time and date that a last secret
    dealer distributed a last secret part to a share-holder.
*/
DealTime ::= GeneralizedTime -- Information object identifiers --

OID ::= OBJECT IDENTIFIER   -- Alias -- blindedSecrets OID ::= {
    joint-iso-itu-t(2) country(16) us(840) organization(1) wfbna(114171)
        lobs(4) eisArchitecture(1) modules(0) bliss(11) bs(0)
} id-shareHolder OID ::= { blindedSecrets shareHolder(1) }

END  -- BlindedSecrets --
```

FIG. 12

SYSTEMS AND METHODS FOR MAINTAINING CONFIDENTIALITY, INTEGRITY, AND AUTHENTICITY OF THE LAST SECRET

CROSS-REFERENCE TO RELATED PATENT APPLICATIONS

This application is a continuation of U.S. patent application Ser. No. 16/447,253, filed Jun. 20, 2019, which application is a continuation-in-part of U.S. patent application Ser. No. 16/203,191, filed Nov. 28, 2018, the contents of all such applications being hereby incorporated by reference in their entirety and for all purposes as if completely and fully set forth herein.

TECHNICAL FIELD

The present application relates generally to systems and methods for securely storing passwords and/or encryption keys.

BACKGROUND

Access to electronic entities such as servers, databases, applications, etc. can be controlled using a cryptographic process. The cryptographic process can be initiated using a cryptographic key. The cryptographic key may be password-protected to prevent initialization of the cryptographic process without authorization. The password is considered a "last secret," because it is the final element needed to recover the cryptographic key. However, the cryptographic key and the password must be saved to a non-volatile medium such that the cryptographic key and the password can survive an application or system restart. The password can be encrypted using a second cryptographic key to prevent retrieval and use of the password by an unauthorized party. The second cryptographic key then becomes the last secret needed to decrypt the password used to unlock the first cryptographic key. The password or the second cryptographic key can be fragmented into components, shares, sometimes referred to as splits, or obfuscated in some other manner. The components, shares, etc. of the password or the second cryptographic key can be stored securely on a non-volatile medium. Often, the components, shares, etc. of the second cryptographic key are stored on media such as paper, smart cards, or USB sticks that are provided to human operators. The human operators must then provide the components, shares, etc. to regenerate the second cryptographic key. The human operators may need to provide their component, share, etc. to regenerate the second cryptographic key simultaneously, which can be inconvenient. Furthermore, if the paper, smart cards, or USB sticks are stolen by an unauthorized party, the unauthorized party can regenerate the second cryptographic key.

SUMMARY

One embodiment relates to a method for securely sharing and authenticating a last secret. The method can include splitting, by a dealer computing system coupled with a combining computing system, a secret into a first split and a second split, the secret comprising a cryptographic element and controlling access to a first key, the secret comprising at least one of a password, a second key, and a tokenized value, and the first key controlling access to a secure computing system, encrypting, by the dealer computing system, the first split by an encryption key established between the dealer computing system and the combining computing system, encrypting, by the dealer computing system, the second split by the encryption key established between the dealer computing system and the combining computing system, transmitting, by the dealer computing system, the encrypted first split to a first share-holder, transmitting, by the dealer computing system, the encrypted second split to a second share-holder, designcrypting, by only the combining computing system, the encrypted first split, and designcrypting, by only the combining computing system, the encrypted second split.

One embodiment relates to a system for securely sharing and authenticating a last secret. The system can include a dealer computing system with a splitting circuit configured to split a secret into a first split and a second split, the secret comprising a cryptographic element and controlling access to a first key, the secret comprising at least one of a password, a second key, and a tokenized value, and the first key controlling access to a secure computing system, an encryption circuit configured to encrypt the first split by an encryption key established between the dealer computing system and the combining computing system, and encrypt the second split by the encryption key established between the dealer computing system and the combining computing system and a network interface configured to transmit the encrypted first split to a first share-holder, and transmit the encrypted second split to a second share-holder. The dealer computing system can be operatively coupled with a combining computing system with a combining circuit configured to designcrypt the encrypted first split, and designcrypt the encrypted second split.

One embodiment relates to a system for securely sharing and authenticating a last secret. The system can include a combining computing system with a combining circuit configured to designcrypt an encrypted first split, and designcrypt an encrypted second split. The combining computing system can be operatively coupled with a dealer computing system with a splitting circuit configured to split a secret into a first split and a second split, the secret comprising a cryptographic element and controlling access to a first key, the secret comprising at least one of a password, a second key, and a tokenized value, and the first key controlling access to a secure computing system, an encryption circuit configured to encrypt the first split by an encryption key established between the dealer computing system and the combining computing system, and encrypt the second split by the encryption key established between the dealer computing system and the combining computing system, and a network interface configured to transmit the encrypted first split to a first share-holder, and transmit the encrypted second split to a second share-holder.

BRIEF DESCRIPTION OF THE DRAWINGS

FIG. 10 illustrates an exemplary schema that includes the attributes.

FIG. 11 illustrates the exemplary schema that includes the attributes.

FIG. 12 illustrates the exemplary schema that includes the attributes.

DETAILED DESCRIPTION

Figure 1:
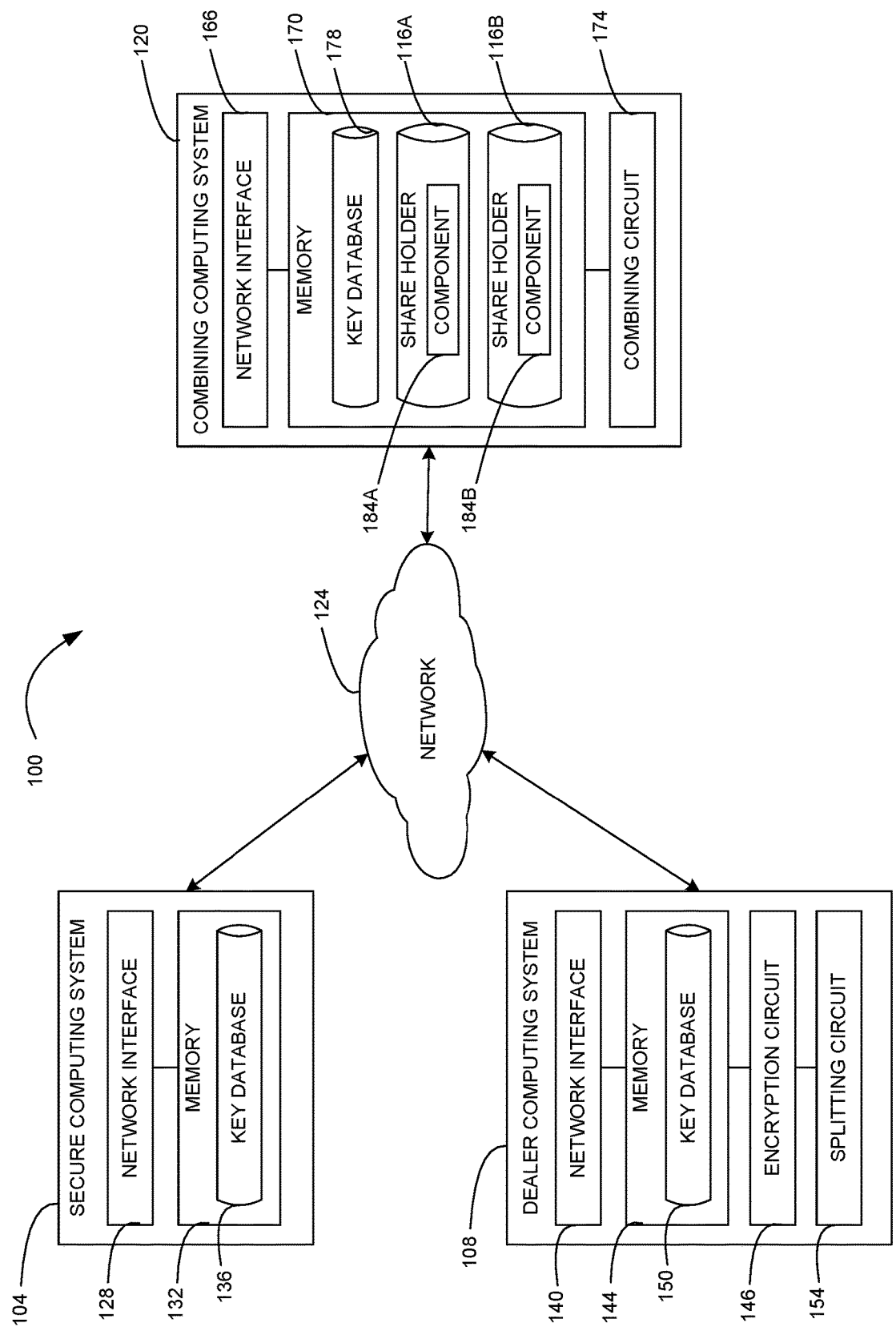
FIG. 1 is an environmental view of a system for generating a last secret and maintaining confidentiality, integrity, and authenticity of the last secret, according to one embodiment.

Referring to the figures generally, various systems, methods, and apparatuses for maintaining the integrity, authenticity, and confidentiality of a last secret are described herein. The last secret as used herein refers to the last cryptographic element that controls access to an encryption key, a biometric, one or more pieces of encrypted data, a password used to generate a key, a password used to access data and/or a secure computing device, a tokenized value, or a password used to protect a seed that can be fed into a pseudorandom function generator to generate a cryptographic key, or any other information intended to be stored securely. In some embodiments, the encryption key can be a cryptographic key used to protect other cryptographic keys. In some embodiments, encryption key can be a cryptographic key used to derive other cryptographic keys. In some embodiments, the data accessed by the password protected with the last secret can include another password, a combination to unlock a physical object (e.g., a lock or a safe), a numeric passcode for an electronic device (e.g., a mobile phone, a tablet computer, a personal computer, etc.) An example embodiment and method are described as follows and illustrated in FIG. 1A. A system 10 for securely sharing and authenticating a last secret 2 can include a secure computing system (not shown), a dealer or splitter computing system 4, share-holders 6A, 6B, 6i, and 6N, and a combining computing system 8. In some embodiments, the secure computing system, the dealer computing system 4, the share-holders 6A, 6B, 6i, and 6N, and the combining computing system 8 can all be separate entities on different network nodes. In some embodiments, at least two of the secure computing system, the dealer computing system 4, and the combining computing system 8 can be embodied in the same entity on the same network node.

The dealer computing system 4 includes a dealer signing key and a share-holder encryption key from each share-holder 6A, 6B, 6i, and 6N. As used herein, the term "dealer signing key" refers to an encryption key or keys used to generate a dealer signature. In some embodiments, the dealer signing key can be a private key of an asymmetric key pair of the dealer computing system 4. In some embodiments, the dealer signing key can be a symmetric key. As used herein, the term "dealer signature" refers to a digital signature, a trusted time stamp, a hash signature, a time stamp token, a message authentication code (MAC), and/or a hash-based message authentication code (HMAC). The dealer signature can be used to authenticate each of the splits. In embodiments in which the dealer signing key is a private key of the dealer computing system 4, the dealer signature is based on the private (e.g., never shared) key of the dealer computing system 4. In embodiments in which the dealer signature is a MAC or HMAC key, the dealer signing key is a symmetric key that is unique to the dealer computing system 4 and a specific recipient. In some embodiments, the specific recipient can be the combining computing system 8. The "share-holder encryption keys" referred to herein can be content encryption keys (CEKs). The CEKs can be stablished using either cryptographic message syntax (CMS)-based key transport or key agreement schemes. Encryption using CMS or key agreement schemes ensure that the encrypted splits can only be decrypted by a particular computing system, such as the combining computing system 8.

Figure 1A:
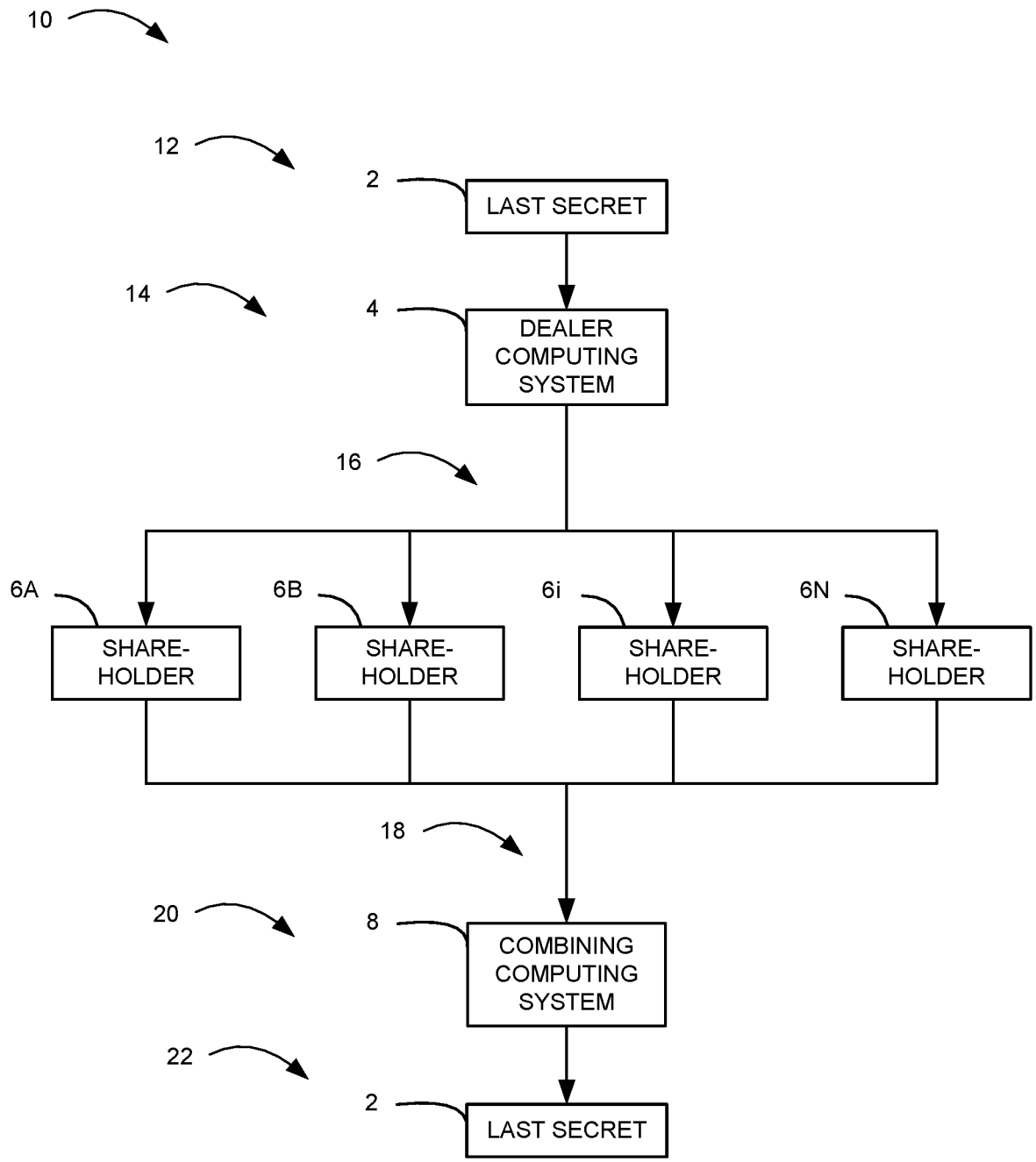
FIG. 1A is a flow diagram showing a simplified process for obfuscating a last secret using a plurality of splits and recovering the last secret from the plurality of splits is shown, according to an example embodiment.

The dealer computing system 4 includes an encryption circuit and a splitting circuit. The encryption circuit is structured to generate a first key and a last secret 2. The first key provides access to the secure computing system. The last secret 2 is the last cryptographic element controlling access to the first key. The splitting circuit is structured to split the last secret into a plurality of splits. In some embodiments, the splitting circuit is structured to split the last secret into components according to an N of N component scheme or to split the last secret into shares according to a N of M share scheme. The splitting circuit is structured to sign each of the splits with the dealer signature generated using the dealer signing key so as to maintain authenticity of the splits. The splitting circuit is structured to generate encrypted splits by, for each of the splits, encrypting the splits with the share-holder encryption key of the share-holder 6A, 6B, 6i, and 6N structured to store the at least one encrypted split so as to maintain confidentiality of the last secret 2. Each of the splits is encrypted for the designated share-holder 6A, 6B, 6i, and 6N recipient using the encryption key of that share-holder 6A, 6B, 6i, and 6N. The system 10 includes two or more share-holders. Therefore, FIG. 1 illustrates a first share-holder 6A, a second share-holder 6B, an $i^{th}$ share-holder 6i, and an $N^{th}$ share-holder 6N. The share-holder N represents the last share-holder. The $i^{th}$ share-holder 6i represents any number of intermediate share-holders between the share-holder 6B and the $N^{th}$ share-holder 6N. In embodiments in which there are three share-holders, there is no share-holder 6i. In embodiments in which there are two share-holders, there are no share-holders 6i or 6N.

The combining computing system 8 includes a combining circuit, the dealer signing key, and a share-holder encryption key of each of the share-holders 6A, 6B, 6i, and 6N. The combining circuit 8 is structured to receive each of the at least one encrypted splits from each of the share-holders 6A, 6B, 6i, and 6N. The encrypted splits maintain confidentiality of the last secret 2 because only the intended combining computing system 8 can decrypt the encrypted splits. The combining computing system 8 is structured to decrypt each of the at least one encrypted splits with the share-holder encryption key of each of the share-holders 6A, 6B, 6i, and 6N, authenticate each of the splits by verifying the dealer signature using the public key of the dealer or dealer signing key so as to verify the authenticity of the last secret 2, and combine each of splits to determine the last secret 2 so as to verify the integrity of the last secret 2.

Referring again to FIG. 1A, a simplified process for obfuscating a last secret using a plurality of splits and recovering the last secret from the plurality of splits is shown, according to an example embodiment. At step 12, the last secret 2 is transmitted to the dealer computing system 4. At step 14, the dealer computing system 4 splits the last secret 2 into a plurality of splits. In some embodiments, the dealer computing system 4 splits the last secret 2 into a plurality of components according to an N of N scheme, as described in greater detail below. In some embodiments, the dealer computing system 4 splits the last secret 2 into a plurality of shares according to a N of M scheme, as described in greater detail below. The dealer computing system 4 encrypts each of the plurality of splits using an encryption key of each of the share-holders 6A, 6B, 6i, 6N, respectively. The dealer computing system 4 signs at least a portion of each of the plurality of splits using the dealer signing key to generate a plurality of digitally signed and encrypted splits. At step 16, the dealer computing system 4 securely transmits each of the digitally signed and encrypted splits to the share-holders 6A, 6B, 6i, 6N, respectively.

The combining computing system 8 then starts, restarts, and/or desires to recover the last secret 2 (not shown). The combining computing system 8 requests the digitally signed and encrypted splits from the share-holders 6A, 6B, 6i, 6N (not shown). At step 18, the share-holders 6A, 6B, 6i, 6N send their digitally signed and encrypted splits to the combining computing system 8. At step 20, the combining computing system 8 determines an amount of splits that have been received. For example, in embodiments in which the last secret has been split according to a N of N scheme, the combining computing system 8 determines whether all of the N splits have been received. In another example, in embodiments in which the last secret has been split according to a N of M scheme, the combining computing system 8 determines whether N splits have been received. The combining computing system 8 verifies the dealer signature on each of the splits. After verifying the dealer signature on each of the splits, the combining computing system 8 decrypts splits. At step 22, after receiving N splits, the combining computing system 8 regenerates the last secret 2.

Referring now to FIG. 1, an environmental view of a system 100 for generating a last secret that can be stored confidentially and that can be authenticated is shown, according to an example embodiment. The last secret refers to the last cryptographic element that controls access to an encryption key, a biometric, one or more pieces of data, a tokenized value, a password used to generate a key, a password used to access data and/or a secure computing device, a tokenized value, or a password used to protect a seed that can be fed into a pseudorandom function generator to generate a cryptographic key or any other information intended to be stored securely. The last secret can be a password, an encryption key, or a detokenization request that must be provided by an entity to gain access to initialization information to start up a cryptographic process for communicating with a secure computing system 104 or to access the biometric, the one or more pieces of encrypted data, etc. As shown in FIG. 1, the system 100 includes the secure computing system 104, a dealer computing system 108, share-holders 116, and a combining computing system 120 connected by a network 124. While the secure computing system 104, the dealer computing system 108, and the combining computing system 120 are shown as separate entities in FIG. 1, in some embodiments, one or more of the secure computing system 104, the dealer computing system 108, the share-holders 116, and the combining computing system 120 can be parts of the same computing system. While the share-holders 116 are illustrated as being part of the combining computing system 120, in some embodiments, the share-holders 116 can be separate entities.

In the illustrated embodiment, the share-holders 116 include a first share-holder 116A and a second share-holder 116B of the combining computing system 120. Each of the plurality of share-holders 116 is writable by a separate administrator and/or process and can have a separate share-holder encryption key. In other embodiments, share-holders 116 can be in other locations that are in communication with the network 124. In some embodiments, the share-holders 116 can be on physical media such as USB memory sticks, smart cards, etc. In the illustrated embodiment, the plurality of share-holders 116 includes the first share-holder 116A and the second share-holder 116B. In some embodiments, the share-holders 116A, 116B can be structured to authenticate a dealer signature of the dealer signed and encrypted components 184 using the dealer signing key of the dealer computing system 108. In some embodiments, the share-holders 116A, 116B can be structured to decrypt the dealer signed and encrypted components 184 using a share-holder encryption key that has been established with the dealer computing system 108. The share-holders 116A, 116B can then be structured to encrypt the components 184A, 184B (described in greater detail below) with a share-holder encryption key that has been established with the combining computing system 120 to generate dealer signed and encrypted components 184A, 184B that can be decrypted by the combining computing system 120.

In some embodiments, the share-holders 116A, 116B can be structured to sign a portion of the first component 184A and the second component 184B with a share-holder signature using a share-holder signing key of the share-holder 116A, 116B. As used herein, the term "share-holder signature" refers to a digital signature, a trusted time stamp, a hash signature, a time stamp token, a MAC, and/or an HMAC. The share-holder signature can be used to authenticate each of the components 184A, 184B. In embodiments in which the share-holder signing key is a private key of the share-holder 116A, 116B, the share-holder signature is based on the private (e.g., never shared) key of the share-holder 116A, 116B. In embodiments in which the share-holder signature is a MAC or HMAC key, the share-holder signing key is a symmetric key that is unique to the share-holder and a specific recipient. In some embodiments, the specific recipient can be the combining computing system 120. In other embodiments, the share-holder 116A, 116B is structured to encrypt or signcrypt the components 184A, 184B using at least a private key of share-holder 116A, 116B. The share-holder signature of the components 184A, 184B can be used by the combining computing system 120 to authenticate the components 184A, 184B.

In some arrangements, the first share-holder 116A is configured to sign the encrypted first component 184A with the first share-holder signature, such that the first component 184A is encrypted and includes the dealer signature and the first share-holder signature. The share-holder 116A is then configured to write the encrypted first component 184B, which includes the dealer signature and the first share-holder signature, to a block chain. This can serve as a verifiable record indicating the dealer computing system 108 that generated the first component 184 and the share-holder that held the first component 184A (e.g., the share-holder 116A). In some embodiments, the share-holder 116A can be configured to write the encrypted first component 184A, which includes the dealer signature and the first share-holder signature, to the block chain when the share-holder sends the encrypted first component 184A to the combining computing system 120 to save a verifiable record of when the encrypted first component 184A was sent to the combing computing system 120.

In some arrangements, the second share-holder 116B is configured to sign the encrypted second component 184B with the second share-holder signature and write the encrypted second component 184B, which includes the dealer signature and the second share-holder signature, to a blockchain as described above with respect to the first share-holder 116A and the first split 184A.

The secure computing system 104 can be a database server, an application server, a file server, a mail server, a print server, a web server, and/or a game server that is in communication with other computing systems and/or client devices connected to the network 124. In other embodiments, the secure computing system 104 can be a computing system that includes encrypted data. The secure computing system 104 includes a network interface 128 and a memory 132. In some embodiments, the secure computing system 104 can include the dealer computing system 108. In other embodiments, the secure computing system 104 and the dealer computing system 108 can be separate entities. The network interface 128 of the secure computing system 104 is adapted for and structured to establish a communication session via the network 124 with the other components of the system 100. As used herein, a "network interface" may include any of a cellular transceiver (Code Division Multiple Access (CDMA), Global System for Mobile Communications (GSM), Long-Term Evolution (LTE), etc.), a wireless network transceiver (e.g., 802.11X, ZigBee, Bluetooth, etc.), and a combination thereof (e.g., both a cellular transceiver and a Bluetooth transceiver). As shown in FIG. 1, the memory 132 is communicably and operatively coupled with the other components of the secure computing system 104. The memory 132 includes a key database 136. The key database 136 is structured to retrievably store information related to the public/private key pair of the secure computing system 104. As shown in FIG. 1, the memory 132 is communicably and operatively coupled with the other components of the secure computing system 104.

The dealer computing system 108 includes a network interface 140, a memory 144, an encryption circuit 146, and a splitting circuit 154. The network interface 140 is structured to establish a communication session via the network 124 with the other components of the system 100. As shown in FIG. 1, the memory 144 is communicably and operatively coupled with the other components of the dealer computing system 108. The memory 144 includes a key database 150 including a first key for accessing the secure computing system 104, a password, and an optional second key that have been generated by the encryption circuit 146. The password is structured to control access to the first key. In embodiments that do not include the second key, the password is the last secret. In some embodiments, the password can be encrypted using the second key. In such embodiments, the second key is the last secret. In embodiments in which the second key is the last secret, the encrypted password is stored to the memory 132 of the secure computing system 104.

The splitting circuit 154 is structured to establish share-holder encryption keys for each of the share-holders. In the illustrated embodiment, the dealer computing system 108 is structured to establish a share-holder encryption key for the first share-holder 116A and a share-holder encryption key for the second share-holder 116B. The share-holder encryption key of the first share-holder 116A and the share-holder encryption key of the second share-holder 116B can be content encryption keys (CEKs). The CEKs can be established using either cryptographic message syntax (CMS)-based key transport or key agreement schemes. The memory 144 includes a key database 150 structured to retrievably store information related to the dealer signing key and the share-holder encryption keys that have been established between the dealer computing system 108 and each of the share-holders 116. In embodiments in which the dealer computing system 108 is separate from the secure computing system 104, the key database 150 may include an encryption key for communicating with the secure computing system 104. The encryption key can be a CEK that is established with the secure computing system 104 using CMS-based key transport or key agreement schemes.

The splitting circuit 154 is structured to receive the last secret from the dealer computing system 108 and read the last secret into a volatile memory. The splitting circuit 154 is structured to split the last secret into a plurality of splits 184. As illustrated in FIG. 1, the splitting circuit 154 is structured to split the last secret into components of a N of N scheme such that the splits 184 are the components 184 of the N of N scheme. In the illustrated embodiment, the splitting circuit 154 is structured to split the last secret into the first component 184A and the second component 184B. In other embodiments, the splitting circuit 154 may split the last secret into a different number of components. The splitting circuit 154 is structured to generate a random number and save the random number as the first component 184A. The splitting circuit 154 is structured to combine the random number with the last secret using exclusive or (XOR) to generate the second component 184B. The splitting circuit 154 is then structured to erase the last secret from the volatile memory and not write the last secret to the memory 144. Splitting the last secret into the components 184A, 184B maintains the integrity of the last secret because components that have been altered or replaced by a malicious party cannot be recombined into the last secret.

The splitting circuit 154 is structured to sign the first component 184A and the second component 184B with a dealer signature using the dealer signing key of the dealer computing system 108. In embodiments in which the dealer signature is a digital signature, the dealer signing key can be a private key of the dealer computing system 108. In other embodiments, the splitting circuit 154 is structured to encrypt or signcrypt the components 184A, 184B using at least the private key of dealer computing system 108. The dealer signature of the components 184A, 184B can be used by the combining computing system 120 to authenticate the components 184A, 184B.

The splitting circuit 154 is structured to encrypt the first component 184A with the share-holder encryption key of the first share-holder 116A of the combining computing system 120 and then send the dealer signed and encrypted first component 184A to the first share-holder 116A of the combining computing system 120. The splitting circuit 154 is structured to encrypt the second component 184B with the share-holder encryption key of the second share-holder 116B of the combining computing system 120 and then send the dealer signed and encrypted second component 184B to the second share-holder 116B of the combining computing system 120. Encrypting the first component 184A and the second component 184B with the share-holder encryption keys of the share-holders 116A, 116B maintains the confidentiality of each of the components 184A, 184B, which in turn maintains the confidentiality of the last secret. The splitting circuit 154 does not encrypt the dealer signature. In embodiments in which multiple last secrets need to be protected, the last secrets can be individually encrypted using a password encryption key (WEK) that is split into components 184 according to a N of N scheme as described above for the last secret.

In some embodiments, the first component 184A and the second component 184B can be structured to be valid for a predetermined time period. In some embodiments, the predetermined time period may be a week, a month, or a year. In some embodiments, the dealer signature can include information indicative of the predetermined time period. Near the end of the predetermined time period, the dealer computing system 108 can be structured to request the last secret from the secure computing system 104. The splitting circuit 154 is structured to split the last secret into a second plurality of components 184.

The combining computing system 120 is a computing system or can be a part of a computing system that desires to access the secure computing system 104. For example, in embodiments in which the secure computing system 104 is an application server or a database, the combining computing system 120 may run an application or a program that needs to access the secure computing system 104. The combining computing system 120 includes a network interface 166, a memory 170, and a combining circuit 174. The memory 170 can include a key management database 178 and the plurality of share-holders 116.

The combining computing system 120 is structured to retrieve the dealer signed and encrypted first component 184A from the first share-holder 116A and the dealer signed and encrypted second component 184B from the second share-holder 116B after the combining computing system 120 has started up. The combining circuit 174 is then structured to decrypt the dealer signed and encrypted first component 184A using the share-holder encryption key of the first share-holder 116A. The combining circuit 174 is then structured to decrypt the dealer signed and encrypted second component 184B using the share-holder encryption key of the second share-holder 116B. The combining circuit 174 is structured to verify the dealer signature of each of the first component 184A and the second component 184B using the dealer signing key of the dealer computing system 108 to verify integrity and authenticity of the first component 184A and the second component 184B. In embodiments in which the components 184A, 184B include a share-holder signature, the combining circuit 174 is structured to verify the share-holder signature of each of the first component 184A and the second component 184B using the share-holder signing key of the share-holders 116A, 116B, respectively, to verify integrity and authenticity of the first component 184A and the second component 184B. After authenticating the first component 184A and the second component 184B, the combining circuit 174 is structured to combine the first component 184A and the second component 184B to regenerate the last secret. For example, the combining circuit 174 can XOR the first component 184A and the second component 184B together to regenerate the last secret. The combining computing system 120 can then use the last secret to access the first key of the secure computing system 104. The combining computing system 120 is structured to store the last secret within volatile memory and erase the last secret after the first key has been retrieved. The combining computing system 120 is structured to never write the last secret to the memory 170, cache memory, or any other non-volatile media. The combining computing system 120 can then communicate with the secure computing system 104 using the first key.

Figure 2A:
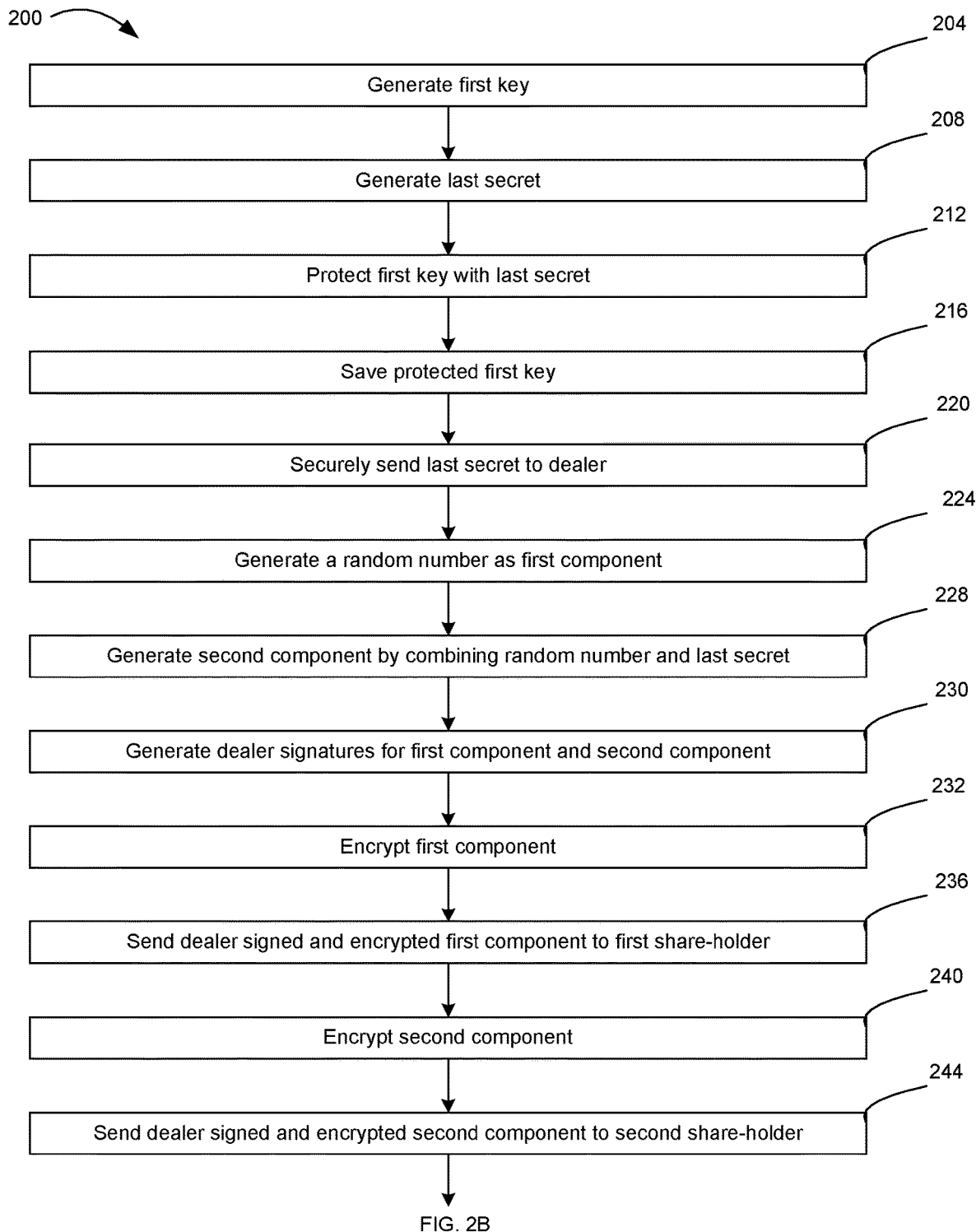
FIGS. 2A and 2B are flow diagrams showing a process of generating and sharing the last secret while maintaining confidentiality, integrity, and authenticity of the last secret, according to one embodiment.
Figure 2B:
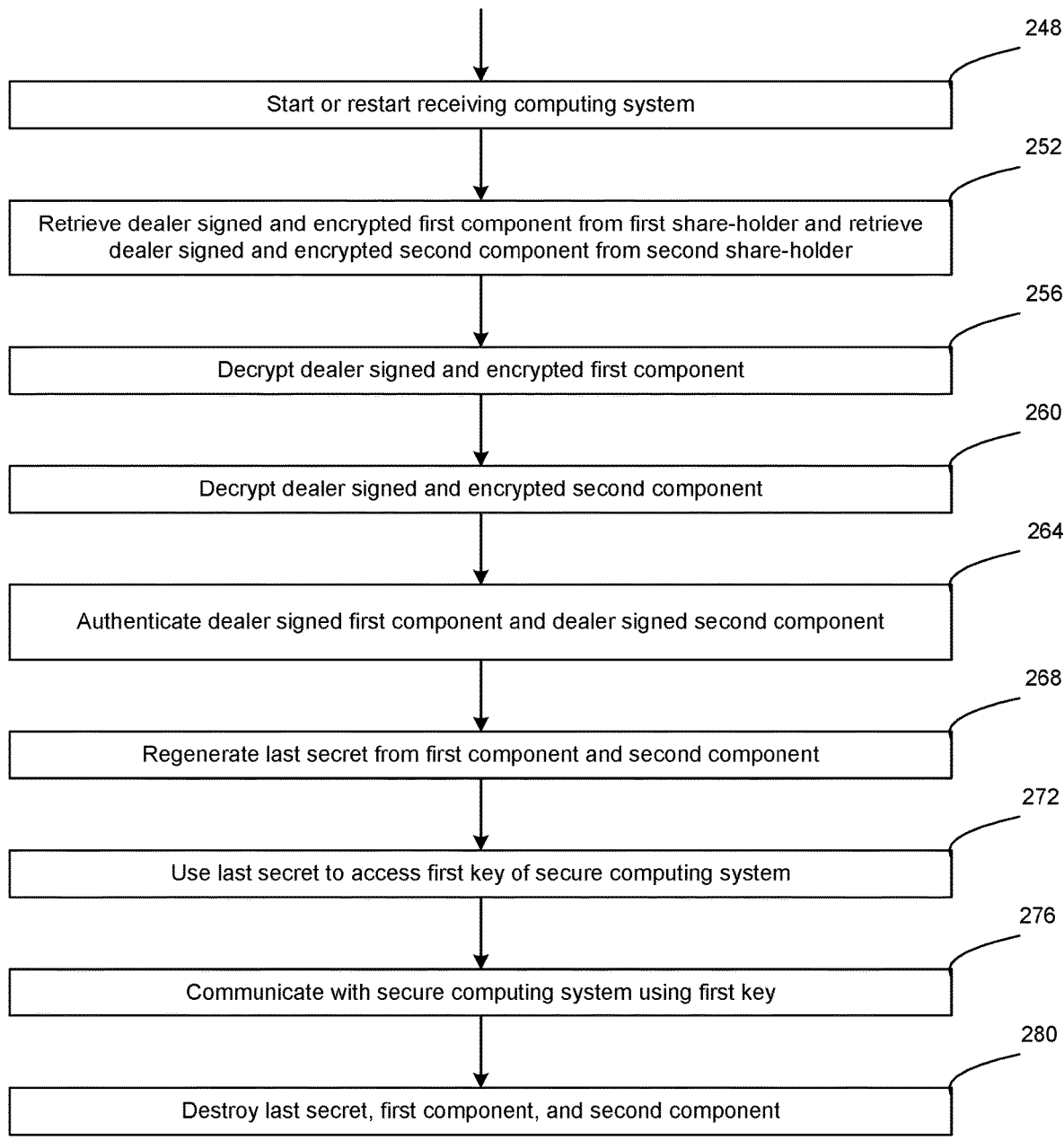

Referring now to FIG. 2, a flow diagram of a method 200 for maintaining the confidentially, authenticity, and integrity of a last secret is shown, according to an example embodiment. At step 204, the first key for the secure computing system 104 is generated by the encryption circuit 146 of the dealer computing system 108. At step 208, the last secret is generated by the encryption circuit 146. At step 212, the first key is protected with the last secret. At step 216, the protected first key is saved to the memory 132 of the secure computing system 104. At step 220, the last secret is sent to the dealer computing system 108. At step 224, the splitting circuit 154 generates a random number as the first component 184A. At step 228, the splitting circuit 154 uses XOR to generate a second component 184B from the last secret and the first component 184A. Splitting the last secret into the components 184A, 184B maintains the integrity of the last secret because components that have been altered or replaced by a malicious party cannot be recombined into the last secret. At step 230, the splitting circuit 154 signs a portion of each of the first component 184A and the second component 184B with a dealer signature using the dealer signing key. In embodiments in which the dealer signature is a digital signature, the splitting circuit 154, the dealer signing key is the private key of the dealer computing system 108. In other embodiments, the splitting circuit 154 encrypts or signcrypt the components 184A, 184B using at least the private key of dealer computing system 108. Signing the components 184A, 184B with the dealer signature can be used by the combining computing system 120 to authenticate the components 184A, 184B. At step 232, the splitting circuit 154 encrypts the first component 184A using the share-holder encryption key of the first share-holder 116A. At step 236, the splitting circuit 154 sends the dealer signed and encrypted first component 184A to the first share-holder 116A. At step 240, the splitting circuit 154 encrypts second component 184B using the share-holder encryption key of the second share-holder 116B. At step 244, the splitting circuit 154 sends the dealer signed and encrypted second component 184B to the share-holder 116B. In some embodiments, the components 184A, 184B may be encrypted before they are dealer signed. In such embodiments, the steps 232 and 240 occur before the step 230. Encrypting the first component 184A and the second component 184B with the share-holder encryption keys of 176A, 176B, respectively, of the recipients (e.g., the share-holder 116A, 116B, respectively) maintains the confidentiality of each of the components 184A, 184B, which in turn maintains the confidentiality of the last secret.

In some embodiments, the first share-holder 116A may verify the authenticity of the dealer signed and encrypted first component 184A using the public key of the dealer computing system 108 (e.g. when the dealer signature is a digital signature) or the dealer signing key of the dealer computing system 108. In some embodiments, the first share-holder 116A may decrypt the dealer signed and encrypted first component 184A using the share-holder encryption key established with dealer computing system 108. The first share-holder 116A may then encrypt the first component 184A using a share-holder encryption key established with the combining computing system 120 to generate a dealer signed and encrypted first component 184A that can be decrypted by the combining computing system 120. In some embodiments, the first share-holder 116A may sign a portion of the first component 184A with a share-holder signature using the share-holder signing key. In embodiments in which the share-holder signature is a digital signature, the share-holder signing key is the private key of the share-holder 116A. In other embodiments, the share-holder 116A encrypts or signcrypts the component 184A using at least the private key of the share-holder 116A. The signing computing system 120 can verify the share-holder signature to authenticate the component 184A.

In some embodiments, the second share-holder 116B may verify the authenticity of the dealer signed and encrypted second component 184B using the public key of the dealer computing system 108 (e.g. when the dealer signature is a digital signature) or the dealer signing key of the dealer computing system 108. In some embodiments, the second share-holder 116B may decrypt the dealer signed and encrypted second component 184B using the share-holder encryption key established with the dealer computing system 108. The second share-holder 116B may then encrypt the second component 184B using the share-holder encryption key established with the combining computing system 120 to generate a dealer signed and encrypted second component 184B that can be decrypted by the combining computing system 120. In some embodiments, the second share-holder 116B may sign a portion of the second component 184B with a share-holder signature using the share-holder signing key. In embodiments in which the share-holder signature is a digital signature, the share-holder signing key is the private key of the share-holder 116B. In other embodiments, the share-holder 116B encrypts or signcrypts the component 184B using at least the private key of the share-holder 116B. The signing computing system 120 can verify the share-holder signature to authenticate the component 184B.

At step 248, the combining computing system 120 starts or restarts and desires to establish a connection with the secure computing system 104. At step 252, the combining circuit 174 retrieves the dealer signed and encrypted first component 184A from the first share-holder 116A and the dealer signed and encrypted second component 184B from the second share-holder 116B. At step 256, the combining circuit 174 decrypts the dealer signed and encrypted first component 184A using the public key of the first share-holder 116A (e.g. when the share-holder signature is a digital signature) or share-holder encryption key of the first share-holder 116A. At step 260, the combining circuit 174 decrypts the dealer signed and encrypted second component 184B using the public key of the second share-holder 116B (e.g. when the share-holder signature is a digital signature) or the share-holder encryption key of the second share-holder 116B. At step 264, the combining circuit 174 authenticates the dealer signed first component 184A and the dealer signed second component 184B using the dealer signing key of the dealer computing system 108 to verify the authenticity of the dealer signatures. In some embodiments, at step 264, the combining circuit 174 authenticates the share-holder signed first component 184A and the share-holder signed second component 184B using the share-holder signing keys of the first share-holder 116A and the second share-holder 116B, respectively. In some embodiments, step 264 may occur before the steps 256 and 260. At step 268, after authenticating the first component 184A and the second component 184B, the combining circuit 174 regenerates the last secret from the first component 184A and the second component 184B using XOR. Successful regeneration of the last secret verifies the integrity of the first component 184A and the second component 184B. At step 272, the combining circuit 174 uses the last secret to access the first key of the secure computing system 104. At step 276, the combining computing system 120 communicates with the secure computing system 104 using the first key. At step 280, the last secret, the first component, and the second component are erased, and are never written to disk memory, cache memory, or any other non-volatile media.

Figure 3:
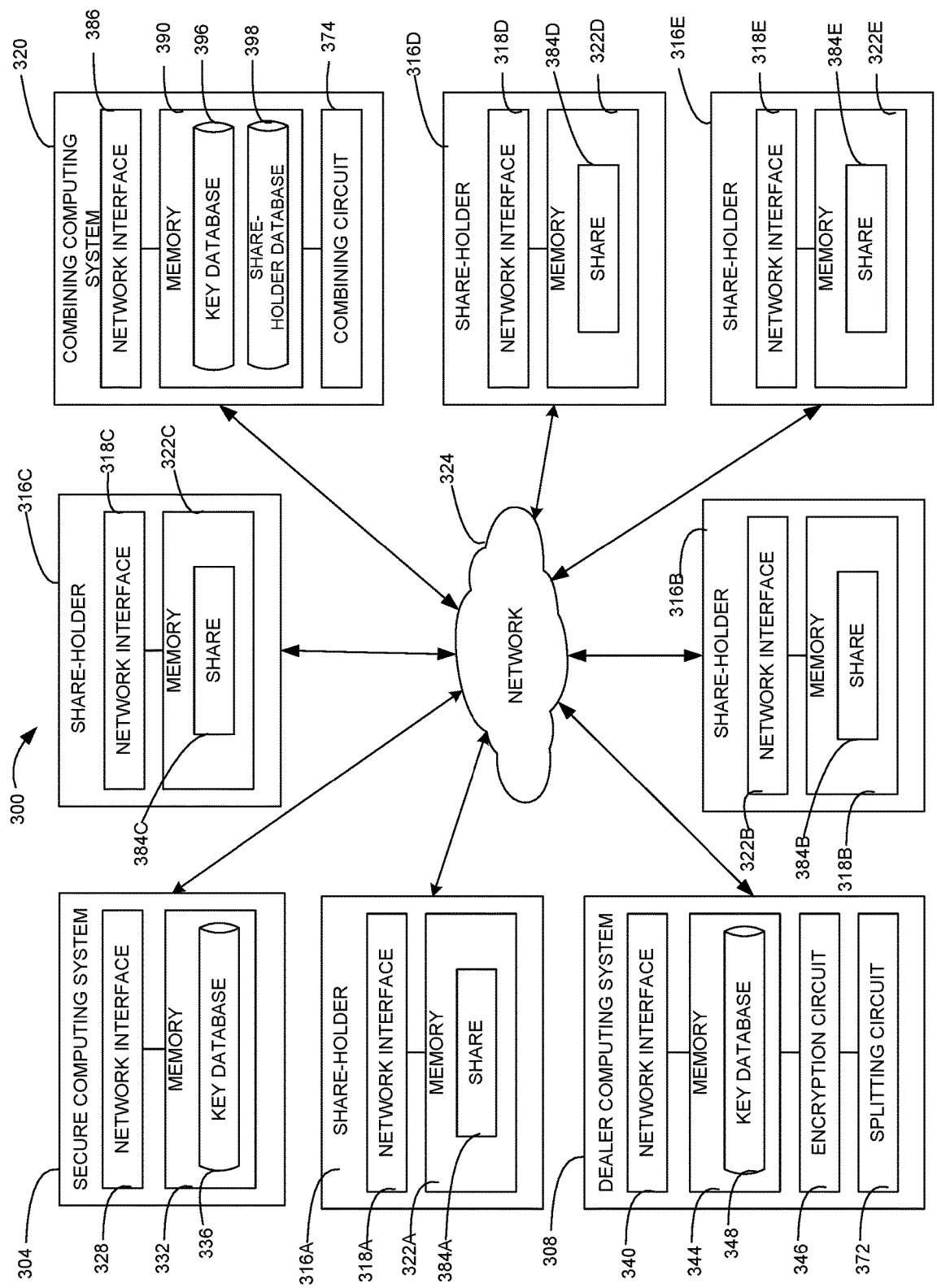
FIG. 3 is an environmental view of a system for generating a last secret and maintaining confidentiality, integrity, and authenticity of the last secret, according to one embodiment.

Referring now to FIG. 3, an environmental view of a system 300 for generating a last secret that can be stored confidentially and that can be authenticated is shown, according to an example embodiment. The last secret can be a password, an encryption key, or a tokenized value that must be provided by an entity to gain access to initialization information to start up a cryptographic process for communicating with a secure computing system 304. As shown in FIG. 3, the system 300 includes the secure computing system 304, a dealer computing system 308, share-holders 316, and a combining computing system 320 connected by a network 324. While the secure computing system 304, the dealer computing system 308, the share-holders 316, and the combining computing system 320 are shown as separate entities in FIG. 3, in some embodiments, one or more of the secure computing system 304, the dealer computing system 308, and the combining computing system 320 can be parts of the same system.

In the illustrated embodiment, the share-holders 316 include five share-holders 316A-316E. The share-holders 316A-316E are stored on different computing systems that are connected to the network 324. The share-holders 316A-316E can be writable by separate administrators and/or processes, readable by an application and/or system process, and include unique share-holder encryption keys. In the illustrated embodiment, the share-holders 316A-316E each include a network interface 318A-318E and a memory 322A-322E. In some embodiments, one or more of the share-holders 316 can be on physical media such as USB memory sticks, smart cards, etc. In some embodiments, the share-holders 316A-316E can be structured to authenticate a dealer signature of the dealer signed and encrypted shares 384 using the public key of the dealer computing system 108 (e.g. when the dealer signature is a digital signature) or the dealer signing key of the dealer computing system 108. In some embodiments, the share-holders 316A-316E each can be structured to decrypt the dealer signed and encrypted share 384A-384E stored in each of the share-holders 316A-316E using the public key of the dealer computing system 108 (e.g. when the dealer signature is a digital signature) or the dealer signing key of the dealer computing system 308. Each of the share-holders 316A-316E can then be structured to encrypt the share 384A-384E stored in each of the share-holders 316A-316E with the share-holder encryption key established with the combining computing system 320 to generate dealer signed and encrypted shares 384A-384E that can be decrypted by the combining computing system 320.

In some embodiments, each of the share-holders 316 can be structured to sign a portion of the shares 384 with a share-holder signature using a share-holder signing key of the share-holder 316. As used herein, the term "share-holder signature" refers to a digital signature, a trusted time stamp, a hash signature, a time stamp token, a MAC, and/or an HMAC. The share-holder signature can be used to authenticate each of the shares 384. In embodiments in which the share-holder signing key is a private key of the dealer computing system 308, the share-holder signature is based on the private (e.g., never shared) key of the share-holder 316. In embodiments in which the share-holder signature is a MAC or HMAC key, the share-holder signing key is a symmetric key that is unique to the share-holder and a specific recipient. In some embodiments, the specific recipient can be the combining computing system 320. In other embodiments, the share-holder 316 is structured to encrypt or signcrypt the shares 384 using at least a private key of share-holder 316. The share-holder signature of the shares 384 can be used by the combining computing system 320 to authenticate the shares 384.

The secure computing system 304 can be a database server, an application server, a file server, a mail server, a print server, a web server, and/or a game server that is in communication with other serving computing systems and/or client devices connected to the network 324. In other embodiments, the secure computing system 304 can be a computing system that includes encrypted data. The secure computing system 304 includes a network interface 328 and a memory 332. In some embodiments, the secure computing system 304 can include the dealer computing system 308. In other embodiments, the secure computing system 304 and the dealer computing system 308 can be separate entities. The network interface 328 of the secure computing system 304 is adapted for and structured to establish a communication session via the network 324 with the other components of the system 300. As shown in FIG. 3, the memory 332 is communicably and operatively coupled with the other components of the secure computing system 304. The memory includes a key database 336. The key database 336 is structured to retrievably store information related to the secure computing system's 304 encryption key. As shown in FIG. 3, the memory 332 is communicably and operatively coupled with the other components of the secure computing system 304.

The dealer computing system 308 includes a network interface 340, a memory 344, an encryption circuit 346, and a splitting circuit 372. The network interface 340 is structured to establish a communication session via the network 324 with the other components of the system 300. As shown in FIG. 3, the memory 344 is communicably and operatively coupled with the other components of the dealer computing system 308. The memory includes a key database 348 including a first key for accessing the secure computing system 304, a password, and an optional second key that have been generated by the encryption circuit 346. The password is structured to control access to the first key. In embodiments that do not include the second key, the password is the last secret. In some embodiments, the password can be encrypted using the second key. In such embodiments, the second key is the last secret. In embodiments in which the second key is the last secret, the encrypted password is stored to the memory 332 of the secure computing system 304.

The dealer computing system 308 is structured to establish share-holder encryption keys for each of the share-holders 316. In the illustrated embodiment, the dealer computing system 308 is structured to establish a share-holder encryption key for the first share-holder 316A, and a share-holder encryption key for the second share-holder 316B, a share-holder encryption key for the third share-holder 316C, a share-holder encryption key for the fourth share-holder 316D, and a share-holder encryption key for the fifth share-holder 316E. The share-holder encryption keys of the share-holders 316A-316E can be CEKs. The CEKs can be established using either CMS-based key transport or key agreement schemes. The memory 344 includes a key management database 396 structured to retrievably store information related to the dealer computing system's 308 dealer signing key and the share-holder encryption keys for each of the share-holders 316.

The splitting circuit 372 is structured to receive the last secret from the dealer computing system 308 and read the last secret into a volatile memory. The splitting circuit 372 is structured to split the last secret into a plurality of splits 384. More specifically, the splitting circuit 372 is structured to split the last secret into shares of a N of M scheme such that the splits 384 are the shares 384 of the N of M scheme. The splitting circuit 372 is structured to split the last secret into M number of shares 384. The last secret can be regenerated from a portion (e.g., N) of the M shares 384. For example, the shares 384 can be inputs to a polynomial over a finite field such as a Galois Field to regenerate the last secret. The splitting circuit 372 is then structured to erase the last secret from the volatile memory and not write the last secret to the memory 344. Splitting the last secret into the shares 384 maintains the integrity of the last secret because shares that have been altered or replaced by a malicious party cannot be recombined into the last secret. In the illustrated embodiment, the splitting circuit 372 is structured to divide the last secret according to a 3 of 5 scheme, meaning that the splitting circuit 372 divides the last secret into 5 shares 384A-384E, any three of which can be recombined to regenerate the last secret. In other embodiments, the splitting circuit 372 can divide the last secret into a different number N shares, any number M of which can be recombined to regenerate the last secret.

The splitting circuit 372 is structured to sign each of the shares 384 with the private key of the dealer computing system 308 to create a dealer signature. In other embodiments, the splitting circuit 154 is structured to encrypt or signcrypt the shares 384 using at least the private key of dealer computing system 108. The dealer signatures of the shares 384 can be used by the combining computing system 320 to authenticate the shares 384. In other embodiments, the shares 384 can be authenticated by decrypting the encryption or signcryption using the dealer signing key of the dealer computing system 108.

The splitting circuit 372 is structured to store each of the dealer signed N shares 384 in a different share-holder 316. For example, the splitting circuit 372 is structured to store each of the dealer signed shares 384A-384E in a different share-holder 316A-318E, respectively. The share-holders 316 are located on different computing systems connected to the network 324. In some embodiments, one of the share-holders 316 can be on the combining computing system 320. Accordingly, the splitting circuit 372 is structured to encrypt each of the N shares 384 using a share-holder encryption key of one of the share-holders 316. For example, the splitting circuit 372 is structured to encrypt each of the shares 384A-384E using a share-holder encryption key of one of the share-holders 316A-316E, respectively. The share-holder encryption keys of the share-holders 316 can be CEKs. The CEKs can be stablished using either CMS-based key transport or key agreement schemes. The splitting circuit 372 is structured to send the N dealer signed and encrypted shares 384 to the respective N share-holders. For example, the splitting circuit 372 is structured to send each of the dealer signed and encrypted shares 384A-384E to the respective N share-holders 316A-316E. In other embodiments, the splitting circuit 372 can be structured to encrypt each of the splits 384 with one or more share-holder encryption keys established with the combining computing system 320. Encrypting the dealer signed and encrypted shares 384 with the share-holder encryption keys of the share-holders 316 maintains the confidentiality of each of the dealer signed and encrypted shares 384, which in turn maintains the confidentiality of the last secret. The splitting circuit 372 does not encrypt the dealer signatures of the shares 384. In embodiments in which multiple last secrets need to be protected, the last secrets can be individually encrypted using a password encryption key (WEK) that is split into shares 384 according to a N of M scheme as described above for the last secret.

In some embodiments, each of the share-holders 316A-316E may verify the authenticity of the dealer signed and encrypted share 384A-384E stored in the each of the share-holders 316A-316E using the public key of the dealer computing system 308 (e.g. when the dealer signature is a digital signature) or the dealer signing key of the dealer computing system 308. In some embodiments, each of the share-holders 316A-316E may decrypt the dealer signed and encrypted share 384A-384E using the share-holder encryption key established with the dealer computing system 308. Each of the share-holders 316A-316E may then encrypt the share 384A-384E using a share-holder encryption key established with the combining computing system 320 to generate a dealer signed and encrypted split 384A-384E that can be decrypted by the combining computing system 320. In some embodiments, each share-holder 316A-316E may sign a portion of the share 384A-384E held by the share-holder 316A-316E with the share-holder signing key.

In some arrangements, each the share-holder 316A-316E is configured to write its encrypted share 384A-384E, which includes the dealer signature and the share-holder signature, to a block chain. This can serve as a verifiable record indicating the dealer computing system 308 that generated the shares 384A-384E and the share-holder 316A-316E that held each of the shares 384A-384E. In some embodiments, each of the share-holders 316A-316E can be configured to write the encrypted share 384A-384E, which includes the dealer signature and the share-holder signature, to the block chain when the share-holder 316A-316E sends the encrypted share 384A-384E to the combining computing system 320 to save a verifiable record of when the encrypted share 384A-384E was sent to the combining computing system 320.

The combining computing system 320 can be a computing system or can be a part of a computing system that desires to access the secure computing system 304. For example, in embodiments in which the secure computing system 304 is an application server or a database, the combining computing system 320 may run an application or program that needs to access the secure computing system 304. The combining computing system 320 includes a network interface 386, a memory 390, and a combining circuit 374. The memory 390 can include a key management database 396 and a share-holder database 398. The key management database 396 can include the public key of the dealer computing system 308 (e.g. when the dealer signature is a digital signature) or the dealer signing key of the dealer computing system 308 and the share-holder encryption keys established with each of the share-holders 316. The share-holder database 398 can include a list of the names and locations (e.g., IP addresses) of the share-holders 316 on the network 324 that include the dealer signed and encrypted shares 384 of the last secret.

The combining circuit 374 is structured to receive at least N dealer signed and encrypted splits from the plurality of share-holders 316. For example, in some embodiments, the combining circuit 374 can be structured to send a request to all of the share-holders 316A-316E to send their dealer signed and encrypted shares 384A-384E to the combining circuit 374. The combining circuit 374 is structured to generate a log of the dealer signed and encrypted shares 384 received by combining computing system 320 and save the log to the memory 390. The log can include an identifier of the each of dealer signed and encrypted shares 384 received and/or an identifier of the share-holders 316 that sent each of the dealer signed and encrypted shares 384, and a timestamp. After receiving N dealer signed and encrypted shares 384, the combining circuit 374 is structured to decrypt each of the N dealer signed and encrypted shares 384 using the share-holder encryption keys of the share-holders 316 that provided the N dealer signed and encrypted shares 384. If more than N dealer signed and encrypted shares 384 are received, the first N shares are used. For example, N shares can include the dealer signed and encrypted first share 384A, the dealer signed and encrypted third share 384C, and the dealer signed and encrypted fifth share 384E and encrypt the dealer signed and encrypted shares 384A, 384C, 384E with the share-holder encryption keys of the first share-holder 316A, the third share-holder 316C, and the fifth share-holder 316E, respectively. In some embodiments, the combining circuit can be structured to destroy all of the received dealer signed and encrypted shares 384 if less than N dealer signed and encrypted shares 384 have been received after a predetermined time period.

The combining circuit 374 is structured to authenticate the N shares 384 by verifying the dealer signature on each of the shares 384 using the public key of the dealer computing system 308 (e.g. when the dealer signature is a digital signature) or the dealer signing key of the dealer computing system 308. In other embodiments, the combining circuit 374 is structured to authenticate the N shares 384 by decrypting the encryption or signcryption using the public key of the dealer computing system 308 (e.g. when the dealer signature is a digital signature) or the dealer signing key of the dealer computing system 308. In embodiments in which the shares 384 include a share-holder signature, the combining circuit 374 is structured to verify the share-holder signature of each of the shares 384A-384E using the share-holder signing key of the share-holder 384A-384E that sent the share 384A-384E to verify integrity and authenticity of the shares 384A-384E.

The combining circuit 374 is structured to combine the N shares 384 to regenerate the last secret. For example, the combining circuit 374 can combine the first share 384A, the third share 384C, and the fifth share 384E to regenerate the last secret. For example, the combining circuit 374 can use the first share 384A, the third share 384C, and the fifth share 384E as inputs into a polynomial function that is over a finite field (e.g., a Galois Field). Successful regeneration of the last secret verifies the integrity of each of the first share 384A, the third share 384C, and the fifth share 384E because shares that have been modified and/or replaced by a third party cannot be combined to regenerate the last secret. The combining computing system 320 can then use the last secret to access the first key of the secure computing system 304. The combining computing system 320 can then communicate with the secure computing system 304 using the first key. The combining circuit 374 is structured to destroy the last secret and the received shares 384 and save a log of the destruction to the memory 390.

Figure 4A:
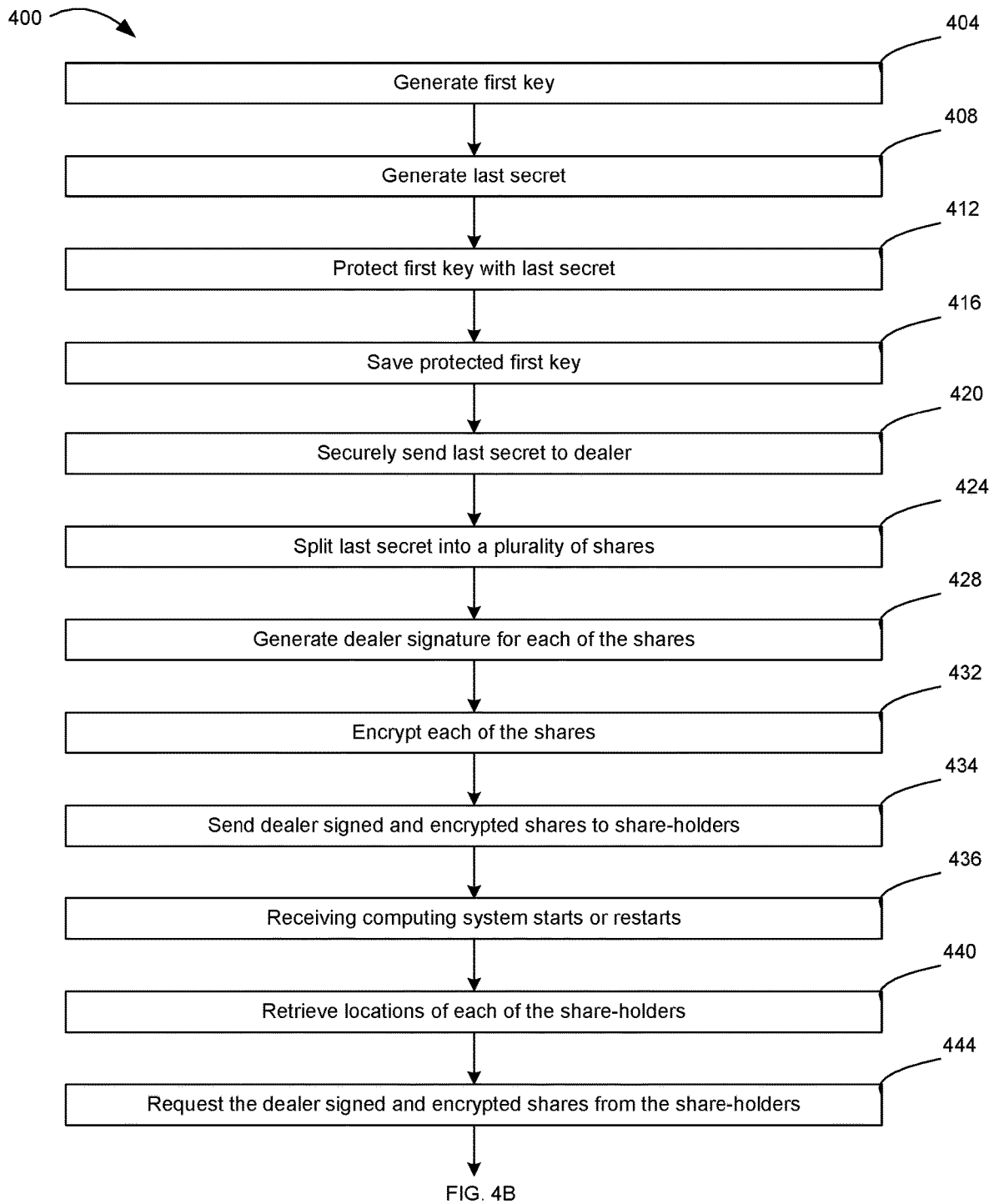
FIGS. 4A and 4B are flow diagrams showing a process of generating and sharing the last secret while maintaining confidentiality, integrity, and authenticity of the last secret, according to one embodiment.
Figure 4B:
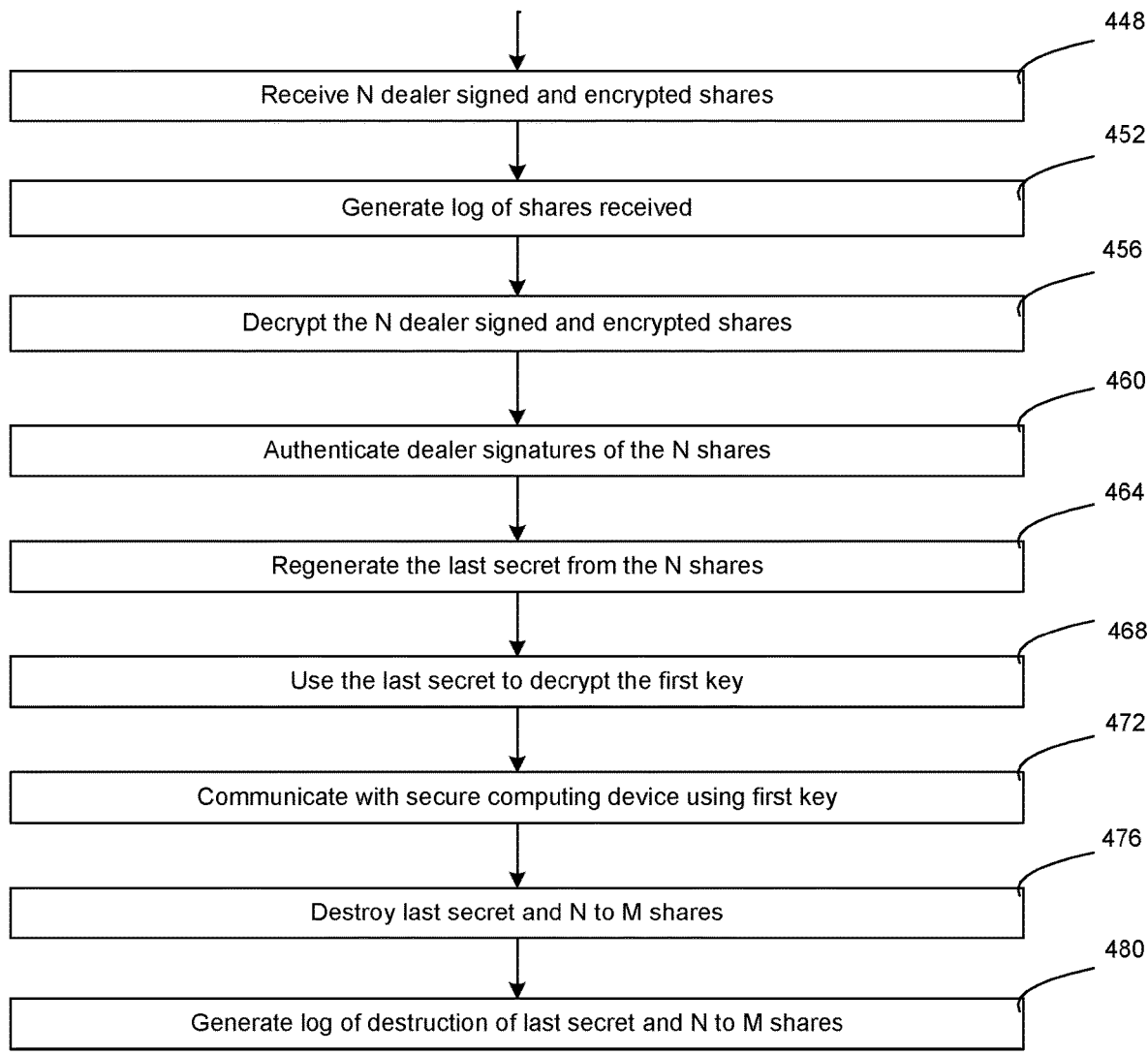

Referring now to FIG. 4, a flow diagram of a method 400 for maintaining the confidentiality, integrity, and authenticity of initialization information to start up a cryptographic process is shown, according to an example embodiment. At step 404, the first key for a secure computing system 304 is generated by the encryption circuit 346. At step 408, the last secret is generated by the encryption circuit 346. At step 412, the first key is protected with the last secret. At step 416, the protected first key is saved to the memory 332 of the secure computing system 304. At step 420, the last secret is sent to the dealer computing system 308. At step 424, the last secret is split into a plurality of shares 384 according to a N of M scheme. For example, in the illustrated embodiment, the last secret is split according to a 3 of 5 scheme, meaning that the last secret is split into five shares, 384A-384E, any three of which can be combined to regenerate the last secret. In other embodiments, the last secret may be split into a different number of N of M shares, a different number of which can be combined to regenerate the last secret. Splitting the last secret into the shares 384 maintains the integrity of the last secret because shares that have been altered or replaced by a malicious party cannot be recombined into the last secret.

At step 428, the splitting circuit 372 signs a portion of each of the shares 384 with a dealer signature using the dealer signing key. In embodiments in which the dealer signature is a digital signature, the dealer signing key is the private key of the dealer computing system 308. In other embodiments, the splitting circuit 372 encrypts or signcrypts the components 184A, 184B using at least the private key of the dealer computing system 108. The dealer signatures of the shares 384 can be used by the combining computing system 120 to authenticate the shares.

At step 432, the splitting circuit 372 encrypts each of the shares 384 with the share-holder encryption key of one of the plurality of share-holders 316. Encrypting the shares 384 with the share-holder encryption the share-holders 316 maintains the confidentiality of each of the shares 384, which in turn maintains the confidentiality of the last secret. At step 434, the splitting circuit 372 sends each of the dealer signed and encrypted shares 384 to the respective share-holders 316. In some embodiments, the step 432 can be done before the step 428.

In some embodiments, each of the share-holders 316A-316E may verify the authenticity of the dealer signed and encrypted shares 384A-316E, respectively, using the dealer signing key of the dealer computing system 308. In some embodiments, each of the share-holders 316A-316E may decrypt the dealer signed and encrypted share 384A-384E using a share-holder encryption key established with the dealer computing system 308. Each of the share-holders 316A-316E may then encrypt the shares 384A-384E using a share-holder encryption key established with the combining computing system 320 to generate a dealer signed and encrypted shares 384A-384E that can be decrypted by the combining computing system 320. In some embodiments, each of the share-holders 316A-316E may sign a portion of the shares 384A-384E, respectively, signature using the share-holder signing key of the share-holder 316A-316E. In embodiments in which the share-holder signature is a digital signature, the share-holder signing key is the private key of the share-holder 316A-316E. In other embodiments, the share-holders 316A-316E encrypt or signcrypt the share 384A-384E, respectively, using at least the private key of the share-holder 316A-316E. Signing the share 384A-384E with the share-holder signature can be used by the combining computing system 120 to authenticate shares 384A-384E.

At step 436, the combining computing system 320 starts up and desires to establish a connection with the secure computing system 304. At step 440, the combining computing system 320 retrieves the locations of each of the plurality of share-holders 316 from the memory 390. At step 444, the combining computing system 320 sends requests to each of the plurality of share-holders 316 asking the plurality of share-holders 316 to send their dealer signed and encrypted shares 384 to the combining computing system 320. At step 448, the combining computing system 320 receives N to M dealer signed and encrypted shares. In some embodiments, the combining computing system 320 may receive N shares or more than N dealer signed and encrypted shares (e.g., up to M shares). In embodiments in which the combining computing system 320 receives more than N dealer signed and encrypted shares 384, the combining computing system 320 uses the first N dealer signed and encrypted shares 384 received. For example, in the illustrated embodiment, the combining computing system 320 can receive the dealer signed and encrypted first share 384A, the dealer signed and encrypted third share 384C, and the dealer signed and encrypted fifth share 384E. At step 452, the combining computing system 320 generates a log of the N to M dealer signed and encrypted shares 384 received and saves the log to the memory 390. The log can include an identifier of the each of dealer signed and encrypted shares 384 received and/or an identifier of the share-holders 316 that sent each of the dealer signed and encrypted shares 384, and a timestamp. In some instances, at step 448, the combining computing system 320 may receive less than N splits at step 448. In such instances, the combining computing system 320 generates the log of the dealer signed and encrypted shares 384 at step 452. The method 400 does not progress to step 456. In some embodiments, after N dealer signed and encrypted shares 384 have not been received in a predetermined time period, the combining computing system 320 can destroy all of the dealer signed and encrypted shares 384 and log the destruction of the received dealer signed and encrypted shares 384.

At step 456, the combining computing system 320 decrypts the first N dealer signed and encrypted shares using the respective share-holder encryption keys of the N share-holders 316 that provided the N dealer signed and encrypted shares. At step 460, the combining computing system 320 authenticates the dealer signatures of the N dealer signed shares using the dealer signing key of the dealer computing system 308. For example, the combining computing system 320 may use the public key of the dealer computing system 308 (e.g. when the dealer signature is a digital signature) or the dealer signing key of the dealer computing system 308 to verify the portions of the first share 384A, the third share 384C, and the fifth share 384E that have been dealer signed by the dealer computing system 308. In embodiments in which the share-holders 316A-316E sign the shares, the combining computing system 320 authenticates the share-holder signed shares 384A-384E using the share-holder signing keys of the share-holders 316A-316E, respectively. For example, the combining computing system 320 may use the share-holder signing keys of the first share-holder 316A, the third share-holder 316C, and the fifth share-holder 316E to verify the share-holder signatures of the first share 384A, the third share 384C, and the fifth share 384E, respectively. In some embodiments, the combining computing system 320 may perform the step 460 before the step 456. At step 464, the combining computing system 320 regenerates the last secret from the N shares. For example, the combining computing system 320 may provide the N shares as the inputs of a polynomial function that can regenerate the last secret. Successful regeneration of the last secret verifies the integrity of the N shares 384. At step 468, the combining computing system 320 uses the last secret to decrypt the first key of the secure computing system 304. At step 472, the combining computing system 320 communicates with the secure computing system 304 using the first key. At step 476, the last secret and the N to M the shares 384 received by the combining computing system 320 are is erased, and is never written to disk memory, cache memory, or any other non-volatile media. At step 480, the combining computing system 320 logs the destruction of the last secret and each of the N to M shares 384 received by the combining computing system in the memory 390.

An advantage of the above-described methods is that each of the dealer signed and encrypted splits 184, 384 can be individually encrypted with a key specific to the combining computing system 120, 320 and dealer signed using key(s) established between the dealer computing system 108, 308 that generated the splits 184, 384 and the combining computing system 320. The key(s) established between the dealer computing system 108, 308 and the combining computing system 120, 320 can be CEKs established using either CMS-based key transport or key agreement schemes. In some embodiments, the key(s) can include symmetric key pairs. In some embodiments, the key(s) can include asymmetric key pairs. Accordingly, the dealer signed and encrypted splits 184, 384 can be stored in a share-holder location that is public. For example, the dealer signed and encrypted splits 184, 384 can be stored central location such as a last secret blockchain because only the combining computing system 120, 320 can decrypt each of the dealer signed and encrypted splits 184, 384, verify the dealer signature, and regenerate the last secret based on the splits 184, 384. The location of the dealer signed and encrypted splits 184, 384 can be identified by an identifier, such as a block ID (e.g., a hash of a previous block header), block number, time stamp, uniform resource locator ("URL"), or another type of identifier. An additional advantage of the last secret blockchain is that blockchains are very difficult to modify, so it is possible to keep an accurate history of the last secrets, for example for a key management system. For example, successive blocks in the last secret blockchain can indicate the previous dealer signed and encrypted splits 184, 384 and the time periods that these previous dealer signed and encrypted splits 184, 384 were valid.

Figure 5:
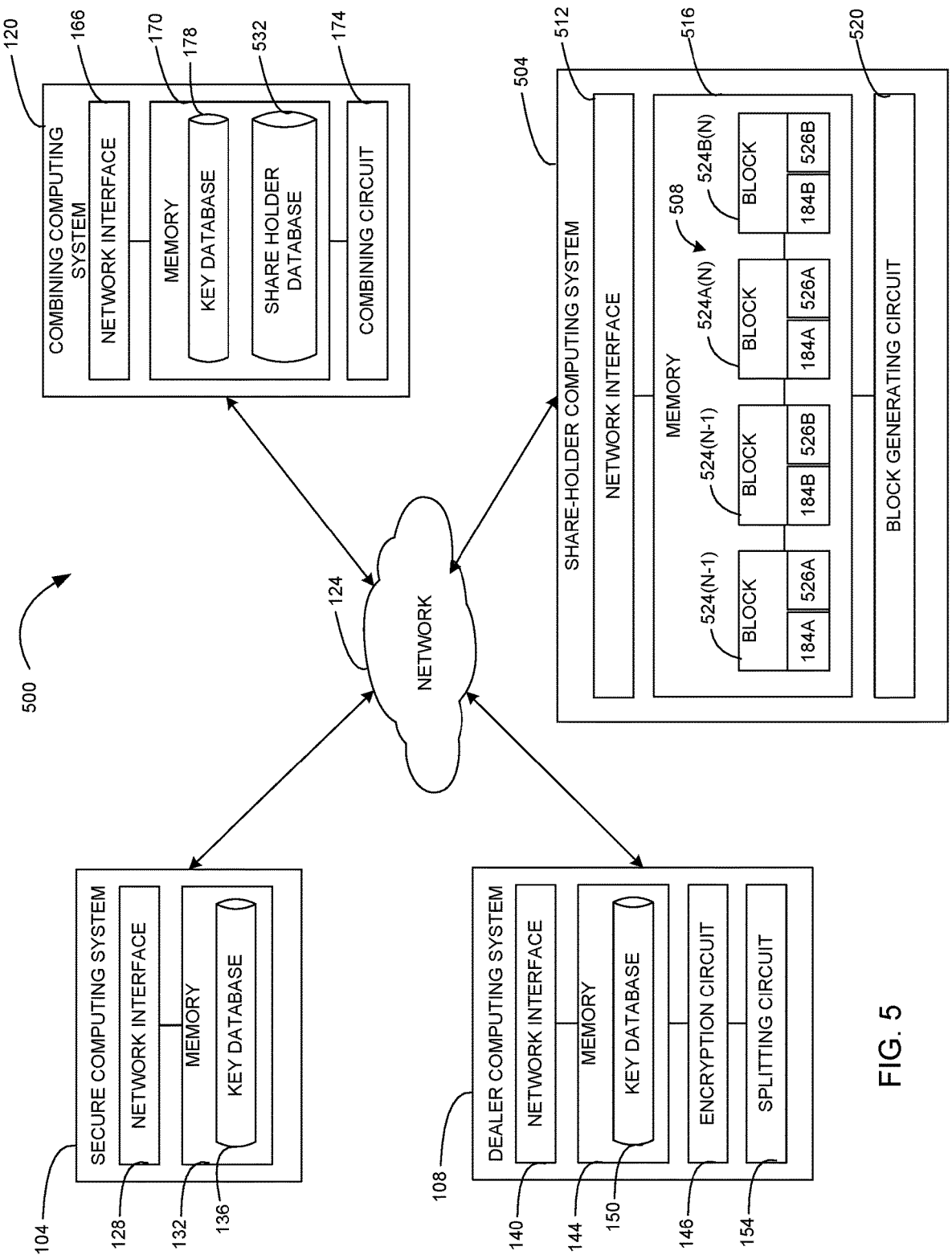
FIG. 5 is an environmental view of a system for generating a last secret, storing the last secret in a blockchain, and maintaining confidentiality, integrity, and authenticity of the last secret, according to one embodiment.

FIG. 5 illustrates an environmental view of a system 500 for generating a last secret that can be stored in a blockchain, according to an example embodiment. The system 500 is substantially similar to the system 100, so like parts will be indicated using the same numbers as used in the system 100. As shown in FIG. 5, the system 500 includes the secure computing system 104, a dealer computing system 108, one or more share-holders 504, and a combining computing system 120 connected by a network 124. In the illustrated embodiment, the one or more share-holders 504 is one or more last secret blockchains 508. For the sake of brevity, only features of the secure computing system 104, the dealer computing system 108, and the combining computing system 120 that are different than what is described with the system 100 are described in detail below.

The share-holder 504 is a share-holder computing system. The share-holder computing system 504 includes a network interface 512, a memory 516, and a block-generating circuit 520. The network interface 512 is structured to establish a communication session via the network 124 with the other components of the system 500. As shown in FIG. 5, the memory 516 includes the last secret blockchain 508. The last secret blockchain 508 includes a plurality of blocks 524, one or more of which can include a dealer signed and encrypted split 184 and a block ID 526, which includes a hash of the block header of the previous block. The plurality of blocks 524 can also include information indicative of an identity of the dealer computing 108 system and/or information indicative of an identity of the combining computing system 120. In the illustrated embodiment, each of the encrypted splits 184 is a component generated using an N of N scheme as described above with respect to the system 100. In the illustrated embodiment, the last secret blockchain 508 includes a first block 524A including the dealer signed and encrypted first component 184A and a second block 524B including the dealer signed and encrypted second component 184B. The hashes indicate previous blocks. A relying party may use the hash to verify the integrity of the data written to the last secret blockchain 508 and to locate a particular block of the last secret blockchain 508.

The memory 170 of the combining computing system 120 can include a share-holder database 532, which can include a location of the last secret blockchain 508 and the blocks 524A, 524B that include the dealer signed and encrypted components 184A, 184B. The combining circuit 174 is structured to retrieve the dealer signed and encrypted components 184A, 184B from the blocks 524A, 524B of the last secret blockchain 508, respectively, decrypt the dealer signed and encrypted components 184A, 184B using the key(s) established between the dealer computing system 108 and the combining computing system 120 of the dealer computing system 108, verify the dealer signatures of the components 184A, 184B using the public key of the dealer computing system 108 (e.g. when the dealer signature is a digital signature) or the dealer signing key of the dealer computing system 108, and combine the components 184A, 184B to regenerate the last secret as described above with respect to the system 100.

Figure 6A:
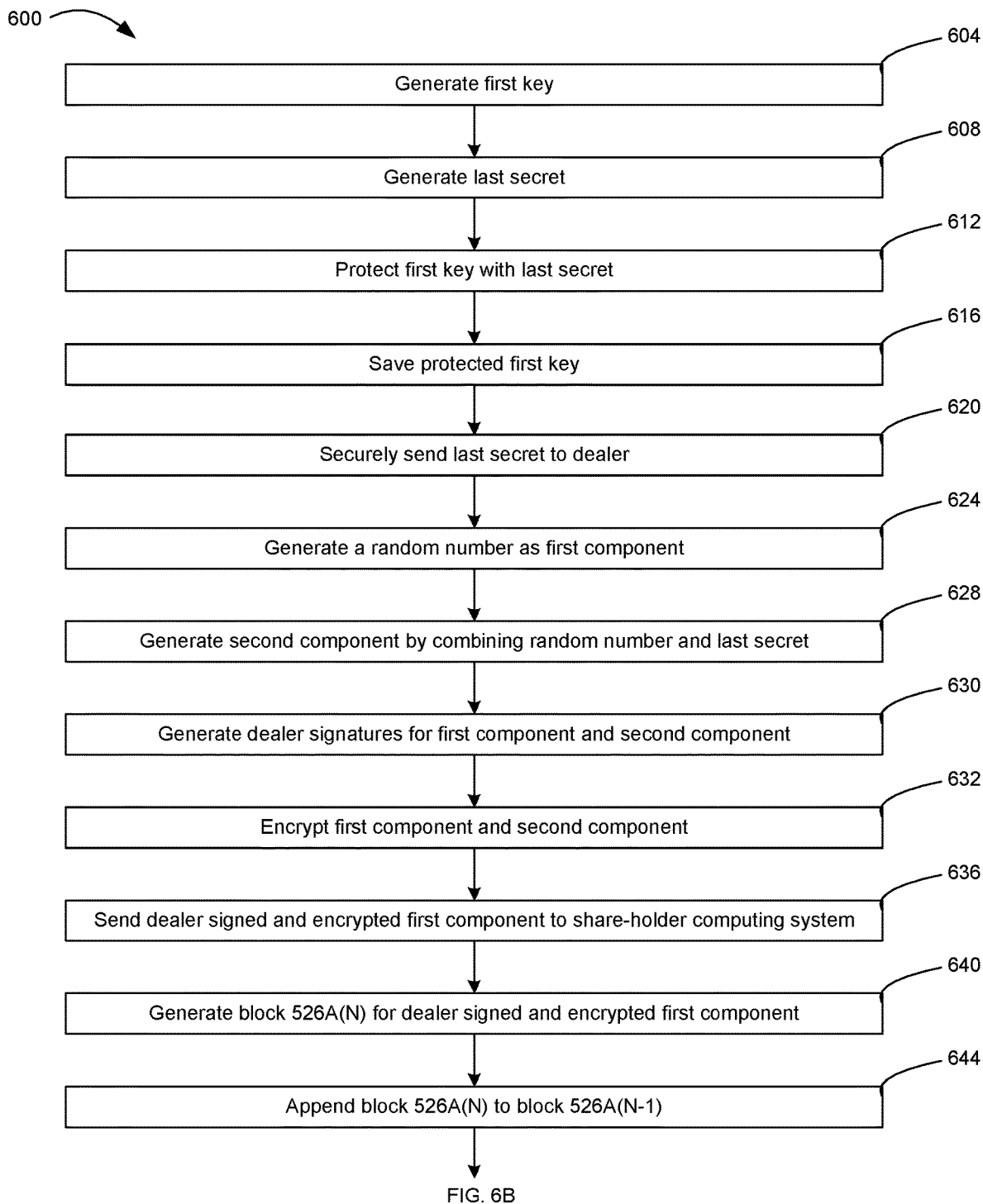
FIGS. 6A and 6B are flow diagrams showing a process of generating the last secret, storing the last secret in a blockchain, and sharing the last secret while maintaining confidentiality, integrity, and authenticity of the last secret, according to one embodiment.
Figure 6B:
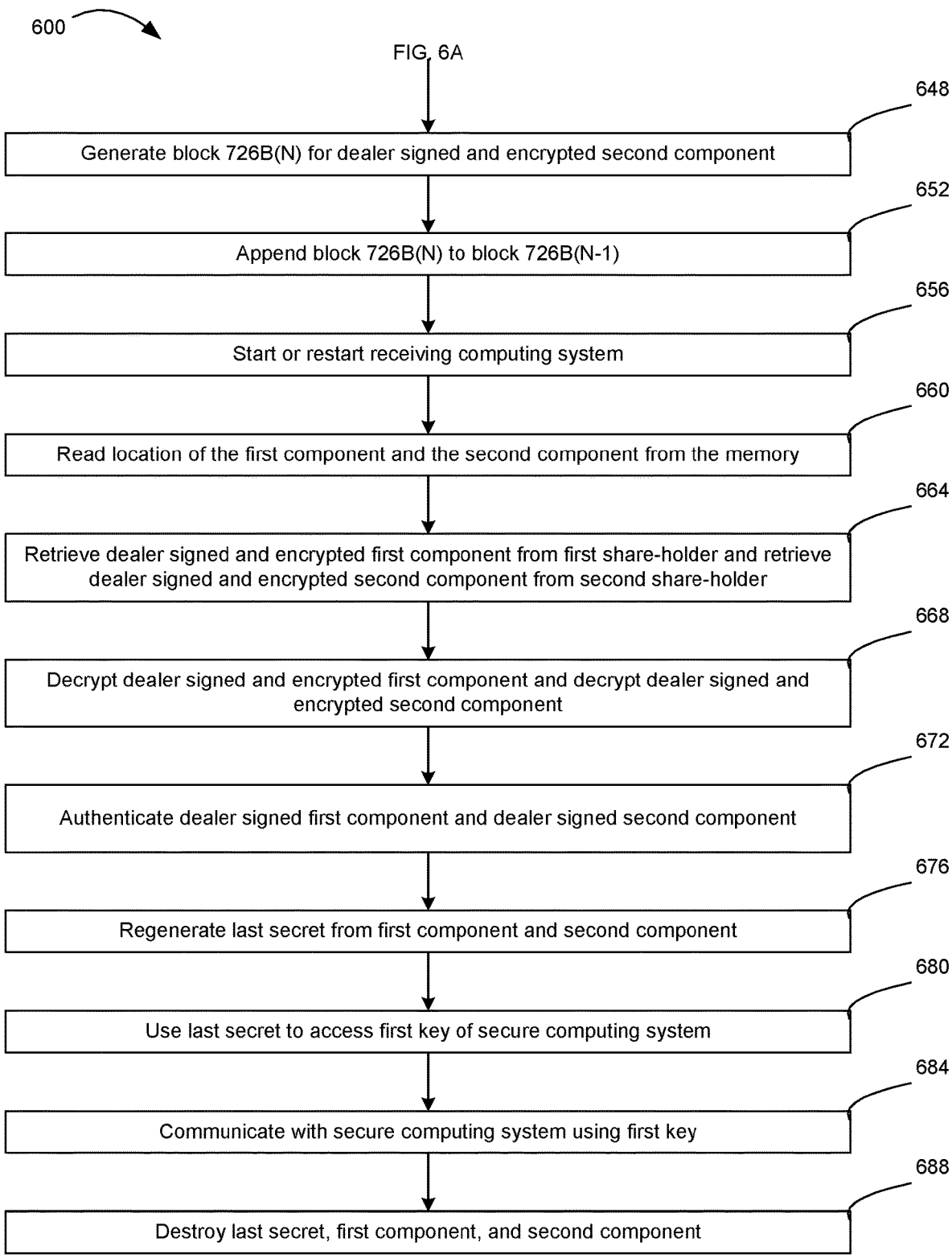

Referring now to FIG. 6, a flow diagram of a method 600 for maintaining the confidentially, authenticity, and integrity of a last secret is shown, according to an example embodiment. Steps 604-628 of the method 600 are substantially the same as steps 204-228 of the method 200. Steps 604-628 and are shown in FIG. 6 but will not be described in detail herein.

At step 632, the splitting circuit 154 encrypts the first component 184A and the second component 184B with the encryption key(s) established with the combining computing system 120. At step 636, the splitting circuit 154 sends the dealer signed and encrypted first component 184A and the dealer signed and encrypted second component to the shareholder computing system 504. At step 640, the share-holder computing system 504 generates the block 524A$_N$ for the dealer signed and encrypted first component 184A. The block 524A$_N$ includes the dealer signed and encrypted first component 184A, the hash, and a time stamp. The hash indicates a previous block 524A$_{N-1}$ corresponding to a previous iteration of the dealer signed and encrypted first component. At step 644, the share-holder computing system 504 appends the block 524A$_N$ to the block 524A$_{N-1}$. At step 648, the share-holder computing system 504 generates a block 524B$_N$ for the second component 184B. The block 524B$_N$ includes the dealer signed and encrypted second component 184B, the hash, and the time stamp. The hash indicates a previous block 524B$_{N-1}$ corresponding to a previous iteration of the dealer signed and encrypted second component 184B. At step 652, the share-holder computing system 504 appends the block 524B$_N$ to the block 524$_{N-1}$.

At step 656, the combining computing system 120 starts or restarts and desires to establish a connection with the secure computing system 104. At step 660, the combining computing system 120 reads the location of the last secret blockchain 508, the block 524A$_N$ that includes the dealer signed and encrypted first component 184A, and the block 524B$_N$ that includes the dealer signed and encrypted second component 184B from the last secret blockchain 508. At step 664, the combining circuit 174 retrieves the dealer signed and encrypted first component 184A from the block 524A$_N$ and the dealer signed and encrypted second component 184B from the block 524A$_N$. At step 668, the combining circuit 174 decrypts the dealer signed and encrypted first component 184A and the dealer signed and encrypted second component 184B using the key established between the dealer computing system 108 and the combining computing system 120. At step 672, the combining circuit 174 authenticates the dealer signature of the first component 184A and the dealer signature of the second component 184B using the dealer signing key of the dealer computing system 108 to verify the authenticity of the components 184A, 184B. In some embodiments, the combining circuit 174 may perform the step 672 before the step 668. At step 676, after authenticating the first component 184A and the second component 184B, the combining circuit 174 regenerates the last secret from the first component 184A and the second component 184B using XOR. Successful regeneration of the last secret verifies the integrity of the first component 184A and the second component 184B. At step 680, the combining circuit 174 uses the last secret to decrypt the first key of the secure computing system 104. At step 684, the combining computing system 120 communicates with the secure computing system 104 using the first key. As step 688, the last secret, the first component, and the second component are erased, and are never written to disk memory, cache memory, or any other non-volatile media.

Figure 7:
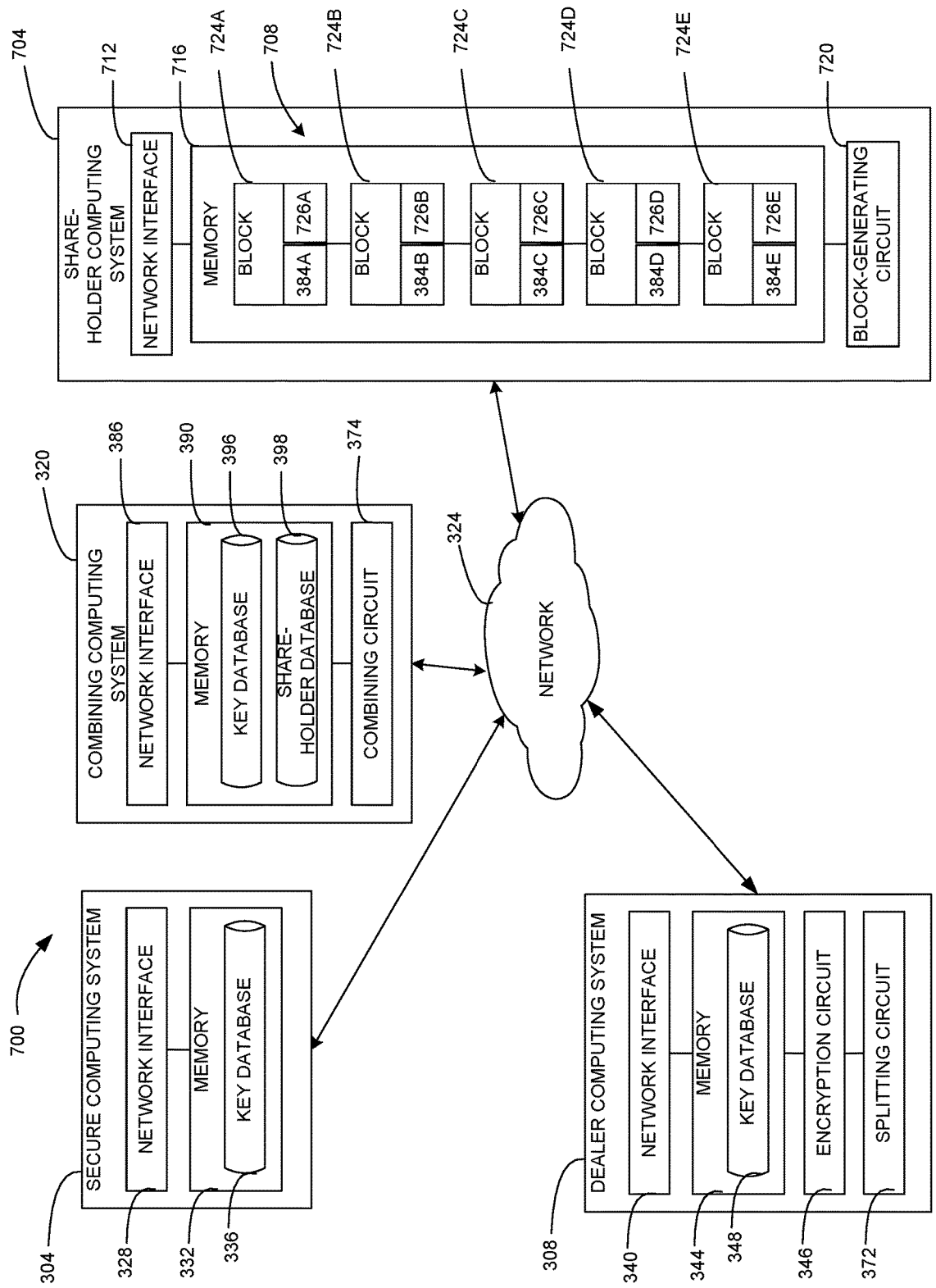
FIG. 7 is an environmental view of a system for generating a last secret, storing the last secret in a blockchain, and maintaining confidentiality, integrity, and authenticity of the last secret, according to one embodiment.

FIG. 7 illustrates an environmental view of a system 700 for generating a last secret that can be stored in a blockchain, according to an example embodiment. The system 700 is substantially similar to the system 300, so like parts will be indicated using the same numbers as used in the system 300. As shown in FIG. 7, the system 700 includes the secure computing system 304, the dealer computing system 308, one or more share-holders 704, and the combining computing system 320 connected by the network 324. In the illustrated embodiment, the one or more share-holders 704 is one or more last secret blockchains 708. For the sake of brevity, only features of the secure computing system 304, the dealer computing system 308, and the combining computing system 320 that are different than what is described with the system 300 are described in detail below.

The share-holder 704 is a share-holder computing system. The share-holder computing system 704 includes a network interface 712, a memory 716, and a block-generating circuit 720. The network interface 712 is structured to establish a communication session via the network 324 with the other components of the system 700. As shown in FIG. 7, the memory 716 includes the last secret blockchain 708. The last secret blockchain 708 includes a plurality of blocks 724 that each include a dealer signed and encrypted split 384 and a block ID 726, which includes a hash of the block header of the previous block. In the illustrated embodiment, each of the encrypted splits 384 is a share generated using an N of M scheme as described above with respect to the system 300. The hash indicates the previous block 724$_{N-1}$. A relying party such as the combining computing system 320 may use the hashes to view a history of modifications to and/or replacement of the encrypted shares 384.

The block-generating circuit 720 is structured to receive the dealer signed and encrypted shares 384 from the dealer computing system 308. The block-generating circuit 720 is structured to generate a block 724$_N$ for each of the dealer signed and encrypted shares 384. Each block 724$_N$ includes one of the dealer signed and encrypted shares 384, the hash indicating a block 724$_{N-1}$ corresponding to the previous dealer signed and encrypted share 384, and a time stamp. The plurality of blocks 724 can also include information indicative of an identity of the dealer computing system 308 and/or information indicative of an identity of the combining computing system 320 in their headers. FIG. 7 illustrates an embodiment in which the last secret has been split into 5 shares 384A-384E as described above with respect to the system 300. As illustrated in FIG. 7, a first block 724A$_N$ corresponds to the dealer signed and encrypted first share 384A, a second block 724B$_N$ corresponds to the dealer signed and encrypted second share 384B, a third block 724C$_N$ corresponds to the dealer signed and encrypted third share 384C, a fourth block 724D$_N$ corresponds to the dealer signed and encrypted fourth share 384D, and a fifth block 724E$_N$ that corresponds to the dealer signed and encrypted fifth share 384E. As illustrated in FIG. 7, the last secret blockchain 708 can also include a plurality of blocks 724A$_{N-1}$-724E$_{N-1}$ corresponding to previous shares 384A-384E, respectively. The hash of each of the blocks 724A$_N$-724E$_N$ includes a reference to the blocks 724A$_{N-1}$-724E$_{N-1}$, respectively.

The memory 390 of the combining computing system 320 includes a share-holder database 398, which can include a location of the last secret blockchain 708 and the blocks 524 that include the dealer signed and encrypted shares 384, respectively. The combining computing system 120 is structured to retrieve the location of the last secret blockchain 708 from the memory 390. The combining computing system 320 is structured to request the dealer signed and encrypted shares 384 from the last secret blockchain 708. In response to receiving N of the M shares, 384 the combining circuit 374 is structured to decrypt the N shares 384 using the private key of the combining computing system 320. The combining circuit 374 then authenticates the dealer signature and regenerates the last secret as described above with respect to the system 300.

Figure 8A:
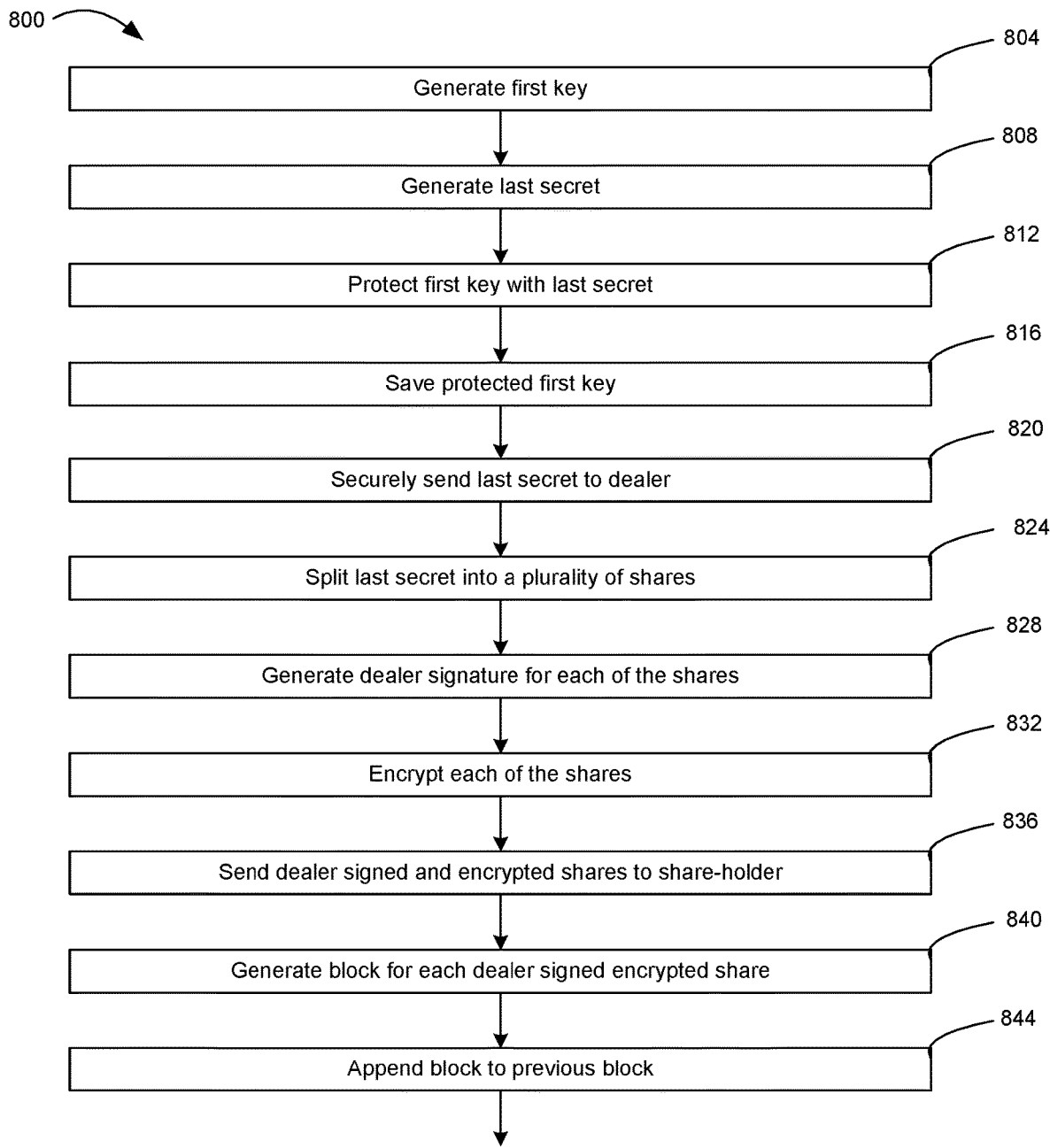
FIGS. 8A and 8B are flow diagrams showing a process of generating the last secret, storing the last secret in a blockchain, and sharing the last secret while maintaining confidentiality, integrity, and authenticity of the last secret, according to one embodiment.
Figure 8B:
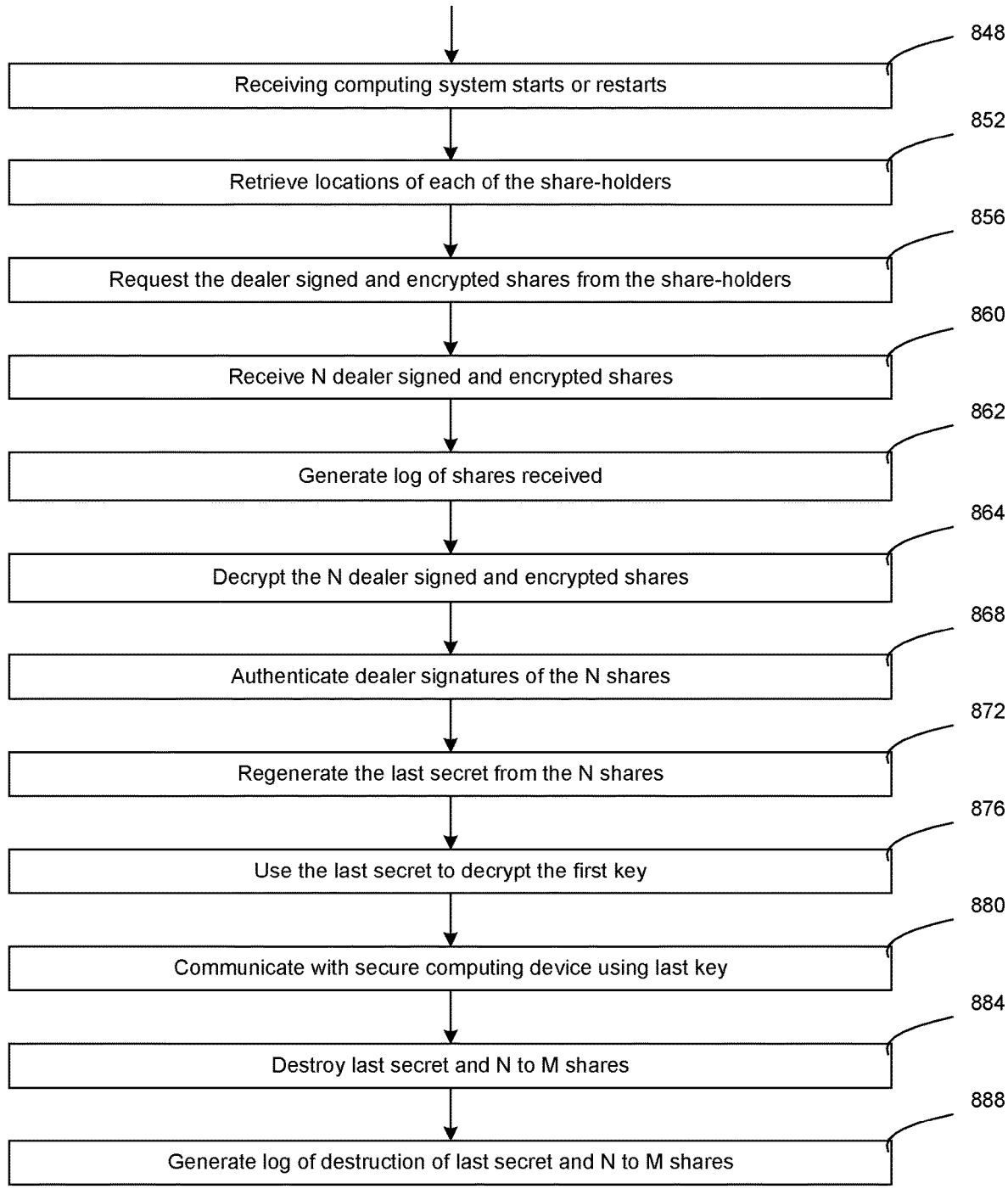

Referring now to FIG. 8, a flow diagram of a method 800 for maintaining the confidentiality, integrity, and authenticity of initialization information to start up a cryptographic process is shown, according to an example embodiment. Steps 804-828 of the method 800 are substantially the same as steps 404-428 of the method 400. Steps 804-828 and are shown in FIG. 8 but will not be described in detail herein.

At step 832, each of the shares 384 is encrypted with an encryption key that has been established with the combining computing system 320. At step 836, the dealer computing system 308 sends the shares 384 to the share-holder computing system 704. At step 840, the share-holder computing system 704 generates a block 724 for each the dealer signed and encrypted shares 384. For example, each of the blocks $724A_N$-$724E_N$ includes the dealer signed and encrypted shares 384A-384E, respectively, the hashes, respectively, and a time stamp. The hashes indicate a previous block $724A_{N-1}$-$724E_{N-1}$, respectively, which corresponds to a previous iteration of the shares 384A-384E, respectively. At step 844, the block-generating circuit 720 appends the block $724_N$ to the block $724_{N-1}$. For example, the block-generating circuit 720 can append the blocks $724A_N$-$724E_N$ to the blocks $724A_{N-1}$-$724E_{N-1}$, respectively.

At step 848, the combining computing system 320 starts up and desires to establish a connection with the secure computing system 304. At step 852, the combining computing system 320 retrieves the location of the last secret blockchain 708 and the locations (e.g., the blocks $724_N$) of the dealer signed and encrypted shares 384 from the memory 390. At step 856, the combining computing system 320 requests that the share-holder computing system 704 send the dealer signed and encrypted shares 384 from the last secret blockchain 708. At step 860, the combining computing system 320 determines that N dealer signed and encrypted shares have been received. At step 862, the combining computing system 320 generates a log of the N to M dealer signed and encrypted shares 384 received and saves the log to the memory 390. The log can include an identifier of the each of dealer signed and encrypted shares 384 received and/or an identifier of the share-holders 316 that sent each of the dealer signed and encrypted shares 384, and a timestamp. In some instances, the combining computing system 320 may receive less than N splits at step 448. In such instances, the combining computing system 320 generates the log of the dealer signed and encrypted shares 384 at step 862. The method 800 does not progress to step 864. In some embodiments, after N dealer signed and encrypted shares 384 have not been received in a predetermined time period, the combining computing system 320 can destroy all of the dealer signed and encrypted shares 384 and log the destruction of the received dealer signed and encrypted shares 384. If more than N shares 384 are received, the combining computing system 320 uses the first N shares 384.

At step 864, the combining computing system 320 decrypts the N dealer signed and encrypted shares using the private key of the combining computing system 320. At step 868, the combining computing system 320 authenticates the dealer signatures of the N shares using the dealer signing key of the dealer computing system 308. In some embodiments, the combining computing system 320 may perform the step 868 before the step 864. At step 872, the combining computing system 320 regenerates the last secret from the N shares. For example, the combining computing system 320 may provide the N shares as the inputs of a polynomial function that can regenerate the last secret. Successful regeneration of the last secret verifies the integrity of the N shares 384 because shares 384 that have been modified and/or replaced by a third party cannot be recombined into the last secret. At step 876, the combining computing system 320 uses the last secret to decrypt the first key of the secure computing system 304. At step 880, the combining computing system 320 communicates the secure computing system 304 using the first key. At step 884, the last secret, and the N to M shares received are erased, and is never written to disk memory, cache memory, or any other non-volatile media. At step 888, the combining computing system 320 logs the destruction of the last secret and each of the N to M shares 384 received by the combining computing system 320 in the memory 390.

In some embodiments, any of the secure computing systems 104, 304 can grant access to a digital currency. In such an embodiment, the combining computing system 120, 320 can be require access to a predetermined number of the dealer signed and encrypted splits 184, 384, in order to unlock the last secret for communicating with the secure computing system 104, 304. In such an embodiment, the dealer computing system 108, 308 may encrypt the dealer signed splits 184, 384 with the encryption key established with the combining computing system 120, 320. The entity giving the digital currency may retain the location (e.g., the location of the last secret blockchain 508, 708 and/or the specific blocks 524, 724 of the last secret blockchain 508, 708 that include the at least one dealer signed and encrypted splits 184, 384) until the entity receiving the digital currency has completed the terms of the contract.

In some embodiments, any of the secure computing systems 104, 304 can grant access to a biometric stored on the secure computing system 104, 304. For example, the secure computing system 104, 304 can be personal computing system such as a mobile phone, a laptop or desktop computing system, a tablet computing system, an internet-of-things (IoT) device, etc. The personal computing system can also be the combining computing system 120, 320. The dealer computing systems 108, 308 can divide the last secret into the split(s) 184, 384 as described above with respect to the methods 200, 400 by the dealer computing system 108, 308. The dealer computing system 108, 308 can be a remote computing system separate from the secure computing system 104, 304. The dealer computing system 108, 308 has signed the split(s) 184, 384 with the private key of the dealer computing system 108, 308 encrypted the split(s) 184, 384 with the encryption key established with the combining computing system 120, 320 and sent the dealer signed and encrypted spilt(s) 184, 384 to the share-holder computing system 504, 704. The share-holder computing system 504, 704 can save the dealer signed and encrypted splits(s) 184, 384 to the last secret blockchain 508, 708 as described above with respect to the methods 600, 800.

Upon starting up, the personal computing system (e.g., as the combining computing system 120, 320) can connect to the share-holder computing system 504, 704 over the network 124, 324. The personal computing system (e.g., as the combining computing system 120, 320) can provide identity information, such as an International Mobile Equipment Identity (IMEI), to the share-holder computing system 504, 704. The share-holder computing system 504, 704 can retrieve the dealer signed and encrypted splits 184, 384 in response to receiving the identity information from the personal computing system. The share-holder computing system 504, 704 can then send the dealer signed and encrypted splits 184, 384 to the personal computing system (e.g., as the combining computing system 120, 320). The personal computing system (e.g., as the combining computing system 120, 320), can decrypt the dealer signed and encrypted split(s) 184, 384 using the key(s) that have been established between the dealer computing system 108, 308 and the combining computing system 120, 320 portion of the personal computing system, authenticate the dealer signature of each of the dealer signed splits 184, 384 using the dealer signing key of the dealer computing system 108, 308, and regenerate the last secret as described above with respect to the methods 200, 400. The personal computing system (e.g., as the combining computing system 120, 320) can then use the last secret to decrypt the biometric stored on the personal computing system (e.g., as the secure computing system 104, 304).

In some embodiments, the share-holders 116, 316 and/or the share-holder computing systems 504, 704 are included on multiple computing systems that communicate over the network 124, 324. In some embodiments, computing systems include and/or can be a master share-holder, such that the splits 184, 384 cannot be recombined when the master share-holder is not connected to the network 124, 324. Each of the combining computing systems 120, 320 can recombine split(s) 184, 384 to generate last secret that allows the computing systems to communicate when the share-holder is proximate the other share-holders 116, 316 and/or the other share-holder computing systems 504, 704. In other embodiments, the computing systems that communicate over the network 124, 324 may be breakable. In such an embodiment, the computing systems can only communicate when enough computing systems are present to allow for recovery of the last secret.

Figure 9:
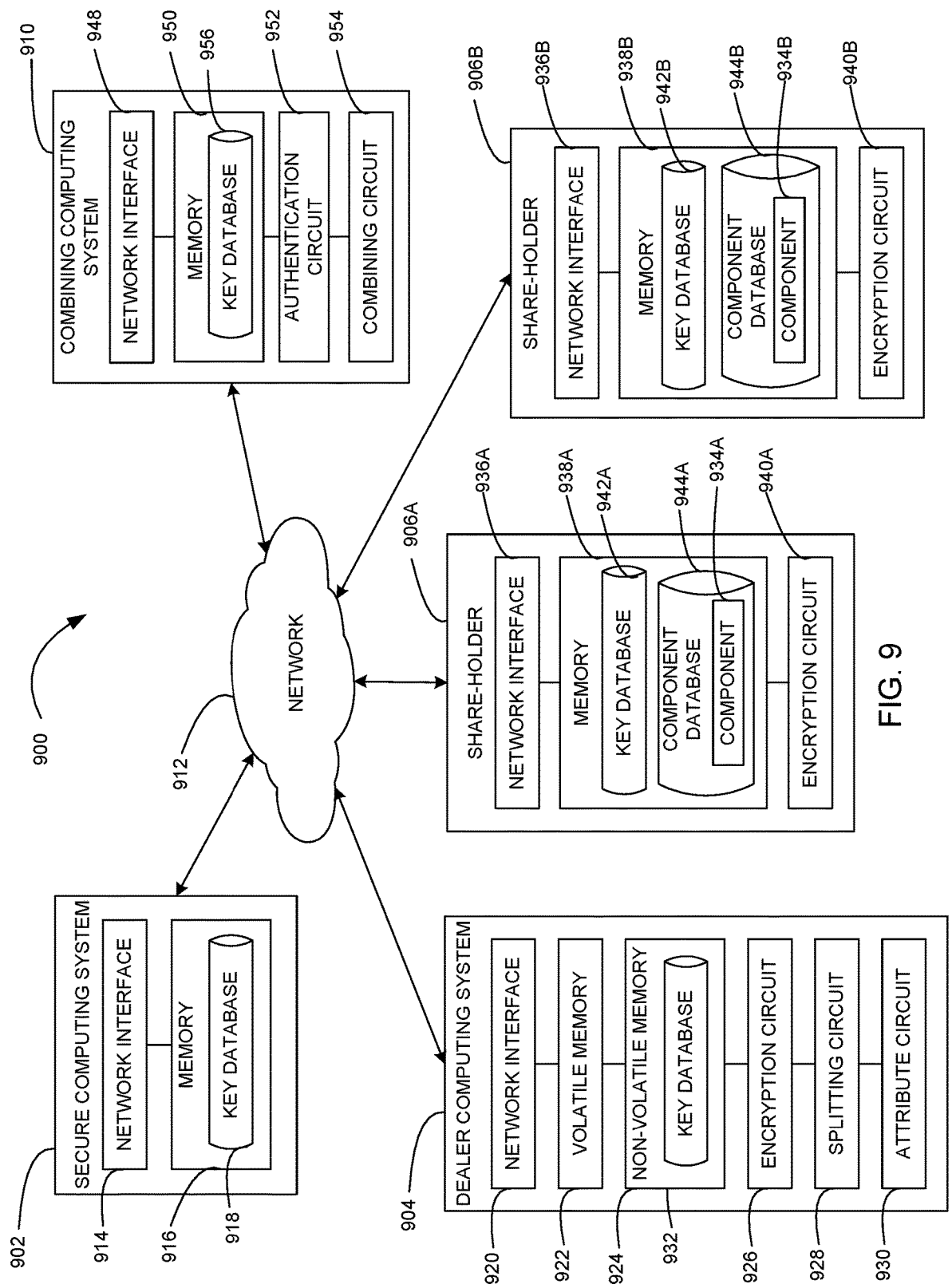
FIG. 9 is an environmental view of a system for generating and sharing a last secret while maintaining confidentiality, integrity, and authenticity of the last secret, according to one embodiment.

Referring now to FIG. 9, an environmental view of a system 900 for generating a last secret that can be stored confidentially and that can be authenticated is shown, according to an example embodiment. The last secret refers to the last cryptographic element that controls access to an encryption key, a biometric, one or more pieces of data, a tokenized value, a password used to generate a key, a password used to access data and/or a secure computing device, a tokenized value, or a password used to protect a seed that can be fed into a pseudorandom function generator to generate a cryptographic key, or any other information intended to be stored securely. The last secret can be a password, an encryption key, or a detokenization request that must be provided by an entity to gain access to initialization information to start up a cryptographic process for communicating with a secure computing system 902 or to access the biometric, the one or more pieces of encrypted data, etc. As shown in FIG. 9, the system 900 includes the secure computing system 902, a dealer or splitter computing system 904, a plurality of share-holders 906, and a combining computing system 910 connected by a network 912. While the secure computing system 902, the dealer computing system 904, and the combining computing system 910 are shown as separate entities on separate network nodes in FIG. 9, in some embodiments, one or more of the secure computing system 902, the dealer computing system 904, the plurality of share-holders 906, and the combining computing system 910 can be on the same network node. While FIG. 9 illustrates the share-holders 906 as being on the same network node as the combining computing system 910, in some embodiments, the share-holders 906 can be on separate network nodes. In the illustrated embodiment, the plurality of share-holders 906 includes the first share-holder 906A and the second share-holder 906B. However, in other embodiments, the plurality of share-holders can include a different number of share-holders.

The secure computing system 902 can be a database server, an application server, a file server, a mail server, a print server, a web server, and/or a game server that is in communication with other computing systems and/or client devices connected to the network 912. In other embodiments, the secure computing system 902 can be a computing system that includes encrypted data. The secure computing system 902 includes a network interface 914 and a memory 916. In the illustrated embodiment, the secure computing system 902 and the dealer computing system 904 are on separate network nodes. In other embodiments, the secure computing system 902 and the dealer computing system 904 are on the same network node. The network interface 914 of the secure computing system 902 is adapted for and structured to establish a communication session via the network 912 with the other components of the system 900. As shown in FIG. 9, the memory 916 is communicably and operatively coupled with the other components of the secure computing system 902. The memory 916 includes a key database 918. The key database 918 is structured to retrievably store information related to the public/private key pair of the secure computing system 902. As shown in FIG. 9, the memory 916 is communicably and operatively coupled with the other components of the secure computing system 902.

The dealer computing system 904 includes a network interface 920, non-volatile memory 922, a volatile memory 924, an encryption circuit 926, a splitting circuit 928, and an attribute circuit 930. The network interface 920 is structured to establish a communication session via the network 912 with the other components of the system 900. As shown in FIG. 9, the volatile memory 924 and the non-volatile memory 922 are communicably and operatively coupled with the other components of the dealer computing system 904. As used herein, the term "non-volatile memory" refers to long-term persistent storage implemented, for example, on permanent computer storage media that maintains its data even when the device is powered off. Exemplary forms of non-volatile memory include read-only memory, flash memory, ferroelectric random access memory, magnetic computer storage, optical disks, cache memory, or any other non-volatile media. As used herein, the term "volatile memory" refers to computer storage that maintains its data only while the computing system including the volatile memory is powered. Exemplary forms of non-volatile memory include RAM, DRAM, SRAM, and other volatile media. The non-volatile memory 922 includes a key database 932 including a first key for accessing the secure computing system 902, a password, and an optional second key that have been generated by the encryption circuit 926. The password is structured to control access to the first key. In embodiments that do not include the second key, the password is the last secret. In some embodiments, the password can be encrypted using the second key. In such embodiments, the second key is the last secret. In embodiments in which the second key is the last secret, the encrypted password is stored to the memory 916 of the secure computing system 902. The key database 918 can also include certificates of each of the share-holders 906A, 906B and/or the combining computing system 910 that include the public keys of each of the share-holders 906A, 906B and/or the combining computing system 910. The key database 918 further includes an encryption key configured for encrypted communication between the dealer computing system 904 and the combining computing system 910. In some embodiments, the encryption key is the combining computing system 910 is the public key of the combining computing system 910. In some embodiments, the encryption key can be established using either CMS-based key transport or key agreement schemes. The key database 918 further includes a dealer signing key. In some embodiments, the dealer signing key is the private key of the public/private key pair of the dealer computing system 904. In some embodiments, the dealer singing key is a symmetric key that is unique to the dealer computing system 904 and the combining computing system 910.

The splitting circuit 928 is structured to receive the last secret from the dealer computing system 904 and read the last secret into a volatile memory. The splitting circuit 928 is structured to split the last secret into a plurality of splits. As illustrated in FIG. 9, the splitting circuit 928 is structured to split the last secret into components of a N of N scheme. As used herein, the phrase "N of N scheme" generally refers to a secret sharing scheme in which the last secret is obfuscated using N components, all of which can be can be combined to recover the last secret. Accordingly, in the embodiment of FIGS. 9-10, the splits are the components of the N of N scheme. In the illustrated embodiment, the splitting circuit 154 is structured to split the last secret into a first component 934A and a second component 934B (e.g., N=2). In other embodiments, the splitting circuit 928 may split the last secret into a different number N of components. In an exemplary N of N scheme, the splitting circuit 928 is structured to generate a random number and save the random number as the first component 934A. The splitting circuit 928 is structured to combine the random number with the last secret using exclusive or (XOR) to generate the second component 934B. The splitting circuit 928 is then structured to erase the last secret from the volatile memory and not write the last secret to the non-volatile memory 922. The splitting circuit 928 is structured to generate a SigncryptedData message for each of the first component 934A and the second component 934B with the public and private keys of the dealer computing system 904 and with the encryption key configured for encrypted communication between the dealer computing system 904 and the combining computing system 910. Therefore, only the combining computing system 910 can decrypt the SigncryptedData message to recover the components 934A, 934B. As used herein, "only" means that the SigncryptedData messages are configured to be decrypted by the combining computing system 910 and no other systems, entities, objects, and so on. Therefore, the first component 934A and the second component 934B are blinded from (e.g., cannot be read by) entities other than the combining computing system 910. Since the SigncryptedData message is signcrypted using the dealer signing key and the encryption key configured for encrypted communication between the dealer computing system 904 and the combining computing system 910, an unauthorized party such as a man-in-the-middle attacker cannot designcrypt the SigncryptedData message around the component 934A, 934B. In embodiments in which multiple last secrets need to be protected, the last secrets can be individually encrypted using a password encryption key (WEK) that is split into components 184 according to a N of N scheme as described above for the last secret. Splitting the last secret into the components 934A, 934B maintains the integrity of the last secret because components that have been altered or replaced by a malicious party cannot be recombined into the last secret.

The attribute circuit 930 is structured to generate one or more attributes for each of the SigncryptedData messages that include one of the components 934A, 934B. FIGS. 10-12 illustrate an exemplary schema 1000 that includes the attributes. The attributes can include signed attributes, which have been signed using the dealer signing key of the dealer computing system 904, and unsigned attributes. Both the signed attributes and unsigned attributes are cleartext and can be read by the share-holders 906A, 906B. The signed attributes include one or more of a CombinerAddress attribute 1002, a ValidShareHolder attribute 1004, a GroupName attribute 1006, an Index attribute 1008, a DealTime attribute 1010, a ValidityPeriod attribute 1012, a Delegation attribute, an AuthorizedUse attribute, and a Prioritization attribute.

The CombinerAddress attribute 1002 is structured to identify the combining computing system 910 that is structured to reconstruct the components 934A, 934B to recover the last secret.

The ValidShareHolder attribute 1004 is structured to identify the share-holder 906A, 906B that is the intended recipient of each of the components 934A, 934B (e.g., the ValidShareHolder includes first information indicative of the identity of the share-holder 906A, 906B that has been added by the dealer computing system 904). In some embodiments, the ValidShareHolder attribute 1004 includes information indicative of the share-holder signing key that must be used by the share-holder 906A, 906B to send a SignedData message that includes the SigncryptedData message including the component 934A, 934B to the combining computing system. In some embodiments, the share-holder signing key is a private key of a public/private key pair of the share-holder 906A, 906B. In such an embodiment, each of the share-holders 906A, 906B is structured to send a certificate, such as an X.509 certificate, including the public key of the share-holder 906A, 906B or other information indicative of the identity of the share-holder 906A, 906B to the dealer computing system 904. In such embodiments, the attribute circuit 930 is structured to read the public key of the share-holder 906A, 906B from the certificate of the share-holder 906A, 906B and write the public key of the share-holder 906A, 906B to the ValidShareHolder attribute 1004. In some embodiments, the share-holder signing key is a symmetric signature key, such as a MAC or HMAC key, to send a SignedData message that includes the SigncryptedData message including the component 934A or 934B. In such an embodiment, ValidShareHolder attribute 1004 includes information indicative of the symmetric key, such as a name, a location, and/or a key check value. In such embodiments, the attribute circuit 930 is structured write the information indicative of the symmetric key to the ValidShareHolder attribute. In some embodiments, the ValidShareHolder attribute 1004 is structured to request share-holder authentication. For example, in embodiments in which the share-holder 906A, 906B is physical media possessed by a human operator, the ValidShareHolder attribute 1004 may prompt the human operator to answer a security question and then verify that the answer to the security question is correct.

The GroupName attribute 1006 includes information indicative of an instance of the last secret and/or information indicative of an instance of the first key.

The Index attribute 1008 includes information indicative of an order to use when combining computing system 910 combines the components 934A, 934B to recover the last secret.

The DealTime attribute 1010 includes information indicative of a time and a date that the dealer computing system 904 distributed the components 934A, 934B to the share-holder 906A, 906B.

The ValidityPeriod attribute 1012 includes information indicative of a predetermined time period for which the component 934A or the component 934B is valid. In some embodiments, the predetermined time period may be a week, a month, or a year. In some embodiments, the predetermined time period can include time-to-live (TTL) information. The TTL information can specify a lifespan for the component 934A or the component 934B in the SigncryptedData message.

The Delegation attribute (not shown) includes delegation information for the share-holder 906A or the share-holder 906B. Delegation information includes a designation of a delegate that is authorized to provide the component 934A saved to the share-holder 906A or the component 934B saved to the share-holder 906B in the same manner as described herein with respect to the share-holders 906A, 906B. The Delegation attribute can include information indicative of an identity of the delegate. For example, in some embodiments, the Delegation attribute can include information indicative of a public key or a symmetric key that the Delegate will use to generate the SignedData message that includes the SigncryptedData message including the component 934A or the component 934B. For example, in some embodiments, one or more of the share-holders 906A, 906B can be physical storage media possessed by a human operator. In such an embodiment, a first human operator can designate a second human operator as a delegate. As described above, the ValidShareHolder attribute 1004 may prompt the human operator to answer a security question. The Delegation attribute may include the correct answer to the security question for the delegate. The combining computing system 910 can then compare the answer to the security question provided by the delegate with the answer in the Delegation attribute to validate the component 934A, 934B provided by the delegate.

The AuthorizedUse attribute (not shown) includes information indicative of times and/or locations at or during which the component 934A or 934B is authorized for use. For example, the AuthorizedUse attribute can include a date or a range of dates for which the component 934A, 934B can be used. In another example, the AuthorizedUse attribute can include a time period for which the component 934A, 934B can be used. The time period can be a single time period (e.g., a predefined number of seconds, minutes, days, weeks, months, years, etc.), a recurring time period (e.g., between 9 a.m. and 5 p.m. for Mondays-Fridays), or a combination thereof that the component 934A, 934B is authorized for use. In some embodiments, the AuthorizedUse attribute can specify that the components 934A, 934B are single-use components. In some embodiments, the AuthorizedUse attribute includes information indicative of geographic locations for which the component 934A, 934B can be used. For example, the geographic location can include one or more countries in which the component 934A, 934B can be used. For example, the AuthorizedUse attribute can indicate that the components 934A, 934B can only be used in the U.S.A. In another example, the AuthorizedUse attribute for can indicate that the components 934A, 934B can be used in any country. In another example, the AuthorizedUse attribute for the components 934A, 934B can indicate that the components 934A, 934B cannot be used in any Office Of Foreign Assets Control-restricted country. In such an arrangement, the location of the combining computing system 910 must match the one or more locations defined in the location attribute before using the component 934A or 934B described by the AuthorizedUse attribute can be used to recover the last secret.

The Prioritization attribute (not shown) is structured to identify one or more components 934A, 934B that must be present to combine the N received components 934A, 934B to recover the last secret. Since the system 900 uses a N of N scheme to split the last secret, the Prioritization attribute can specify that each of the components 934A, 934B are required to for the combining computing system 910 to recover the last secret.

An exemplary unsigned attribute is a security assertion markup language (SAML) assertion (not shown). The SAML assertion can include information indicative an identity of the share-holders 906A, 906B authorized to hold the component 934A, 934B, information indicative of an identity and/or a location of the combining computing system 910 authorized to access the components 934A, 934B, information indicative of a timeliness of the components 934A, 934B in reaching the combining computing system 910, etc.

In some embodiments, attributes can include one or more other attributes. For example, as illustrated in FIG. 10, a ShareHolder attribute 1014 can include one or more of the CombinerAddress attribute 1002, the ValidShareHolder attribute 1004, the GroupName attribute 1006, the Index attribute 1008, and the DealTime attribute 1010. In other embodiments, the ShareHolder attribute 1014 can include a different combination of attributes than the combination of attributes illustrated in FIG. 10.

The attribute circuit 930 is structured to append the one or more attributes to the each of the SigncryptedData messages that include one of the components 934A, 934B. In embodiments in which one or more of the attributes is a signed attribute, the attribute circuit 930 is structured to sign the attribute using the dealer signing key of the dealer computing system 904. The attribute circuit 930 is structured to transmit the SigncryptedData messages including one of the components 934A, 934B to the respective share-holders 906A, 906B.

Referring again to FIG. 9, in the illustrated embodiment, the share-holders 906 include the first share-holder 906A and the second share-holder 906B. In the illustrated embodiment, the first share-holder 906A and the second-share holder 906B are on the same network node as the combining computing system 910. In other embodiments, the first share-holder 906A and the second share-holder 906B can be on different network nodes than the combining computing system 910 and/or on different network nodes than each other. In some embodiments, the share-holders 906A, 906B can be on physical media such as USB memory sticks, smart cards, etc.

The share-holders 906A, 906B are substantially similar. Accordingly, only the share-holder 906A is described in detail herein. Corresponding parts of the share-holder 906B are shown using the same numbering as the share-holder 906A, but are followed by the letter B. The share-holder 906A includes a network interface 936A, a memory 938A, and an encryption circuit 940A. The memory 938A includes a key database 942A and a component database 944A. The key database 942A includes a share-holder signing key of the share-holder 906A. In some embodiments, the share-holder signing key is a private key of a public/private key pair of the share-holder 906A. In some embodiments, the share-holder signing key is a symmetric key that is unique to the share-holder 906A and the combining computing system 910. The component database 944A includes the component 934A. The encryption circuit 940A is structured to add second information indicative of the identity of the share-holder 906A to the SigncryptedData message including the component 934A. In some embodiments, the encryption circuit 940A is structured to use the share-holder signing key of the share-holder 906A to create a SignedData message around the component 934A and the second information indicative of the identity of the share-holder 906A is the share-holder signature in the SignedData message. In other embodiments, the encryption circuit 940A can be configured add the second information indicative of the identity of the share-holder 906A to the SigncryptedData message including the component 934A by signing a portion or one or more of the attributes with the share-holder signing key of the share-holder 906A. In some embodiments, the encryption circuit 940A is structured to read the CombinerAddress attribute 1002 to identify a location and/or address of the combining computing system 910. The encryption circuit 940A is structured to send the SignedData message, which includes SigncryptedData message including the component 934A, to the combining computing system 910. The share-holder 906A sends the SignedData message to the combining computing system 910 in response to a request for the component 934A.

In some arrangements, each of the share-holders 906A, 906B is configured to write its encrypted component 934A, 934B, each of which includes the dealer signature and the share-holder signature, to a block chain. This can serve as a verifiable record indicating the dealer computing system 904 that generated the components 934A, 934B and the share-holder 906A, 906B that held each of the components 934A, 934B. In some embodiments, each of the share-holders 906A, 906B can be configured to write the encrypted component 934A, 934B, which includes the dealer signature and the share-holder signature, to the block chain when the share-holder 906A, 906B sends the encrypted components 934A, 934B to the combining computing system 910 to save a verifiable record of when the encrypted components 934A, 934B were sent to the combining computing system 910.

The combining computing system 910 is a computing system or a part of a computing system that desires to access the secure computing system 902. For example, in embodiments in which the secure computing system 902 is an application server or a database, the combining computing system 910 may run an application or a program that needs to access the secure computing system 902. The combining computing system 910 includes a network interface 948, a memory 950, an authentication circuit 952, and a combining circuit 954. The memory 950 includes include a key database 956 that includes a public/private key pair of the combining computing system 910 and a certificate of the dealer computing system 904. The key database 956 further includes the encryption key configured for encrypted communication between the dealer computing system 904 and the combining computing system 910. In some embodiments, the encryption key is the combining computing system 910 is the public key of the combining computing system 910. In some embodiments, the encryption key can be established using either CMS-based key transport or key agreement schemes. The key database 956 further includes cryptographic keys for authenticating the dealer signature. In embodiments in which the dealer signature is a digital signature, the key database 956 includes the public key of the dealer computing system 904. In embodiments in which the dealer signature is based on the symmetric key unique to the dealer computing system 904 and the combining computing system 910, the key database includes the symmetric key unique to the dealer computing system 904 and the combining computing system 910. In some embodiments, the key database 956 further includes cryptographic keys for authenticating the share-holder signature. In embodiments in which the share-holder signature is a digital signature, the key database 956 includes the public key of the share-holders 906A, 906B. In embodiments in which the share-holder signature is based on the symmetric key unique to the share-holder 906A, 906B and the combining computing system 910, the key database includes the symmetric key unique to the share-holder 906A, 906B and the combining computing system 910.

The combining computing system 910 is structured to retrieve the first component 934A from the first share-holder 906A and the second component 934B from the second share-holder 906B after the combining computing system 910 has started or restarted or determined a need to recover the last secret. The combining computing system 910 receives each of the components 934A, 934B in SignedData message that includes the SigncryptedData message including the component 934A, 934B. The authentication circuit 952 is structured to read and verify one or more of the attributes in the SigncryptedData message. The authentication circuit 952 is structured to read the ValidShareHolder attribute 1004 (e.g., the first information indicative of the identity of share-holder 906A, 906B) from the SigncryptedData message. For example, the authentication circuit 952 is structured to read the information indicative of the public key of the intended share-holder 906A from the ValidShareHolder attribute 1004. The authentication circuit 952 is structured to compare the share-holder signature of the SignedData message (e.g., the second information indicative of the identity of the share-holder 906, 906B) with the information indicative of the share-holder signing key of the intended share-holder 906A, 906B from the ValidShareHolder attribute 1004 (e.g., the first information indicative of the identity of the share-holder 906A, 906B). In embodiments that do not include the Delegation attribute, in response to determining that the first information indicative of the identity of the share-holder 906A, 906B does not match the second information indicative of the identity of the share-holder 906A, 906B, the authentication circuit 952 determines that the SigncryptedData message including the component 934A, 934B is likely not authentic, logs the mismatch, and destroys the SigncryptedData message including the component 934A, 934B. For example, in response to determining that the share-holder signature of the SignedData message does not match the share-holder signing key of the intended share-holder 906A, 906B identified in the ValidShareHolder attribute 1004, the authentication circuit 952 determines that the SigncryptedData message including the component 934A, 934B is likely not authentic, logs the mismatch, and destroys the component 934A, 934B. In response to determining that the first information indicative of the identity of the share-holder 906A, 906B matches the second information indicative of the identity of the share-holder 906A, 906B, the authentication circuit determines that the SigncryptedData message including the component 934A, 934B is likely authentic. For example, in response to determining that share-holder signature of the SignedData message matches the share-holder signing key of the intended share-holder 906A, 906B indicated in the ValidShareHolder attribute 1004, the authentication circuit 952 determines that the SignedData message including the component 934A, 934B is likely authentic. In this manner, the intercepted components modified and sent by an attacker and/or false components sent by an attacker are not decrypted by the combining computing system 910.

In embodiments in which the SigncryptedData message includes the Delegation attribute, the authentication circuit 952 is structured to authenticate the dealer signature of the dealer computing system 904 that generated the Delegation attribute. In response to determining that the dealer signature of the Delegation attribute is not the dealer signature of the dealer computing system 904, the authentication circuit 952 determines that the SigncryptedData message including the component 934A, 934B is likely not authentic, logs the mismatch, and destroys the SigncryptedData message including the component 934A, 934B. In response to determining that the dealer signature of the Delegation attribute is the dealer signature of the dealer computing system 904, the authentication circuit 952 is structured to read the information indicative of the identity of the delegate (e.g., first information indicative of the identity of the delegate) from the Delegation attribute and compare the information indicative of the identity of the delegate to the delegate signature of the SignedData message (e.g., second information indicative of the identity of the delegate). For example, in embodiments in which the delegate signature is a digital signature, the Delegation attribute includes a public key, and the authentication circuit 952 determines whether the public key from the Delegation attribute matches the delegate signature of the SignedData message. In embodiments in which the delegate signature is based on a symmetric key unique to the delegate and the combining computing system 910, the Delegation attribute incudes information indicative of a symmetric key (e.g., a MAC key, HMAC key, etc.) and the authentication circuit 952 compares the symmetric key indicated in the Delegation attribute to the delegate signature of the SignedData message. In response to determining that the first information indicative of the identity of the delegate does not match the second information indicative of the identity of the delegate, the authentication circuit 952 determines that the SigncryptedData message including the component 934A, 934B is likely not authentic, logs the mismatch, and destroys the SigncryptedData message including the component 934A, 934B. In response to determining that the first information indicative of the identity of the delegate matches the second information indicative of the identity of the delegate, the authentication circuit determines that the SigncryptedData message including the component 934A, 934B is likely authentic. In this manner, the intercepted components modified and sent by an attacker and/or false components sent by an attacker are not decrypted by the combining computing system 910.

In embodiments in which the SigncryptedData message includes the GroupName attribute 1006, the authentication circuit 952 is structured to read the GroupName attribute 1006 from the SigncryptedData message and verify that the instance of the components 934A, 934B corresponds to the instance of the last secret and/or the first key that the combining computing system 910 intends to recover. In response to determining that the instance of the components 934A, 934B from the GroupName attribute does not correspond to the instance of the last secret and/or the first key that the combining computing system 910 intends to recover, the authentication circuit 952 is structured to destroy the components 934A, 934B. In some embodiments, the authentication circuit 952 is structured to log the mismatch and destroy the message including the component 934A, 934B.

In embodiments in which the SigncryptedData message includes the ValidityPeriod attribute 1012, the authentication circuit 952 is structured to read the ValidityPeriod attribute 1012 from the SigcryptedData message and verify that the predetermined time period included in the ValidityPeriod attribute has not expired. In response to determining that predetermined time period has expired, the authentication circuit 952 is configured to destroy the components 934A, 934B. In some embodiments, the authentication circuit 952 is structured to log the mismatch and destroy the message including the component 934A, 934B.

In embodiments in which the SigncryptedData message includes the AuthorizedUse attribute, the authentication circuit 952 is structured to read the AuthorizedUse attribute from the SigncryptedData message. The authentication circuit 952 is structured to determine whether the current time and/or the location of the combining computing system 910 matches the time and/or location in the AuthorizedUse attribute. For example, when the time in the AuthorizedUse attribute includes a single time period for which the component 934A or 934B can be used, the authentication circuit 952 determines that the single time period has not expired. In another example, when the time in the AuthorizedUse attribute is a recurring time period (e.g., 9 a.m.-5 p.m. Monday-Friday), the authentication circuit 952 verifies that the current time is within the recurring time period. In another example, when the AuthorizedUse attribute includes a location, the authentication circuit 952 determines the geographic location of the combining computing system 910 (e.g., based on GPS) and verifies that the geographic location of the combining computing system 910 matches the location of the AuthorizedUse attribute. In response to determining that the time and/or location of the combining computing system 910 does not match the time and/or location of the AuthorizedUse attribute, the authentication circuit 952 is configured to destroy the message including the component 934A or 934B. In some embodiments, the authentication circuit 952 is structured to log the mismatch and destroy the message including the component 934A or 934B.

The combining circuit 954 is structured to designcrypt the each of SigncryptedData messages to recover the each of the components 934A, 934B while simultaneously authenticating the dealer computing system 904, thereby verifying the integrity of each of the components 934A, 934B. In embodiments that include the Index attribute 1008, the combining circuit 954 is structured to read the Index attribute 1008 of each of the components 934A, 934B to determine a correct order for recombining the components 934A, 934B to recover the last secret. For example, the combining circuit 954 can XOR the first component 934A and the second component 934B together to recover the last secret. The combining circuit 954 can then use the last secret to access the first key of the secure computing system 104. The combining computing system 910 is structured to read the last secret within the volatile memory and erase the last secret after the first key has been retrieved. The combining computing system 910 is structured to never write the last secret to the memory 950, cache memory, or any other non-volatile media. The combining computing system 910 can then communicate with the secure computing system 902 using the first key.

Figure 13A:
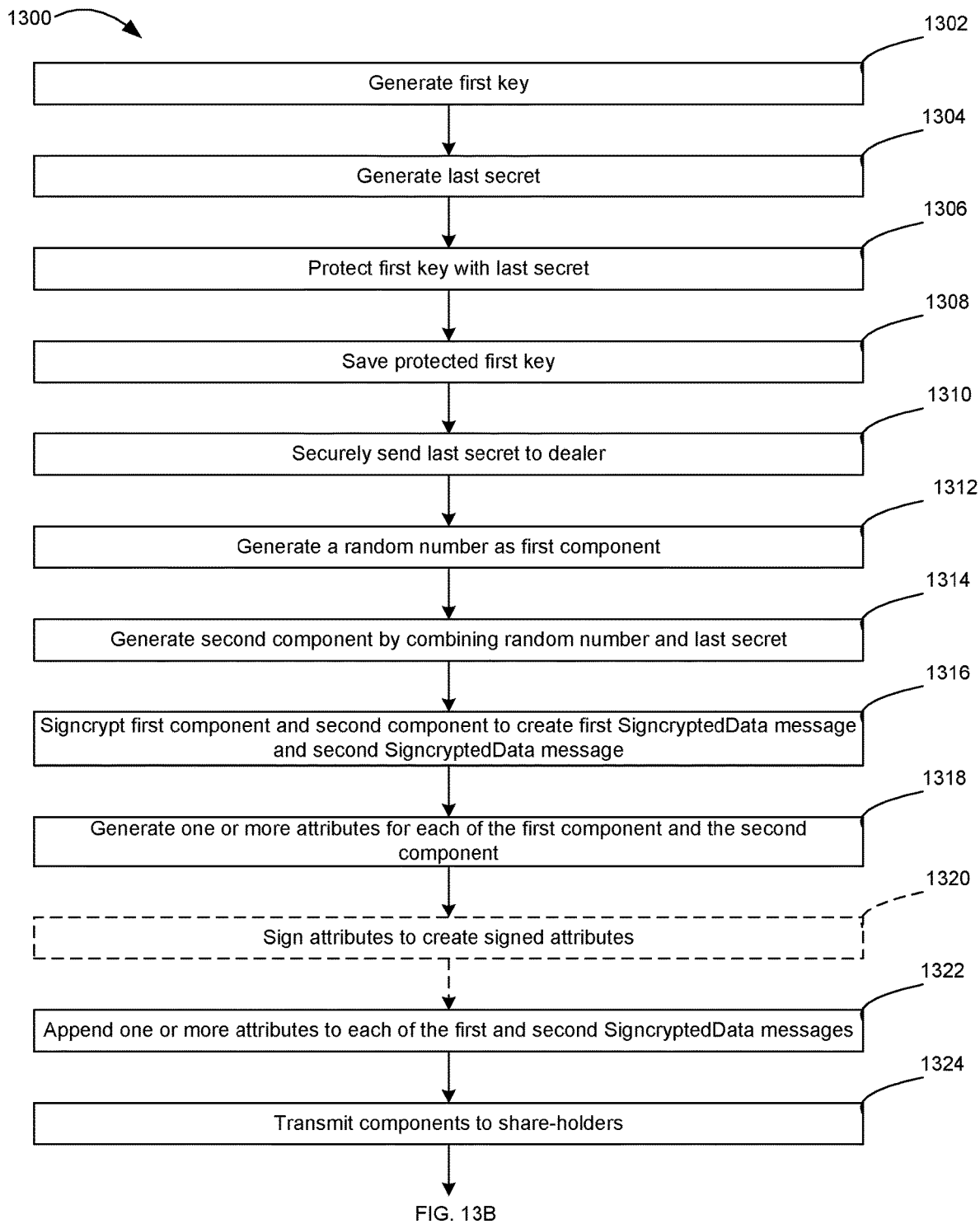
FIGS. 13A-13C are flow diagrams showing a process of generating and sharing the last secret while maintaining confidentiality, integrity, and authenticity of the last secret, according to one embodiment.
Figure 13B:
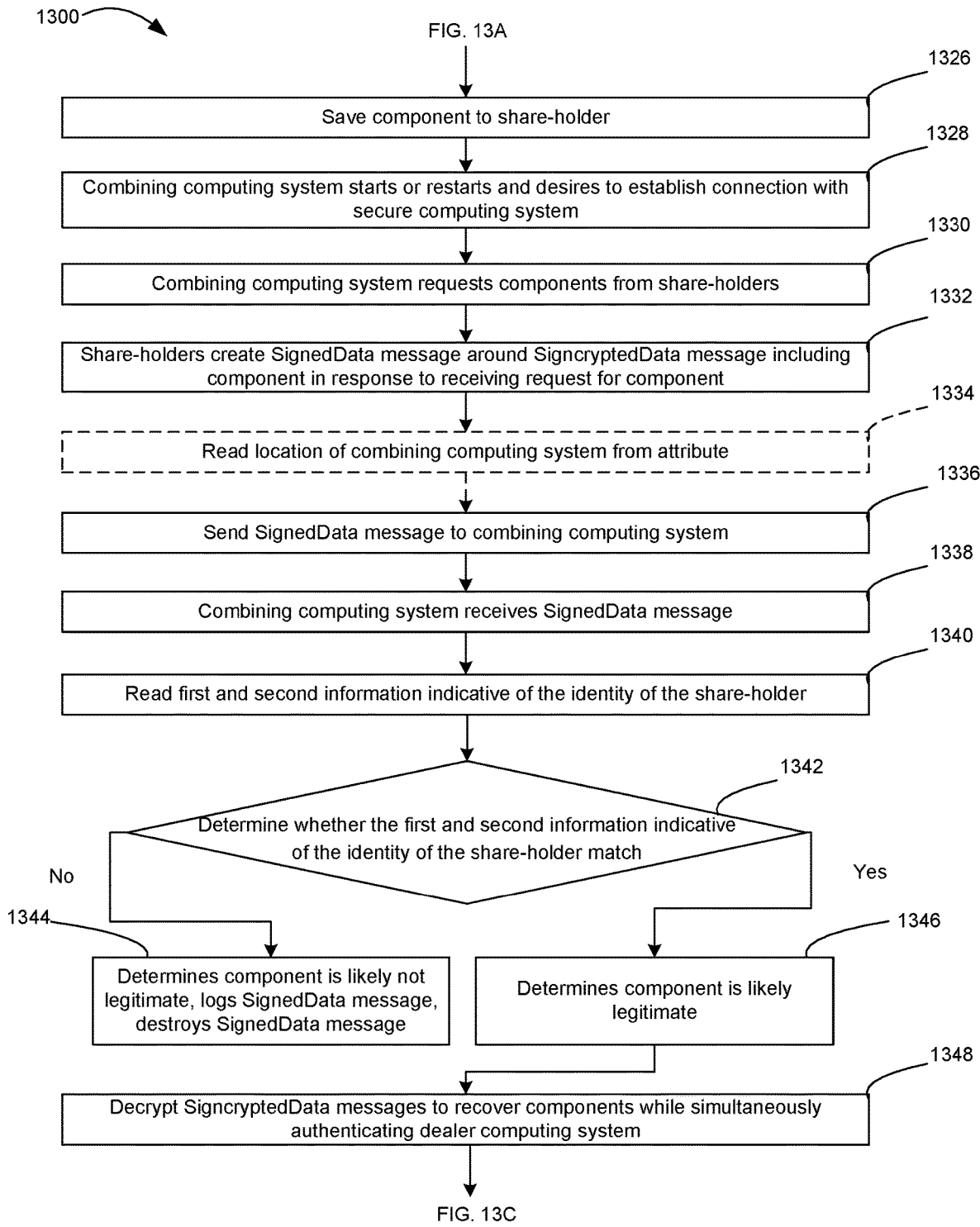
Figure 13C:
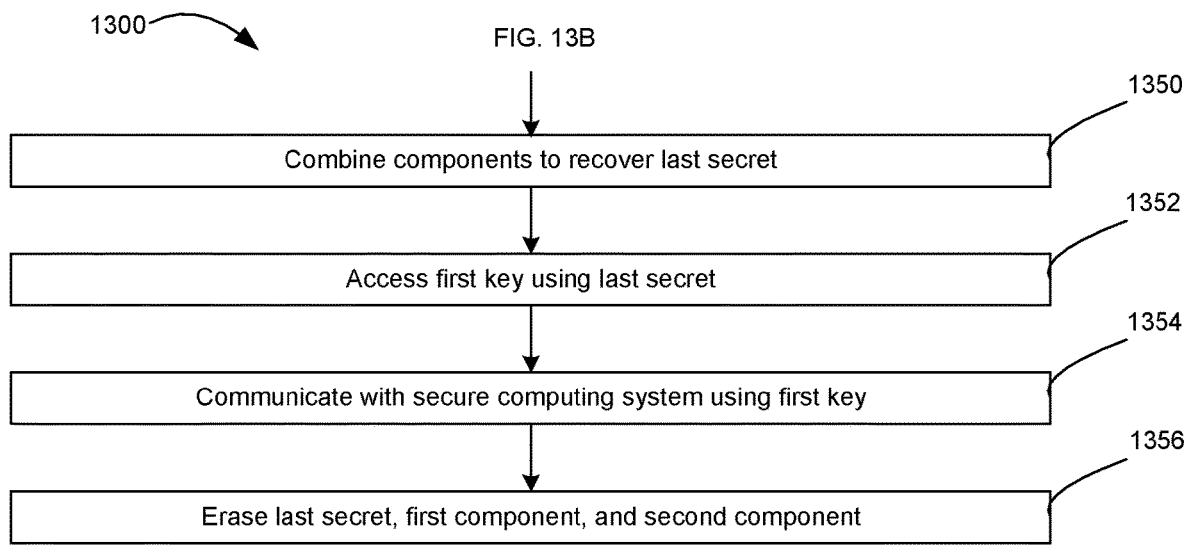

Referring now to FIGS. 13-13C, a flow diagram of a method 1300 for maintaining the confidentially, authenticity, and integrity of a last secret is shown, according to an example embodiment. At step 1302, the first key for the secure computing system 902 is generated by the encryption circuit 926 of the dealer computing system 904. At step 1304, the last secret is generated by the encryption circuit 926. At step 1306, the first key is protected with the last secret. At step 1308, the protected first key is saved to the memory 916 of the secure computing system 902. At step 1310, the last secret is sent to the dealer computing system 904. At step 1312, the splitting circuit 928 generates a random number as the first component 934A. At step 1314, the splitting circuit 928 uses XOR to generate a second component 934B from the last secret and the first component 934A. Splitting the last secret into the components 934A, 934B maintains the integrity of the last secret because components that have been altered or replaced by a malicious party cannot be recombined into the last secret. At step 1316, the splitting circuit 928 generates a SigncryptedData message for each of the first component 934A and the second component 934B using the public/private key pair of the dealer computing system 904 and the encryption key configured for encrypted communication between the dealer computing system 904 and the combining computing system 910. Since the SigncryptedData message is signcrypted using the dealer signing key of the dealer computing system 904 and the encryption key configured for encrypted communication between the dealer computing system 904 and the combining computing system 910, an unauthorized party such as a man-in-the-middle attacker cannot designcrypt the SigncryptedData message around the component 934A, 934B.

At step 1318, the attribute circuit 930 generates one or more attributes for each of the components 934A, 934B. The attributes can include signed and unsigned attributes. Exemplary signed attributes include the CombinerAddress attribute 1002, the ValidShareHolder attribute 1004, the GroupName attribute 1006, the Index attribute 1008, the DealTime attribute 1010, the ValidityPeriod attribute 1012, the Delegation attribute, the AuthorizedUse attribute, and the Prioritization attribute. An exemplary unsigned attribute includes the SAML attribute. At step 1320, in embodiments that include one or signed attributes, the attribute circuit 930 signs the signed attributes with the dealer signing key of the dealer computing system 904. At step 1322, the attribute circuit 930 appends the one or more attributes to each of the SigncryptedData messages that include the components 934A, 934B. At step 1324, the attribute circuit 930 transmits each of the SigncryptedData messages that include the components 934A, 934B to the share-holders 906A, 906B, respectively.

At step 1326, each of the share-holders 906A, 906B saves the component 934A, 934B to the component database 944A, 944B of the memory 938A, 938B.

At step 1328, the combining computing system 910 starts or restarts and desires to establish a connection with the secure computing system 902. At step 1330, the combining circuit 954 requests the components 934A, 934B from the share-holders 906A, 906B.

At step 1332, in response to receiving a request for the component 934A, 934B, the encryption circuit 940A, 940B of each share-holder 906A, 906B creates a SignedData message around the SigncryptedData message that includes one of the component 934A, 934B using the share-holder signing key of the share-holder 906A, 906B. At step 1334, in embodiments that include the CombinerAddress attribute 1002, the encryption circuit 940A, 940B is structured to read the location of the combining computing system 910 into the volatile memory. At step 1336, each of the share-holders 906A, 906B sends SignedData message that includes the SigncryptedData message including one of the components 934A, 934B to the combining computing system 910.

At step 1338, the combining circuit 954 receives the SignedData message that includes the SigncryptedData message that includes one of the components 934A, 934B. At step 1340, the authentication circuit 952 reads the first information indicative of the identity of the share-holder 906A, 906B from the one or more attributes and the second information indicative of the identity of the share-holder 906A, 906B written by the share-holder 906A, 906B. For example, the authentication circuit 952 reads the information indicative of the share-holder signing key of the intended share-holder 906A, 906B from the ValidShareHolder attribute 1004. At step 1342, the authentication circuit 952 determines whether the first information indicative of the identity of the share-holder 906A, 906B and the second information indicative of the identity of the share-holder 906A, 906B match. For example, the authentication circuit 952 determines whether the share-holder signature of the SignedData message was made using the share-holder signing key of the intended share-holder 906A, 906B. At step 1344, in response to determining that the first information indicative of the identity of the share-holder 906A, 906B do not match, the authentication circuit 952 determines that the component included in the SigncryptedData message is likely not authentic, logs the SignedData message that includes the SigncryptedData message including the component, and destroys the SignedData message that includes the SigncryptedData message that includes the component. For example, in response to determining that the share-holder signature of the SignedData message was not made using the share-holder signing key of the intended share-holder 906A, 906B, the authentication circuit 952 determines that the component included in the SigncryptedData message is likely not authentic, logs the SignedData message that includes the SigncryptedData message including the component, and destroys the SignedData message that includes the SigncryptedData message that includes the component. Intercepted components modified and sent by an attacker and/or false components sent by an attacker are not decrypted. At 1346, in response to determining that the first information indicative of the identity of the share-holder 906A, 906B matches the second information indicative of the share-holder 906A, 906B, the authentication circuit 952 determines that the component 934A, 934B included in the SigncryptedData message is likely authentic. For example, in response to determining that the share-holder signature of the SignedData message was made using the share-holder signing key of the intended share-holder 906A, 906B, the authentication circuit 952 determines that the component 934A, 934B included in the SigncryptedData message is likely authentic.

The authentication circuit 952 also can read any of the other signed or unsigned attributes of the SigncryptedData message at or after any of steps 1338-1346 are completed. The authentication circuit 952 can then verify the signed or unsigned attributes of the SigncryptedData message before proceeding to step 1348. The verification can include comparing the information included in the attribute to the information in the SignedData message or information about the combining computing system 910. For example, when SigncryptedData message includes the ValidShareHolder attribute and/or the Delegation attribute, the verification includes comparing the information indicative of the share-holder signing key from the ValidShareHolder attribute and/or the Delegation attribute with the signature in the SignedData message generated by the share-holder 906A, 906B or the delegate, respectively. In another example, when the SigncryptedData message includes the ValidityPeriod attribute, the verification includes comparing the predetermined time period (e.g., TTL) from the ValidityPeriod attribute to the current time at which the combining computing system 910 has received the components 934A, 934B to verify that the predetermined time period has not expired. In another example, when the SigncryptedData message includes the AuthorizedUse attribute that includes a single time period and/or recurring time period during which the components 934A, 934B can be used, the verification includes comparing the single time period and/or the recurring time period from the AuthorizedUse attribute to the current time at which the combining computing system 910 has received the components 934A, 934B to verify that the single time period has not expired and/or to verify that the current time falls within the recurrent time period during which the components 934A, 934B can be used. In another example, when the SigncryptedData message includes a geographic location, the comparison includes comparing the geographic location of the combining computing system 910 (e.g., using GPS data, etc) to the location specified in the AuthorizedUse attribute to verify that the components 934A, 934B can be used at the geographic location of the combining computing system 910. In response to the verification indicating that the SigncryptedData message including the component 934A or 934B is likely authentic (e.g., by verifying the ValidShareHolder and/or Delegate attributes as described above) and/or can be used by the combining computing system 910 (e.g., by verifying the AuthorizedUse and/or ValidityPeriod attributes as described above), the combining computing system 910 proceeds to step 1348. In response to the verification indicating that the SigncryptedData message including the component 934A or 934B is likely not authentic and/or cannot be used by the combining computing system 910, the combining computing system 910 logs the SignedData message that includes the SigncryptedData message that includes the component and destroys the SignedData message that includes the SigncryptedData message that includes the component.

At step 1348, the combining circuit 954 designcrypts each of the SigncryptedData messages to recover each of the components 934A, 934B while simultaneously authenticating the dealer computing system 904, thereby verifying the integrity of each of the components 934A, 934B. At step 1350, the combining circuit 954 combines the components 934A, 934B together to recover the last secret. In some embodiments, the combining circuit 954 can XOR the first component 934A and the second component 934B together to recover the last secret. In embodiments that include the Index attribute 1008, the combining circuit 954 reads the Index attributes 1008 for each of the components 934A, 934B and combines the components 934A, 934B based on the order specified by the Index attribute 1008. At step 1352, the combining circuit 954 uses the last secret to access the first key of the secure computing system 902. At step 1354, the combining computing system 910 communicates with the secure computing system 902 using the first key. At step 1356, the last secret, the first component 934A, and the second component 934B are erased, and are never written to disk memory, cache memory, or any other non-volatile media.

Figure 14:
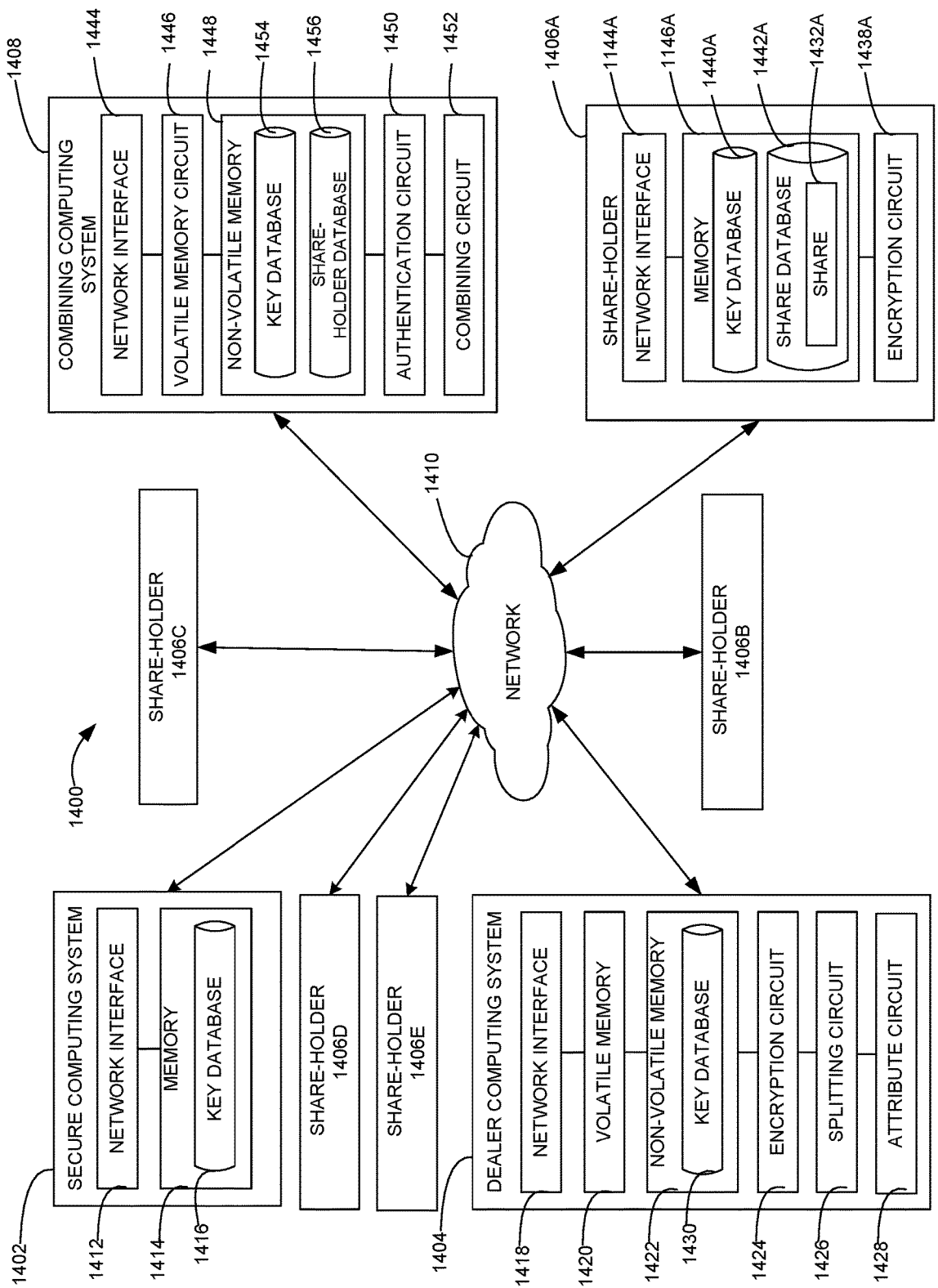
FIG. 14 is an environmental view of a system for generating and sharing a last secret while maintaining confidentiality, integrity, and authenticity of the last secret, according to one embodiment.

Referring now to FIG. 14, an environmental view of a system 1400 for generating a last secret that can be stored confidentially and that can be authenticated is shown, according to an example embodiment. The last secret refers to the last cryptographic element that controls access to an encryption key, a biometric, one or more pieces of data, a tokenized value, or any other information intended to be stored securely. The last secret can be a password, an encryption key, or a detokenization request that must be provided by an entity to gain access to initialization information to start up a cryptographic process for communicating with a secure computing system 1402 or to access the biometric, the one or more pieces of encrypted data, etc. As shown in FIG. 14, the system 1400 includes the secure computing system 1402, a dealer or splitter computing system 1404, a plurality of share-holders 1406, and a combining computing system 1408 connected by a network 1410. While the secure computing system 1402, the dealer computing system 1404, the share-holders 1406, and the combining computing system 1408 are shown as separate entities on separate network nodes in FIG. 14, in some embodiments, one or more of the secure computing system 1402, the dealer computing system 1404, the share-holders 1406, and the combining computing system 1408 can be on the same network node.

In the illustrated embodiment, the plurality of share-holders 1406 includes a first share-holder 1406A, a second share-holder 1406B, a third share-holder 1406C, a fourth share-holder 1406D, and a fifth share-holder 1406E. However, in other embodiments, the plurality of share-holders 1406 can include a different number of share-holders 1406. In the illustrated embodiment, each of the share-holders 1406A-1406E is on a different network node from the other share-holders 1406A-1406E and the secure computing system 1402, the dealer computing system 1404, and the combining computing system 1408. In some embodiments, each of the share-holders 1406A-1406E is on a different network node from the other share-holders 1406A-1406E, but could be on a same network node as the secure computing system 1402, the dealer computing system 1404, or the combining computing system 1408. In some embodiments, one or more of the share-holders 1406A-1406E can be on physical media such as USB memory sticks, smart cards, etc.

The secure computing system 1402 can be a database server, an application server, a file server, a mail server, a print server, a web server, and/or a game server that is in communication with other computing systems and/or client devices connected to the network 1410. In other embodiments, the secure computing system 1402 can be a computing system that includes encrypted data. The secure computing system 1402 includes a network interface 1412 and a memory 1414. In the illustrated embodiment, the secure computing system 1402 and the dealer computing system 1404 are on separate network nodes. In other embodiments, the secure computing system 1402 and the dealer computing system 1404 are on the same network node. The network interface 1412 of the secure computing system 1402 is adapted for and structured to establish a communication session via the network 1410 with the other components of the system 1400. As shown in FIG. 14, the memory 1414 is communicably and operatively coupled with the other components of the secure computing system 1402. The memory 1414 includes a key database 1416. The key database 1416 is structured to retrievably store information related to the public/private key pair of the secure computing system 1402. As shown in FIG. 14, the memory 1414 is communicably and operatively coupled with the other components of the secure computing system 1402.

The dealer computing system 1404 includes a network interface 1418, a volatile memory 1420, a non-volatile memory 1422, an encryption circuit 1424, a splitting circuit 1426, and an attribute circuit 1428. The network interface 1418 is structured to establish a communication session via the network 1410 with the other components of the system 1400. As shown in FIG. 14, the volatile memory 1420 and the non-volatile memory 1422 are communicably and operatively coupled with the other components of the dealer computing system 1404. The non-volatile memory 1422 includes a key database 1430 including a first key for accessing the secure computing system 1402, a password, and an optional second key that have been generated by the encryption circuit 1424. The password is structured to control access to the first key. In embodiments that do not include the second key, the password is the last secret. In some embodiments, the password can be encrypted using the second key. In such embodiments, the second key is the last secret. In embodiments in which the second key is the last secret, the encrypted password is stored to the memory 1414 of the secure computing system 1402. The key database 1430 further includes an encryption key configured for encrypted communication between the dealer computing system 1404 and the combining computing system 1408. In some embodiments, the encryption key is the combining computing system 1408 is the public key of the combining computing system 1408. In some embodiments, the encryption key can be established using either CMS-based key transport or key agreement schemes. The key database 1430 further includes a dealer signing key. In some embodiments, the dealer signing key is the private key of the public/private key pair of the dealer computing system 1404. In some embodiments, the dealer singing key is a symmetric key that is unique to the dealer computing system 1404 and the combining computing system 1408. In some embodiments, the key database 1430 further includes information of the share-holder signing keys for each of the share-holders 1406A-1406E. In some embodiments, the key database 1430 further includes certificates including the public keys of each of the share-holders 1406A-1406E structured to hold the splits. In some embodiments, the key database 1430 includes information indicative of an identity of a symmetric key unique to the share-holder 1406A-1406E and the combining computing system 1408.

The splitting circuit 1426 is structured to receive the last secret from the dealer computing system 1404 and read the last secret into the volatile memory 1420. The splitting circuit 1426 is structured to split the last secret into a plurality of splits. As illustrated in FIG. 14, the splitting circuit 1426 is structured to split the last secret into shares 1432A-1432E of a N of M scheme. As used herein, the phrase "N of M scheme" generally refers to a secret sharing scheme in which the last secret is split into M total number of shares, any number N of which can be combined to recover the last secret. Accordingly, in the embodiment of FIGS. 14-15, the splits are the shares 1432A-1432E of the N of M scheme. In the illustrated embodiment, the splitting circuit 1426 is structured to split the last secret into M number of shares. The last secret can be regenerated from a portion (e.g., N) of the M shares. For example, the shares 1432A-1432E can be inputs to a polynomial over a finite field such as a Galois Field to recover the last secret. The splitting circuit 1426 is then structured to erase the last secret from the volatile memory 1420 and not write the last secret to the non-volatile memory 1422. Splitting the last secret into shares 1432A-1432E maintains the integrity of the last secret because shares that have been altered or replaced by a malicious party cannot be recombined into the last secret. In the illustrated embodiment, the splitting circuit 1426 divides the last secret according to a 3 of 5 scheme, meaning that the splitting circuit 1426 divides the last secret into 5 shares (e.g., M=5) 1432A-1432E, any three (e.g., N=3) of which can be recombined to recover the last secret. In other embodiments, the splitting circuit 1426 can divide the last secret into a different number N shares, any number M of which can be recombined to recover the last secret.

The splitting circuit 1426 is structured to generate a SigncryptedData message for each of the shares 1432A-1432E with the public and private keys of the dealer computing system 1404 and with encryption key configured for encrypted communication between the dealer computing system 1404 and the combining computing system 1408. Therefore, only the combining computing system 1408 can decrypt the SigncryptedData messages to recover the shares 1432A-1432E. As used herein, "only" means that the SigncryptedData messages are configured to be decrypted by the combining computing system 910 and no other systems, entities, objects, and so on. Therefore, each of the shares 1432A-1432E are blinded from (e.g., cannot be read by) entities other than the combining computing system 1408. Since each SigncryptedData message is signcrypted using the dealer signing key of the dealer computing system 904 and the encryption key configured for encrypted communication between the dealer computing system 1404 and the combining computing system 1408, an unauthorized party such as a man-in-the-middle attacker cannot designcrypt the SigncryptedData message around each of the shares 1432A-1432E. In embodiments in which multiple last secrets need to be protected, the last secrets can be individually encrypted using a password encryption key (WEK) that is split into shares 1432A-1432E according to a N of M scheme as described above for the last secret. Splitting the last secret into the shares 1432A-1432E maintains the integrity of the last secret because components that have been altered or replaced by a malicious party cannot be recombined into the last secret.

The attribute circuit 1428 is structured to generate attributes for each of the SigncryptedData messages that include the shares 1432A-1432E. The attributes include signed attributes, which have been signed using the dealer signing key of the dealer, and unsigned attributes. Both the signed attributes and unsigned attributes are cleartext and can be read by the share-holder. The signed attributes include one or more of a CombinerAddress attribute, a ValidShareHolder attribute, a GroupName attribute, an Index attribute, a DealTime attribute, a ValidityPeriod attribute, a Delegation attribute, an AuthorizedUse attribute, and a Prioritization attribute.

The CombinerAddress attribute is structured to identify the combining computing system 1408 that is structured to reconstruct N of the shares 1432A-1432E to recover the last secret.

The ValidShareHolder attribute is structured to identify the particular share-holder 1406A-1406E that is the intended recipient of each of the shares 1432A-1432E (e.g., include first information indicative of the identity of the share-holders 1406A-1406E). In some embodiments, the ValidShareHolder attribute includes information indicative of each share-holder signing key that is used by each of the share-holders 1406A-1406E to send a SignedData message that includes the SigncryptedData message including the share 1432A-1432E to the combining computing system 1408. In embodiments in which the share-holder signing key is the private key of the share-holder 1406A-1406E, each of the share-holders 1406A-1406E is structured to send a certificate, such as an X.509 certificate, including a public key of the share-holder 1406A-1406E to the dealer computing system 1404. In such embodiments, the attribute circuit 1428 is structured to read the public key of the share-holder 1406A-1406E from the certificate for the share-holder 1406A-1406E and write the public key of the share-holder 1406A-1406E to the ValidShareHolder attribute. In embodiments in which the share-holder signing key is a symmetric signature key, the share-holder 1406A-1406E is structured to send information indicative of the symmetric signature key, such as a name, a location, and/or a key check value, to the dealer computing system 1404. In such embodiments, the attribute circuit 1428 is structured to read the information indicative of the symmetric key from the key database 1430 and write the information indicative of the symmetric key to the ValidShareHolder attribute. In some embodiments, the ValidShareHolder attribute is structured to request share-holder authentication. For example, in embodiments in which one or more of the share-holders 1406A-1406E are physical media possessed by a human operator, the ValidShareHolder attribute may prompt the human operator to answer a security question and then verify that the answer to the security question is correct.

The GroupName attribute includes information indicative of an instance of the last secret. The Index attribute includes information indicative of an order to use when combining computing system 1408 combines the shares 1432A-1432E to recover the last secret.

The Index attribute includes information indicative of an order to use when combining computing system 1408 combines the N received shares 1432A-1432E to recover the last secret.

The DealTime attribute includes information indicative of a time and a date that the dealer computing system 1404 distributed the shares 1432A-1432E to the share-holders 1406A-1406E, respectively.

The ValidityPeriod Attribute includes information indicative of a predetermined time period for which the shares 1432A-1432E are valid. In some embodiments, the predetermined time period may be a week, a month, or a year. In some embodiments, the predetermined time period can include time-to-live (TTL) information. The TTL information can specify a lifespan for each of the shares 1432A-1432E. In some embodiments, the predetermined time period can be the same for each of the shares 1432A-1432E. In some embodiments, the predetermined time period can be different for each of the shares 1432A-1432E. For example, the predetermined time period for the share 1432A can be for ninety days and the predetermined time period for the share 1432B can be three years.

The Delegation attribute includes delegation information for the share-holder 1406A-1406E. Delegation information includes a designation of a delegate that is authorized to provide the share 1432A-1432E saved to the share-holders 1406A-1406E, respectively, in the same manner as described herein with respect to the share-holders 1406A-1406E. The Delegation attribute can include information indicative of an identity of the delegate. For example, in some embodiments, the Delegation attribute can include information indicative of a public key or a symmetric key that the Delegate will use to generate the SignedData message that includes the SigncryptedData message including the one of the shares 1432A-1432E. For example, in some embodiments, one or more of the share-holders 1406A-1406E can be physical storage media possessed by a human operator. In such an embodiment, a first human operator can designate a second human operator as a delegate. As described above, the ValidShareHolder attribute may prompt the human operator to answer a security question. The Delegation attribute may include the correct answer to the security question for the delegate. The combining computing system 1408 can then compare the answer to the security question provided by the delegate with the answer in the Delegation attribute to validate the share 1432A-1432E provided by the delegate.

The AuthorizedUse attribute includes information indicative of times and/or locations at or during which the share 1432A-1432E is authorized for use. For example, the AuthorizedUse attribute can include a date or a range of dates for which the share 1432A-1432E can be used. In another example, the AuthorizedUse attribute can include a time period for which the share 1432A-1432E can be used. The time period can be a single time period (e.g., a predefined number of seconds, minutes, days, weeks, months, years, etc.), a recurring time period (e.g., between 9 a.m. and 5 p.m. for Mondays-Fridays), or a combination thereof that the share 1432A-1432E is authorized for use. In some embodiments, the time period can be the same for all of the shares 1432A-1432E. In some embodiments, the time period can be different for the shares 1432A-1432E. For example, the share 1432A can have a time period of 90 days and the share 1432B can have a time period of 3 days. In another example, the share 1432A can have a time period that indicates that the share 1432A be used at any time. The share 1432B can have a time period indicating that the share 1432B can only be used between 9 a.m.-5 p.m. on Mondays-Fridays. In some embodiments, the AuthorizedUse attribute can specify that the share 1432A-1432E is a single-use share. In such an embodiment, the single use share can be destroyed after it is used (e.g., by the share-holder after the share has been sent) and/or the address of the share-holder holding the single-use share can be deleted from the combining computing system 1408. In some embodiments, the AuthorizedUse attribute includes information indicative of geographic locations for which the share 1432A-1432E can be used. For example, the geographic location can include one or more countries in which the share 1432A-1432E can be used. In such an arrangement, the location of the combining computing system 1408 must match the one or more locations defined in the location attribute before using the share 1432A-1432E described by the AuthorizedUse attribute can be used to recover the last secret. For example, the AuthorizedUse attribute for the share 1432A can indicate that the share 1432A can only be used in the U.S.A. The AuthorizedUse attribute for the share 1432B can indicate that the share 1432B can be used in any country. The AuthorizedUse attribute for the share 1432C can indicate that the share 1432C cannot be used in any Office Of Foreign Assets Control-restricted country.

The Prioritization attribute is structured to identify one or more shares 1432A-1432E that must be present to combine the N received shares to recover the last secret. In the present embodiment, N=3 and M=5, therefore three of the shares 1432A-1432E must be present to recover the last secret. In an example that includes the Prioritization attribute, the Prioritization attribute may require that the share 1432A be present for recovery of the last secret. Therefore, in instances in which the share 1432A is one of the N shares received by the combining computing system 1408, the combining computing system 1408 combines the received shares to recover the last secret. However, in instances where N shares are received, but the share 1432A is not among the N shares received, the combining computing system 1408 does not recombine the received shares to recover the last secret.

The unsigned attribute can include a SAML assertion. The SAML assertion can include information indicative of share-holders 1406 authorized to hold the shares 1432A-1432E, information indicative of the combining computing system 1408 authorized to access the shares 1432A-1432E, a timeliness of the shares 1432A-1432E in reaching the combining computing system 1408, etc.

In some embodiments, some attributes can include one or more other attributes. For example, a ShareHolder attribute can include one or more of the CombinerAddress attribute, the ValidShareHolder attribute, the GroupName attribute, the Index attribute, the DealTime attribute, the ValidityPeriod attribute, the Delegation attribute, the AuthorizedUse attribute, and the Prioritization attribute. In other embodiments, the ShareHolder attribute can include a different combination of signed and unsigned attributes.

The ShareHolder attribute, the CombinerAddress attribute, the ValidShareHolder attribute, the GroupName attribute, the Index attribute, the Deal Time attribute, the ValidityPeriod attribute, the Delegation attribute, the AuthorizedUse attribute, and the Prioritization attributes can be used in a schema similar to the schema 1000 illustrated in FIGS. 10-12 for the system 900.

The attribute circuit 1428 is structured to append the one or more attributes to the each of the SigncryptedData messages that include the shares 1432A-1432E. In embodiments in which one or more of the attributes is a signed attribute, the attribute circuit 1428 is structured to sign the attribute using the private key of the dealer computing system 1404. The attribute circuit 1428 is structured to transmit the shares 1432A-1432E to the respective share-holders 1406A-1406E.

The share-holders 1406A-1406E are substantially similar. Accordingly, only the share-holder 1406A is described in greater detail herein. The share-holders 1406B-1406E include each of the components illustrated for the share-holder 1406A and can perform all of the functionalities described with respect to the share-holder 1406A. The share-holder 1406A includes a network interface 1434A, a memory 1436A, and an encryption circuit 1438A. The memory 1436A includes a key database 1440A and a share database 1442A. The key database 1440A includes a share-holder signing key of the share-holder 1406A. In embodiments in which the share-holder signing key is a private key of the share-holder 1406A, the key database 1440A includes a public/private key pair of the share-holder 1406A. In embodiments in which the share-holder signing key is a symmetric key that is unique to the share-holder 1406A and the combining computing system 1408, the key database 1440A includes the symmetric key. The share database 1442A includes the share 1432A. The encryption circuit 1438A is structured to use the share-holder signing key of the share-holder 1406A to create a SignedData message around the SigncryptedData message that includes the share 1432A. In such an embodiment, the share-holder signature in the SignedData message is the second information indicative of the identity of the share-holder 1406A. In other embodiments, the encryption circuit 1438A can be configured add the second information indicative of the identity of the share-holder 1406A to the SigncryptedData message including the share 1432A by signing a portion or one or more of the attributes with the share-holder signature key of the share-holder 1406A. In some embodiments, the encryption circuit 1438A is structured to read the CombinerAddress attribute to identify a location and/or address of the combining computing system 1408. The encryption circuit 1438A is structured to send the SignedData message, which includes SigncryptedData message including the share 1432A, to the combining computing system 1408. The share-holder 1406A sends the SignedData message to the combining computing system 1408 in response to a request for the share 1432A.

In some arrangements, each of the share-holders 1406A-1406E is configured to write its encrypted share 1432A-1432E, each of which includes the dealer signature and the share-holder signature, to a block chain. This can serve as a verifiable record indicating the dealer computing system 1404 that generated the share 1432A-1432E and the share-holder 1406A-1406E that held each of the shares 1432A-1432E. In some embodiments, each of the share-holders 1406A-1406E can be configured to write the encrypted share 1432A-1432E, which includes the dealer signature and the share-holder signature, to the block chain when the share-holder 1406A-1406E sends the encrypted shares 1432A-1432E to the combining computing system 1408 to save a verifiable record of when the encrypted shares 1432A-1432E were sent to the combining computing system 1408.

The combining computing system 1408 is a computing system or a part of a computing system that desires to access the secure computing system 1402. For example, in embodiments in which the secure computing system 1402 is an application server or a database, the combining computing system 1408 may run an application or a program that needs to access the secure computing system 1402. The combining computing system 1408 includes a network interface 1444, a volatile memory 1446, a non-volatile memory 1448, an authentication circuit 1450, and a combining circuit 1452. The non-volatile memory 1448 includes include a key database 1454 and a share-holder database 1456. The key database 1454 includes a public/private key pair of the combining computing system 1408 and the encryption key configured for encrypted communication between the dealer computing system 1404 and the combining computing system 1408. In some embodiments, the encryption key is the public key of the combining computing system 1408. In some embodiments, the encryption key can be established using either CMS-based key transport or key agreement schemes. The key database 1454 further includes cryptographic keys for authenticating the dealer signature. In embodiments in which the dealer signature is a digital signature, the key database 956 includes the public key of the dealer computing system 1404. In embodiments in which the dealer signature is based on the symmetric key unique to the dealer computing system 1404 and the combining computing system 1408, the key database includes the symmetric key unique to the dealer computing system 1404 and the combining computing system 1408. In some embodiments, the key database 1454 further includes cryptographic keys for authenticating the share-holder signature. In embodiments in which the share-holder signature is a digital signature, the key database 1454 includes the public key of the share-holders 1406A-1408E. In embodiments in which the share-holder signature is based on the symmetric key unique to the share-holder 1406A-1406E and the combining computing system 1408, the key database includes the symmetric key unique to the share-holder 1406A-1406E and the combining computing system 1408. The share-holder database 1456 includes information indicative of a location of each of the share-holders 1406A-1406E.

The combining computing system 1408 is structured to receive at least N of the shares 1432A-1432E from the plurality of share-holders 1406A-1406E after the combining computing system 1408 has started or restarted or determined a need to recover the last secret. For example, in some embodiments, the combining circuit 1452 is structured to send a request to all of the share-holders 1406A-1406E to send their shares 1432A-1432E to the combining computing system 1408. The combining circuit 1452 is structured to generate a log of the shares 1432A-1432E received by the combining computing system 1408 and save the log to the non-volatile memory 1448. The log can include an identifier of each of the shares 1432A-1432E, information indicative of the share-holder 1406A-1406E that sent the share 1432A-1432E, and/or a timestamp indicating when each of the shares 1432A-1432E was received. If more than N shares (e.g., M shares) are received, the first N shares are used. In some embodiments, the combining circuit 1452 is structured to destroy all of the received shares 1432A-1432E if less than N shares 1432A-1432E have been received after a predetermined time period. In some embodiments, the combining circuit 1452 is structured to destroy all of the received shares 1432A-1432E if more than M shares are received. In embodiments that include the Prioritization attribute, the combining circuit 1452 is structured to destroy all of the received shares 1432A-1432E if the share(s) identified in the Prioritization attribute as required share(s) have not been received, even if N or more shares have been received. The combining computing system 1408 receives each of the shares 1432A-1432E as SignedData messages including SigncryptedData messages that include one of the shares 1432A-1432E.

After receiving N shares 1432A-1432E, the combining computing system 1408 is structured to read and verify one or more of the attributes in the SigncryptedData message. The combining computing system 1408 is structured to read the first information indicative of the identity of the share-holder 1406A-1406E identity from the one or more attributes of the SigncryptedData message generated by the dealer computing system 1404. For example, the authentication circuit 1450 is structured to read the ValidShareHolder attribute from the SigncryptedData message. The authentication circuit 1450 is structured to read the second information indicative of the identity of the share-holder 1406A-1406E added by the share-holder 1406A-1406E. For example, the authentication circuit 1450 is structured to read the information indicative of the share-holder signing key of the intended share-holder 1406 from the ValidShareHolder attribute. The authentication circuit 1450 is configure to compare the first information indicative of the identity of the share-holder 1406A-1406E and the second information indicative of the identity of the share-holder 1406A-1406E. For example, the authentication circuit 1450 is structured to determine whether the share-holder signature of the SignedData message was made using the share-holder signing key identified by the share-holder 1406A-1406E identified in the ValidShareHolder attribute. In embodiments that do not include the Delegation attribute, in response to determining that the first and second information indicative of the identity of the share-holder 1406A-1406E do not match, the authentication circuit 1450 determines that the share 1432A-1432E in the SigncryptedData message is likely not authentic, logs the mismatch to the non-volatile memory 1448 and destroys the shares 1432A-1432E. For example, in response to determining that the share-holder signature of the SignedData message was not made using the share-holder signature key of the intended share-holder 1406A-1406E identified in the ValidShareHolder attribute, the authentication circuit 1450 determines that the share 1432A-1432E in the SigncryptedData message is likely not authentic, logs the mismatch to the non-volatile memory 1448 and destroys the shares 1432A-1432E. In response to determining that the first and second information indicative of the identity of the share-holder 1406A-1406E matches, the authentication circuit 1450 determines that the share 1432A-1432E is likely authentic. For example, in response to determining that the share-holder signature of the SignedData message was made using the share-holder signing key of the intended share-holder 1406A-1406E identified in the ValidShareHolder attribute, the authentication circuit 1450 determines that the share 1432A-1432E is authentic. In this manner, the intercepted shares modified and sent by an attacker and/or false shares sent by an attacker are not decrypted by the combining computing system 1408.

In embodiments in which the SigncryptedData message includes the Delegation attribute, the authentication circuit 1450 is structured to authenticate the dealer signature of the dealer computing system 1404 that generated the Delegation attribute. In response to determining that the dealer signature of the Delegation attribute is not the dealer signature of the dealer computing system 1404, the authentication circuit determines that the SigncryptedData message including the share 1432A-1432E is likely not authentic, logs the mismatch, and destroys the SigncryptedData message including the share 1432A-1432E. In response to determining that the dealer signature of the Delegation attribute is the dealer signature of the dealer computing system 1404, the authentication circuit 1450 is structured to read the information indicative of the identity of the delegate (e.g., first information indicative of the identity of the delegate) from the Delegation attribute and compare the information indicative of the identity of the delegate to the signature of the SignedData message (e.g., second information indicative of the identity of the delegate). For example, in embodiments in which delegate signature is a digital signature, the Delegation attribute includes a public key, and the authentication circuit 1450 determines whether the public key from the Delegation attribute matches the delegate signature of the SignedData message. In embodiments in which the delegate signature is based on a symmetric key that is unique to the delegate and the combining computing system 1408, the Delegation attribute incudes information indicative of the symmetric key (e.g., a MAC key, HMAC key, etc.), and the authentication circuit 1450 compares the symmetric key indicated in the Delegation attribute to the delegate signature of the SignedData message. In response to determining that the first information indicative of the identity of the delegate does not match the second information indicative of the identity of the delegate, the authentication circuit 1450 determines that the SigncryptedData message including the share 1432A-1432E is likely not authentic, logs the mismatch, and destroys the SigncryptedData message including the share 1432A-1432E. In response to determining that the first information indicative of the identity of the delegate matches the second information indicative of the identity of the delegate, the authentication circuit determines that the SigncryptedData message including the share 1432A-1432E is likely authentic. In this manner, the intercepted components modified and sent by an attacker and/or false components sent by an attacker are not decrypted by the combining computing system 1408.

In embodiments in which the SigncryptedData message includes the GroupName attribute, the authentication circuit 1450 is structured to read the GroupName attribute from the SigncryptedData message and verify that the instance of the share 1432A-1432E corresponds to the instance of the last secret and/or the first key that the combining computing system 1408 intends to recover. In response to determining that the instance of the share 1432A-1432E from the GroupName attribute does not correspond to the instance of the last secret and/or the first key that the combining computing system 1408 intends to recover, the authentication circuit 1450 is structured to destroy the shares 1432A-1432E. In some embodiments, the authentication circuit 952 is structured to log the mismatch and destroy the message including the share 1432A-1432E.

In embodiments in which the SigncryptedData message includes the ValidityPeriod attribute, the authentication circuit 1450 is structured to read the ValidityPeriod attribute from the SigcryptedData message and verify that the predetermined time period included in the ValidityPeriod attribute has not expired. In response to determining that the predetermined time period has expired, the authentication circuit 1450 is configured to destroy the message(s) including the shares 1432A-1432E for which the predetermined time period has expired. In some embodiments, the authentication circuit 1450 is structured to log the expired shares received.

In embodiments in which the SigncryptedData message includes the AuthorizedUse attribute, the authentication circuit 1450 is structured to read the AuthorizedUse attribute from the SigncryptedData message. The authentication circuit 1450 is structured to determine whether the current time and/or the location of the combining computing system 1408 matches the time and/or location in the AuthorizedUse attribute. For example, when the time in the AuthorizedUse attribute includes a single time period for which the share 1432A-1432E can be used, the authentication circuit 1450 determines that the single time period has not expired. In another example, when the time in the AuthorizedUse attribute is a recurring time period (e.g., 9 a.m.-5 p.m. Monday-Friday), the authentication circuit 1450 verifies that the current time matches the recurring time period. In another example, when the AuthorizedUse attribute includes a location, the authentication circuit 1450 determines the geographic location of the combining computing system 1408 (e.g., based on GPS) and verifies that the geographic location of the combining computing system 1408 matches the location of the AuthorizedUse attribute. In response to determining that time and/or location does not match the time and/or location of the AuthorizedUse attribute, the authentication circuit 1450 is configured to destroy the message including the share 1432A-1432E. In some embodiments, the authentication circuit 1450 is structured to log the mismatch.

The combining circuit 1452 is structured to designcrypt the each of SigncryptedData messages to recover the each of the N shares 1432A-1432E while simultaneously authenticating the dealer computing system 1404, thereby verifying the integrity of each of the N shares 1432A-1432E. In embodiments that include the Index attribute, the combining circuit 1452 is structured to read the Index attribute of each of the shares 1432A-1432E to determine a correct order for recombining the shares 1432A-1432E to recover the last secret. The combining circuit 1452 is structured to combine the N shares 1432A-1432E together to recover the last secret. For example, the combining circuit 1452 can combine the first share 1432A, the third share 1432C, and the fifth share 1432E as inputs into a polynomial function that is over a finite field (e.g., a Galois Field). Successful regeneration of the last secret verifies the integrity of each of the N shares because shares that have been modified and/or replaced by a third party cannot be combined to recover the last secret. The combining circuit 1452 can then use the last secret to access the first key of the secure computing system 1402. The combining computing system 1408 is structured to read the last secret within the volatile memory and erase the last secret after the first key has been retrieved. The combining computing system 1408 is structured to never write the last secret to the non-volatile memory 1448, cache memory, or any other non-volatile media. The combining computing system 1408 can then communicate with the secure computing system 1402 using the first key.

Figure 15A:
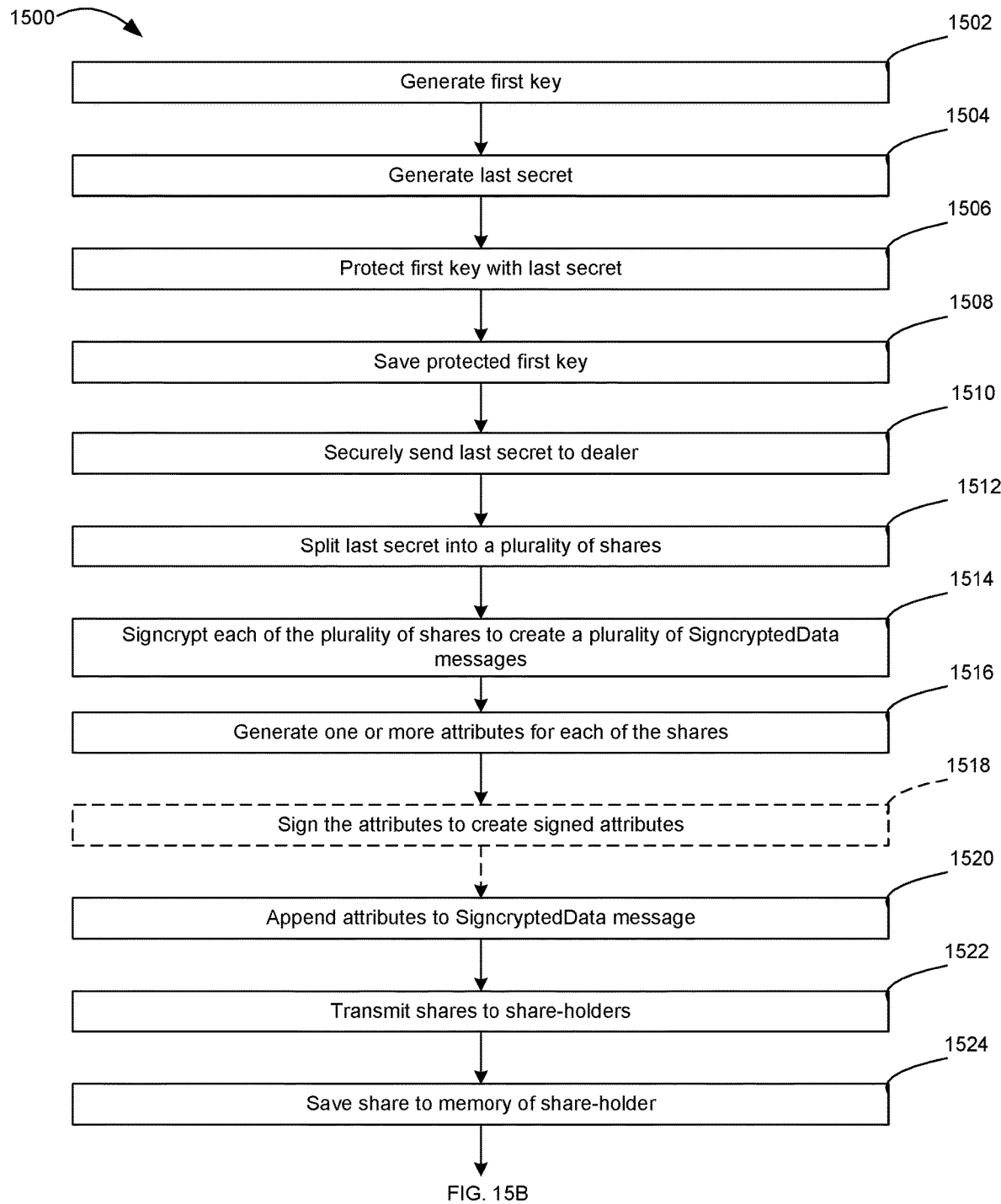
FIGS. 15A-15C are flow diagrams showing a process of generating and sharing the last secret while maintaining confidentiality, integrity, and authenticity of the last secret, according to one embodiment.
Figure 15B:
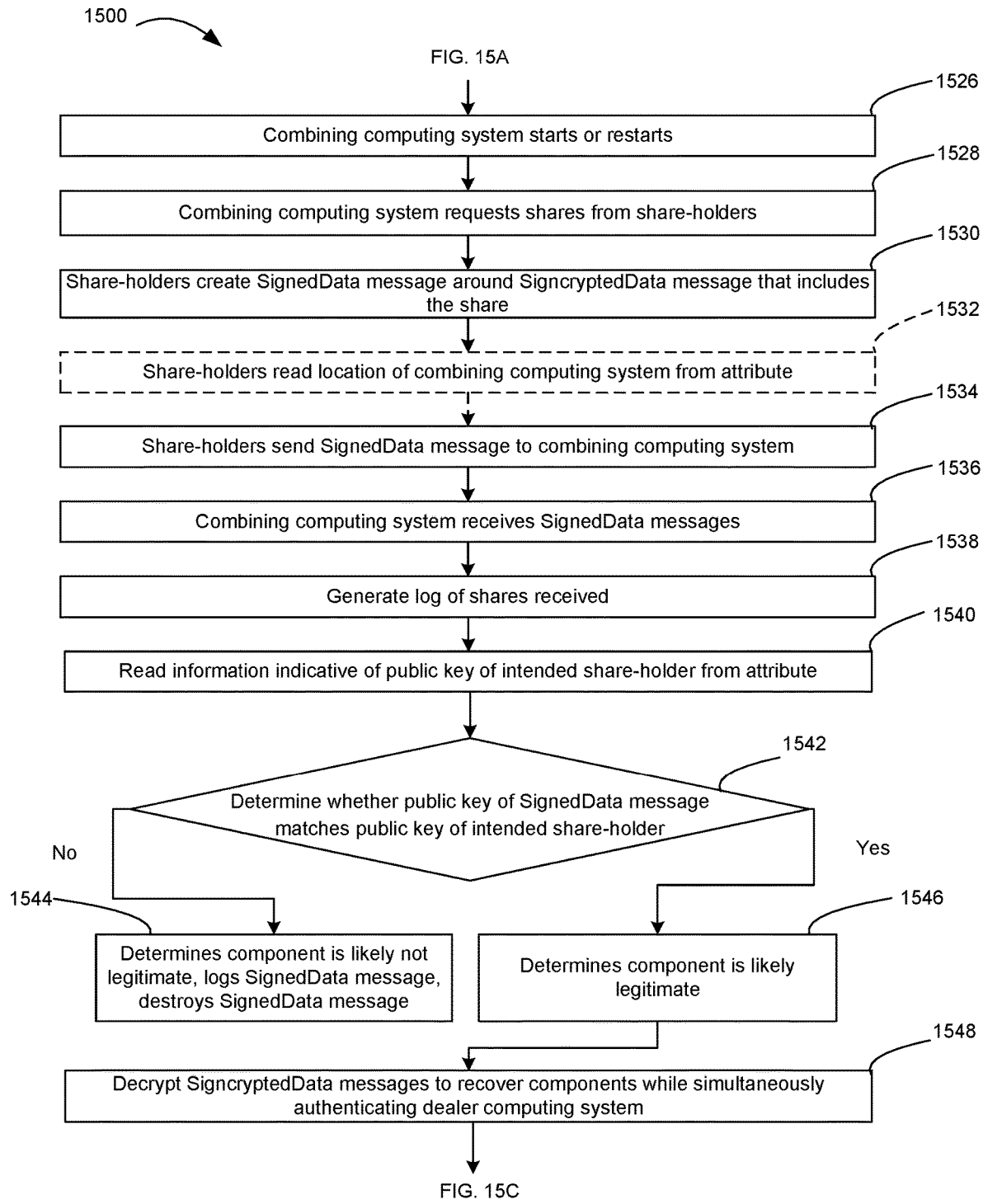
Figure 15C:
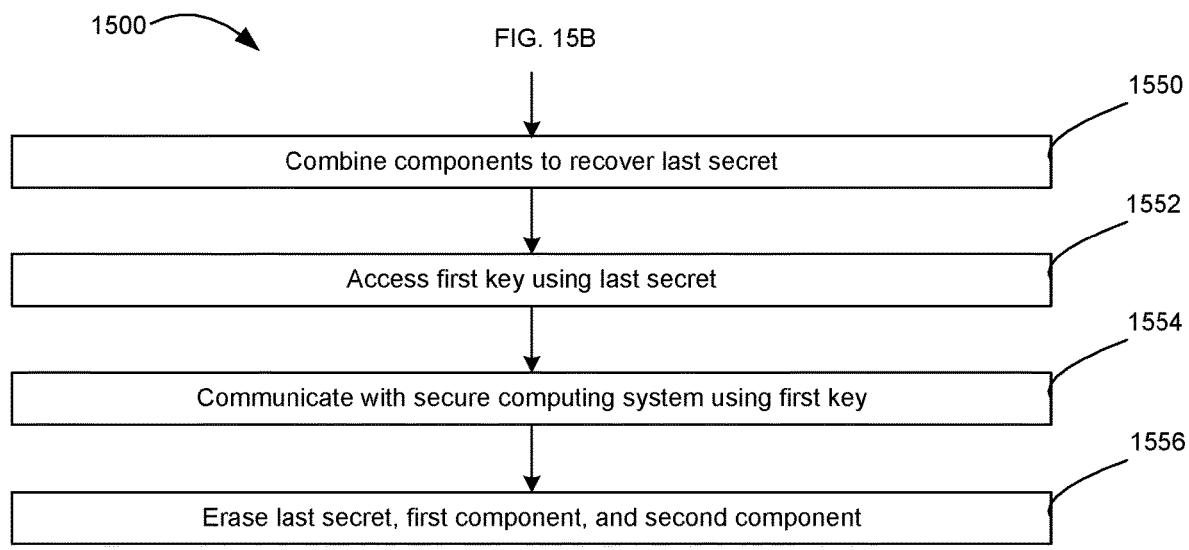

Referring now to FIGS. 15A-15C, a flow diagram of a method 1500 for maintaining the confidentiality, authenticity, and integrity of a last secret is shown, according to an example embodiment. At step 1502, the first key for the secure computing system 1402 is generated by the encryption circuit 1424 of the dealer computing system 1404. At step 1504, the last secret is generated by the encryption circuit 1424. At step 1506, the first key is protected with the last secret. At step 1508, the protected first key is saved to the memory 1414 of the secure computing system 1402. At step 1510, the last secret is sent to the dealer computing system 1404. At step 1512, the splitting circuit 1426 splits the last secret into a plurality of shares 1432A-1432E according to a N of M scheme. For example, in the illustrated embodiment, the last secret is split according to a 3 of 5 scheme, meaning that the last secret is split into 5 shares 1432A-1432E, any three of which can be combined to recover the last secret. In other embodiments, the last secret may be split into a different number of N of M shares, a different number of which can be combined to recover the last secret. Splitting the last secret into shares 1432A-1432E maintains the integrity of the last secret because shares that have been altered and/or replaced by a third party cannot be recombined into the last secret.

At step 1514, the splitting circuit 928 generates a SigncryptedData message for each of the shares 1432A-1432E using the dealer signing key of the dealer computing system 1404 and the encryption key configured for encrypted communication between the dealer computing system 1404 and the combining computing system 1408. Since the SigncryptedData message is signcrypted using the dealer signing key of the dealer computing system 1404 and the encryption key configured for encrypted communication between the dealer computing system 1404 and the combining computing system 1408, an unauthorized party such as a man-in-the-middle attacker cannot designcrypt the SigncryptedData message around the shares 1432A-1432E.

At step 1516, the attribute circuit 930 generates one or more attributes for each of the shares 1432A-1432E. The attributes can include signed and unsigned attributes. Exemplary signed attributes include the CombinerAddress attribute, the ValidShareHolder attribute, the GroupName attribute, the Index attribute, the DealTime attribute, the ValidityPeriod attribute, the Delegation attribute, the AuthorizedUse attribute, and the Prioritization attribute. An exemplary unsigned attribute includes the SAML attribute. At step 1518, in embodiments that include one or signed attributes, the attribute circuit 1428 signs the signed attributes with the dealer signing key of the dealer computing system 1404. At step 1520, the attribute circuit 1428 appends the one or more attributes to each of the SigncryptedData messages that include one of the shares 1432A-1432E. At step 1522, the attribute circuit 1428 transmits each of the shares 1432A-1432E to the share-holders 1406A-1406E, respectively.

At step 1524, each of the share-holders 1406A-1406E saves the share 1432A-1432E, respectively, to the share database 1442 of the non-volatile memory 1436 of the share-holder 1406A-1406E.

At step 1526, the combining computing system 1408 starts or restarts and desires to establish a connection with the secure computing system 1402. At step 1528, the combining circuit 1452 requests the shares 1432A-1432E from each of the share-holders 1406A-1406E.

At step 1530, in response to receiving a request for the shares 1432A-1432E, the encryption circuit 1438A-1438E of each share-holder 1406A-1406E creates a SignedData message around the SigncryptedData message that includes one of the shares 1432A-1432E using the share-holder signing key of the share-holder 1406A-1406E, respectively. At step 1532, in embodiments that include the CombinerAddress attribute, the encryption circuit 1438A-1438E is structured to read the location of the combining computing system 1408 into a volatile memory of the share-holder

1406A-1406E. At step 1534, the share-holders 1406A-1406E sends the SignedData message that includes the SigncryptedData message including the share 1432A-1432E to the combining computing system 1408.

At step 1536, the combining computing system 1408 receives N to M SignedData messages that include the SigncryptedData messages that include one of the shares 1432A-1432E. In some embodiments, the combining computing system 1408 receives N shares 1432A-1432E or more than N shares 1432A-1432E (e.g., up to M shares). In embodiments in which the combining computing system 1408 receives more than N shares 1432A-1432E, the combining computing system 1408 uses the first N shares 1432A-1432E received. For example, in the illustrated embodiment, the combining computing system 1408 can receive the first share 1432A, the third share 1432C, and the fifth share 1432E. At step 1538, the combining computing system 1408 generates a log of the N to M shares 1432A-1432E received and saves the log to the non-volatile memory 1448. The log can include an identifier of the each of the shares 1432A-1432E received and/or an identifier of the share-holders 1406A-1406E that sent each of the shares 1432A-1432E, and a timestamp. In some instances, at step 1536, the combining computing system 1408 may receive less than N shares 1432A-1432E. In such instances, the combining computing system 1408 generates the log of the shares 1432A-1432E described at step 1538. The method 1500 does not progress to step 1540. In some embodiments, after N shares 1432A-1432E have not been received in a predetermined time period, the combining computing system 1408 destroys all of the shares 1432A-1432E that have been received and logs the destruction of the received shares 1432A-1432E.

At step 1540, the authentication circuit 1450 determines the first information indicative of the identity of the share-holder 1406 added by the dealer computing system 1404. For example, the authentication circuit 1450 reads the information indicative of the share-holder signing key of the intended share-holder 1406 from the ValidShareHolder attribute of each share 1432A-1432E. At step 1542, the authentication circuit 1450 determines whether the first information indicative of the identity of the share-holder (added by the dealer computing system 1404) and second information indicative of the identity of the share-holder (added by the share-holder 1406A-1406E) match. For example, the authentication circuit 1450 determines whether the share-holder signature of the SignedData message matches (e.g., the share-holder signature was made with) the share-holder signing key of the intended share-holder 1406A-1406E.

At step 1544, in response to determining that the first and second information indicative of the identity of the share-holder 1406A-1406E do not match, the authentication circuit 1450 determines that the share 1432A-1432E is likely not authentic, logs the SignedData message that includes the SigncryptedData message including the share 1432A-1432E, and destroys the SignedData message that includes the SigncryptedData message that includes the share 1432A-1432E. For example, in response to determining that the share-holder signature of the SignedData message was not made using the share-holder signing key of the intended share-holder 1406A-1406E for one or more of the shares 1432A-1432E, the authentication circuit 1450 determines that the share 1432A-1432E is likely not authentic, logs the SignedData message that includes the SigncryptedData message including the share 1432A-1432E, and destroys the SignedData message that includes the SigncryptedData message that includes the share 1432A-1432E. Therefore, intercepted shares modified and sent by an attacker and/or false components sent by an attacker are not decrypted. At 1546, in response to determining that the first and second information indicative of the identity of the share-holder 1406A-1406E match, the authentication circuit 1450 determines that the share 1432A-1432E is likely authentic. For example, in response to determining that the share-holder signature of the SignedData attribute of the share 1432A-1432E was made with the share-holder signing key of the intended share-holder 1406A-1406E, the authentication circuit 1450 determines that the share 1432A-1432E is legitimate.

The authentication circuit 1450 also can read any of the other signed or unsigned attributes of the SigncryptedData message for each of the shares 1432A-1432E at or after any of steps 1540-1546 are completed. The authentication circuit 1450 can then verify the signed or unsigned attributes of the SigncryptedData message before proceeding to step 1548. The verification can include comparing the information included in the attribute to the information in the SignedData message or information about the combining computing system 1408. For example, when SigncryptedData message includes the ValidShareHolder attribute and/or the Delegation attribute, the verification includes comparing the information indicative of the share-holder signing key from the ValidShareHolder attribute and/or the Delegation attribute with the signature in the SignedData message generated by the share-holder 1406A-1406E or the delegate, respectively. In another example, when the SigncryptedData message includes the ValidityPeriod attribute, the verification includes comparing the predetermined time period (e.g., TTL) from the ValidityPeriod attribute to the current time at which the combining computing system 910 has received the share 1432A-1432E to verify that the predetermined time period has not expired. In another example, when the SigncryptedData message includes the AuthorizedUse attribute that includes a single time period and/or recurring time period during which the shares 1432A-1432E can be used, the verification includes comparing the single time period and/or the recurring time period from the AuthorizedUse attribute to the current time at which the combining computing system 1408 has received the shares 1432A-1432E to verify that the single time period has not expired and/or to verify that the current time falls within the recurrent time period during which the shares 1432A-1432E can be used. In another example, when the SigncryptedData message includes a geographic location, the comparison includes comparing the geographic location of the combining computing system 1408 (e.g., using GPS data, etc.) to the location specified in the AuthorizedUse attribute to verify that the shares 1432A-1432E can be used at the geographic location of the combining computing system 1408. In response to the verification indicating that the SigncryptedData message including the share 1432A-1432E is likely authentic (e.g., by verifying the ValidShareHolder and/or Delegate attributes as described above) and/or can be used by the combining computing system 1408 (e.g., by verifying the AuthorizedUse and/or ValidityPeriod attributes as described above), the combining computing system 1408 proceeds to step 1548. In response to the verification indicating that the SigncryptedData message including the share 1432A-1432E is likely not authentic and/or cannot be used by the combining computing system 1408, the combining computing system 1408 logs the SignedData message that includes the SigncryptedData message that includes the share and destroys the SignedData message that includes the SigncryptedData message that includes the share.

At step 1548, the combining circuit 1452 designcrypts each of the SigncryptedData messages to recover each of the shares 1432A-1432E while simultaneously authenticating the dealer computing system 1404, thereby verifying the integrity of each of the shares 1432A-1432E. In embodiments in which the SigncryptedData message includes the Prioritization attribute, the verification includes comparing the received shares 1432A-1432E to the share(s) identified in the Prioritization attribute to verify that the received shares 1432A-1432E include the share(s) identified in the Prioritization attribute. In response to the verification indicating that the received shares 1432A-1432E include the share(s) identified in the Prioritization attribute, the combining computing system 1408 proceeds to step 1550. In response to the verification indicating that the received shares 1432A-1432E do not include the share(s) identified in the Prioritization attribute, the combining computing system 1408 logs the received shares 1432A-1432E and destroys the received shares 1432A-1432E.

At step 1550, the combining circuit 1452 combines the N shares 1432A-1432E together to recover the last secret. For example, the combining circuit 1452 can provide the N shares as the inputs of a polynomial function that can recover the last secret. In embodiments that include the Index attribute, the combining circuit 1452 reads the index attributes for each of the shares 1432A-1432E and inputs and/or combines the shares 1432A-1432E based on the order specified by the Index attribute. Successful regeneration of the last secret verifies the integrity of the N shares 1432A-1432E because shares that have been modified and/or replaced by another party cannot be combined to recover the last secret. At step 1552, the combining circuit 1452 uses the last secret to access the first key of the secure computing system 1402. At step 1554, the combining computing system 1408 communicates with the secure computing system 1402 using the first key. At step 1556, the last secret, the first component, and the second component are erased, and are never written to disk memory, cache memory, or any other non-volatile media.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to or configured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to or configured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to or configured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a blockchain), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Ethereum, Ripple, Litecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web embodiments of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method for securely sharing and authenticating a last secret, the method comprising:
    generating, by a dealer computing system coupled with a combining computing system, first split independent of a secret, the secret comprising a cryptographic element and controlling access to a first key, the secret comprising at least one of a password, a second key, and a tokenized value, and the first key controlling access to a secure computing system;
    generating, by the dealer computing system, a second split based on the first split and the secret;
    encrypting, by the dealer computing system, the first split by an encryption key established between the dealer computing system and the combining computing system;
    encrypting, by the dealer computing system, the second split by the encryption key established between the dealer computing system and the combining computing system;
    transmitting, by the dealer computing system, the encrypted first split to a first share-holder;
    transmitting, by the dealer computing system, the encrypted second split to a second share-holder;
    designcrypting, by the combining computing system, the encrypted first split;
    designcrypting, by the combining computing system, the encrypted second split;
    comparing, by the combining computing system, first information indicative of the identity of the first share-holder and second information indicative of the identity of the first share-holder; and
    combining, by the combining computing system, the designcrypted first split and the designcrypted second split to recover the secret, in response to the comparison indicating that the first information matches the second information;
    obtaining, by the combining computing system and based on the secret, the first key; and
    communicating, by the combining computing system using the first key, with the secure computing system.

2. The method of claim 1, wherein the secret comprises a last secret, and the cryptographic element comprises a last cryptographic element.

3. The method of claim 1, further comprising:
    generating, by the dealer computing system, the first key.

4. The method of claim 1, further comprising:
    generating, by the dealer computing system, the secret.

5. The method of claim 1, further comprising:
    signing, by the dealer computing system, the first split by a key of the dealer computing system.

6. The method of claim 5, further comprising:
    signing, by the dealer computing system, the second split by the key of the dealer computing system.

7. The method of claim 1, further comprising:
    generating, via a bit operation by the dealer computing system, the second split; and
    combining, via the bit operation by the combining computing system, the designcrypted first split and the designcrypted second split into the secret.

8. A system for securely sharing and authenticating a secret, the system comprising a dealer computing system comprising:
    a splitting circuit configured to generate a first split independent of a secret, and generate a second split based on the first split and the secret, the secret comprising a cryptographic element and controlling access to a first key, the secret comprising at least one of a password, a second key, and a tokenized value, and the first key controlling access to a secure computing system;
    an encryption circuit configured to encrypt the first split by an encryption key established between the dealer computing system and the combining computing system, and encrypt the second split by the encryption key established between the dealer computing system and the combining computing system; and a network interface configured to transmit the encrypted first split to a first share-holder, and transmit the encrypted second split to a second share-holder, wherein the dealer computing system is operatively coupled with a combining computing system comprising a combining circuit configured to designcrypt the encrypted first split, designcrypt the encrypted second split, compare first information indicative of the identity of the first share-holder and second information indicative of the identity of the first share-holder, combine the designcrypted first split and the designcrypted second split to recover the secret, in response to the comparison indicating that the first information matches the second information, and communicate with the secure computing system using the first key obtained based on the secret.

9. The system of claim 8, wherein the secret comprises a last secret, and the cryptographic element comprises a last cryptographic element.

10. The system of claim 8, the dealer computing system configured to generate the first key.

11. The system of claim 8, the dealer computing system configured to generate the secret.

12. The system of claim 8, the dealer computing system configured to sign the first split by a key of the dealer computing system.

13. The system of claim 12, the dealer computing system configured to sign the second split by the key of the dealer computing system.

14. The system of claim 8, the dealer computing system configured to generate, via a bit operation.

15. A system for securely sharing and authenticating a secret, the system comprising a combining computing system comprising:

a combining circuit configured to:
designcrypt an encrypted first split,
designcrypt an encrypted second split,
compare first information indicative of an identity of a first share-holder and second information indicative of an identity of the first share-holder; and
combine the designcrypted first split and the designcrypted second split to recover a secret, in response to the comparison indicating that the first information matches the second information; and
communicate with the secure computing system using a first key obtained based on the secret, wherein the combining computing system is operatively coupled with a dealer computing system comprising:

a splitting circuit configured to generate a first split independent of the secret, and generate a second split based on the first split and the secret, the secret comprising a cryptographic element and controlling access to the first key, the secret comprising at least one of a password, a second key, and a tokenized value, and the first key controlling access to a secure computing system;

an encryption circuit configured to encrypt the first split by an encryption key established between the dealer computing system and the combining computing system, and encrypt the second split by the encryption key established between the dealer computing system and the combining computing system; and a network interface configured to transmit the encrypted first split to the first share-holder, and transmit the encrypted second split to the second share-holder.

16. The system of claim 15, the combining computing system configured to combine, via a bit operation, the designcrypted first split and the designcrypted second split to recover the secret.

\* \* \* \* \*